United States Patent
Higashitani et al.

(10) Patent No.: US 12,456,499 B2
(45) Date of Patent: Oct. 28, 2025

(54) THREE-DIMENSIONAL MEMORY DEVICE INCLUDING LATERALLY SEPARATED SOURCE LINES AND METHOD OF MAKING THE SAME

(71) Applicant: SANDISK TECHNOLOGIES LLC, Addison, TX (US)

(72) Inventors: Masaaki Higashitani, Cupertino, CA (US); James Kai, Santa Clara, CA (US); Johann Alsmeier, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 377 days.

(21) Appl. No.: 18/350,573

(22) Filed: Jul. 11, 2023

(65) Prior Publication Data

US 2024/0127864 A1    Apr. 18, 2024

Related U.S. Application Data

(60) Provisional application No. 63/379,805, filed on Oct. 17, 2022.

(51) Int. Cl.
*G11C 5/06* (2006.01)
*G11C 16/04* (2006.01)
(Continued)

(52) U.S. Cl.
CPC .......... *G11C 5/063* (2013.01); *G11C 16/0483* (2013.01); *H01L 23/5226* (2013.01);
(Continued)

(58) Field of Classification Search
CPC . G11C 5/063; G11C 16/0483; H01L 23/5226; H01L 23/5283
See application file for complete search history.

(56) References Cited

U.S. PATENT DOCUMENTS 9,627,009 B2 * 4/2017 Petti .................... G11C 13/0069
10,629,616 B1 * 4/2020 Kai ........................ H10B 41/27
(Continued)

FOREIGN PATENT DOCUMENTS

CN         101083298 A  * 12/2007   ........... H10N 70/231
CN         107810554 A  *  3/2018   ............. H10B 43/27
(Continued)

OTHER PUBLICATIONS

IPRP—Notification Concerning Transmittal of International Preliminary Report on Patentability and Written Opinion of the International Searching Authority for International Patent Application No. PCT/US2023/077031, mailed May 1, 2025, 7 pages.
(Continued)

*Primary Examiner* — Laura M Menz
(74) *Attorney, Agent, or Firm* — THE MARBURY LAW GROUP PLLC

(57) ABSTRACT

A memory device includes a first memory block containing first word lines and a first source layer segment, and a second memory block containing second word lines and a second source layer segment which is electrically isolated from the first source layer segment. The first word lines in the first memory block are electrically connected to the respective second word lines in the second memory block.

19 Claims, 77 Drawing Sheets

(51) Int. Cl.
- *H01L 23/522* (2006.01)
- *H01L 23/528* (2006.01)
- *H10B 41/10* (2023.01)
- *H10B 41/27* (2023.01)
- *H10B 41/35* (2023.01)
- *H10B 41/40* (2023.01)
- *H10B 43/10* (2023.01)
- *H10B 43/27* (2023.01)
- *H10B 43/35* (2023.01)
- *H10B 43/40* (2023.01)

(52) U.S. Cl.
CPC ......... *H01L 23/5283* (2013.01); *H10B 41/10* (2023.02); *H10B 41/27* (2023.02); *H10B 41/35* (2023.02); *H10B 41/40* (2023.02); *H10B 43/10* (2023.02); *H10B 43/27* (2023.02); *H10B 43/35* (2023.02); *H10B 43/40* (2023.02)

(56) References Cited

U.S. PATENT DOCUMENTS

| | | | |
|---|---|---|---|
| 10,700,078 B1* | 6/2020 | Cui | H10B 41/27 |
| 10,720,212 B2* | 7/2020 | Lee | G11C 5/02 |
| 10,903,222 B2* | 1/2021 | Sakakibara | H01L 23/5283 |
| 10,910,069 B2* | 2/2021 | Lang | G11C 16/26 |
| 10,978,152 B1* | 4/2021 | Gautam | G11C 11/5635 |
| 11,139,022 B1* | 10/2021 | Tei | G11C 11/5642 |
| 11,195,781 B2 | 12/2021 | Okina et al. | |
| 11,201,107 B2* | 12/2021 | Okina | H01L 24/08 |
| 11,302,714 B2* | 4/2022 | Cui | H10B 43/27 |
| 11,355,486 B2 | 6/2022 | Mizutani et al. | |
| 11,393,836 B2 | 7/2022 | Tsutsumi et al. | |
| 11,482,539 B2* | 10/2022 | Sharangpani | H01L 25/18 |
| 11,600,634 B2* | 3/2023 | Cui | H10D 30/693 |
| 11,626,418 B2* | 4/2023 | Ninomiya | H10B 41/27 257/314 |
| 11,631,690 B2* | 4/2023 | Okina | H10B 41/50 257/314 |
| 11,676,954 B2 | 6/2023 | Rabkin et al. | |
| 11,817,305 B2* | 11/2023 | Kirby | H01L 24/08 |
| 11,903,190 B2* | 2/2024 | Sakotsubo | H10B 43/27 |
| 12,058,854 B2* | 8/2024 | Iwai | H10B 41/35 |
| 12,347,779 B2* | 7/2025 | Said | H10B 43/40 |
| 2017/0047334 A1* | 2/2017 | Lu | H10B 41/27 |
| 2017/0330628 A1* | 11/2017 | Oh | G11C 16/24 |
| 2018/0122904 A1* | 5/2018 | Matsumoto | H10B 43/10 |
| 2020/0098434 A1* | 3/2020 | Lang | G11C 16/26 |
| 2020/0251479 A1* | 8/2020 | Sakakibara | H01L 21/76895 |
| 2020/0258817 A1* | 8/2020 | Okina | H10B 43/40 |
| 2021/0035965 A1* | 2/2021 | Mizutani | H01L 25/50 |
| 2021/0125920 A1* | 4/2021 | Hu | H10B 41/35 |
| 2022/0045090 A1* | 2/2022 | Cui | H10B 43/27 |
| 2022/0045091 A1* | 2/2022 | Cui | H01L 21/32134 |
| 2022/0045092 A1* | 2/2022 | Cui | H01L 23/5226 |
| 2022/0157841 A1* | 5/2022 | Tsutsumi | G11C 7/18 |
| 2022/0157842 A1* | 5/2022 | Tsutsumi | H10B 43/35 |
| 2022/0189981 A1* | 6/2022 | Sakotsubo | H10B 43/10 |
| 2022/0189984 A1* | 6/2022 | Okina | H01L 23/5226 |
| 2022/0189986 A1* | 6/2022 | Ninomiya | H10B 43/27 |
| 2022/0208748 A1* | 6/2022 | Rabkin | H01L 24/80 |
| 2022/0254728 A1* | 8/2022 | Matsuno | H10B 43/50 |
| 2022/0254733 A1* | 8/2022 | Mizuno | H10B 41/27 |
| 2022/0254804 A1* | 8/2022 | Yoshida | H10B 41/10 |
| 2022/0285387 A1* | 9/2022 | Hinoue | H10B 43/27 |
| 2022/0285388 A1* | 9/2022 | Cui | H10B 41/10 |
| 2022/0336484 A1* | 10/2022 | Iwai | H10B 41/40 |
| 2023/0042438 A1* | 2/2023 | Hou | H01L 23/481 |
| 2024/0055051 A1* | 2/2024 | Yang | G11C 16/16 |
| 2024/0064983 A1* | 2/2024 | Kashimura | H10B 41/27 |
| 2024/0105622 A1* | 3/2024 | Said | H01L 24/80 |
| 2024/0105623 A1* | 3/2024 | Said | H01L 23/535 |
| 2024/0127864 A1* | 4/2024 | Higashitani | H10B 41/35 |
| 2024/0147723 A1* | 5/2024 | Ohaga | H01L 23/5283 |
| 2024/0172431 A1* | 5/2024 | Kai | H10B 43/35 |
| 2024/0179908 A1* | 5/2024 | Hosoda | H01L 25/50 |
| 2024/0363165 A1* | 10/2024 | Sakane | H10B 41/10 |
| 2025/0081453 A1* | 3/2025 | Sanada | H10B 43/27 |
| 2025/0081458 A1* | 3/2025 | Matsuno | H10B 43/50 |
| 2025/0234544 A1* | 7/2025 | Hinoue | H10B 43/10 |
| 2025/0234545 A1* | 7/2025 | Tsutsumi | H10B 43/35 |

FOREIGN PATENT DOCUMENTS

| | | | |
|---|---|---|---|
| CN | 110088905 B * | 8/2023 | H10D 62/292 |
| CN | 117652218 A * | 3/2024 | H10D 64/037 |
| CN | 119234477 A * | 12/2024 | G11C 5/063 |
| CN | 119422461 A * | 2/2025 | H10D 87/00 |
| CN | 120345357 A * | 7/2025 | H10B 43/10 |
| JP | 2023124667 A * | 9/2023 | H10D 64/037 |
| KR | 20060004138 A * | 1/2006 | G11C 7/12 |
| KR | 100706232 B1 * | 4/2007 | G11C 11/4094 |
| KR | 20170126772 A | 11/2017 | |
| KR | 102401056 B1 * | 5/2022 | G11C 5/02 |
| KR | 20220064869 A | 5/2022 | |
| KR | 20220082613 A | 6/2022 | |
| KR | 20250009499 A * | 1/2025 | G11C 5/063 |
| TW | I789714 B * | 1/2023 | H10B 43/50 |
| TW | I849610 B * | 7/2024 | H10B 43/27 |
| WO | WO-2020174268 A1 * | 9/2020 | H01R 13/652 |
| WO | WO-2022031357 A1 * | 2/2022 | H10D 64/037 |
| WO | WO-2022220897 A1 * | 10/2022 | G11C 8/14 |
| WO | WO-2022231717 A1 * | 11/2022 | H01L 23/5283 |
| WO | WO-2023022769 A1 * | 2/2023 | H01L 21/32134 |
| WO | WO-2023048778 A1 * | 3/2023 | H10D 64/037 |
| WO | WO-2024063830 A1 * | 3/2024 | H10D 87/00 |
| WO | WO-2024086545 A1 * | 4/2024 | G11C 5/063 |
| WO | WO-2024118277 A1 * | 6/2024 | H10B 43/35 |
| WO | WO-2025005997 A1 * | 1/2025 | H10B 43/10 |
| WO | WO-2025042457 A1 * | 2/2025 | H10B 43/50 |
| WO | WO-2025048918 A1 * | 3/2025 | H10B 43/50 |

OTHER PUBLICATIONS

Endoh et al., "Novel Ultra High-Density Memory with a Stacked-Surrounding Gate Transistor (S-SGT) Structured Cell," IEDM Proc. (2001) 33-36.

U.S. Appl. No. 17/577,533, filed Jan. 18, 2022, SanDisk Technologies LLC.

U.S. Appl. No. 17/655,272, filed Mar. 17, 2022, SanDisk Technologies LLC.

U.S. Appl. No. 17/659,057, filed Apr. 13, 2022, SanDisk Technologies LLC.

U.S. Appl. No. 17/661,783, filed May 3, 2022, SanDisk Technologies LLC.

U.S. Appl. No. 17/662,926, filed May 11, 2022, SanDisk Technologies LLC.

U.S. Appl. No. 17/684,975, filed Mar. 2, 2022, SanDisk Technologies LLC.

U.S. Appl. No. 17/931,362, filed Sep. 12, 2022, SanDisk Technologies LLC.

U.S. Appl. No. 17/934,676, filed Sep. 23, 2022, SanDisk Technologies LLC.

U.S. Appl. No. 17/934,685, filed Sep. 23, 2022, SanDisk Technologies LLC.

ISR—Notification of Transmittal of The International Search Report and Written Opinion of the International Searching Authority for International Patent Application No. PCT/US2024/077031, mailed Feb. 15, 2024, 9 pages.

\* cited by examiner

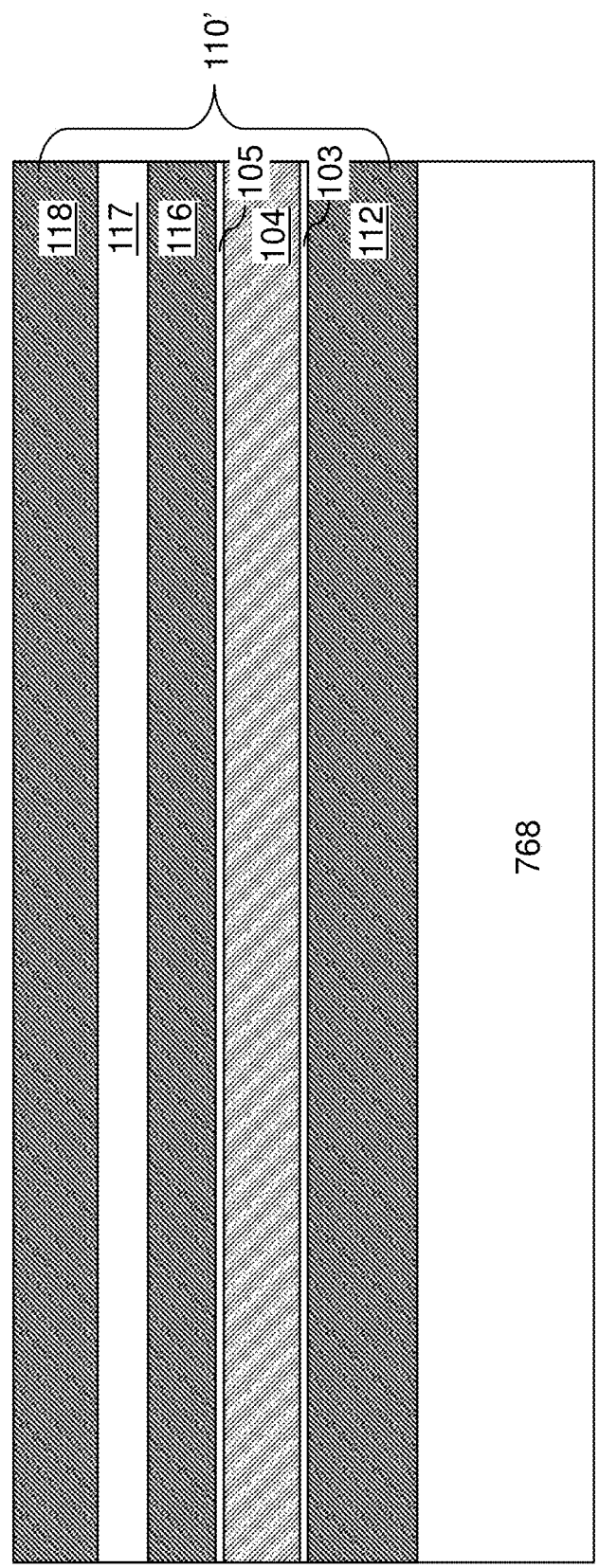

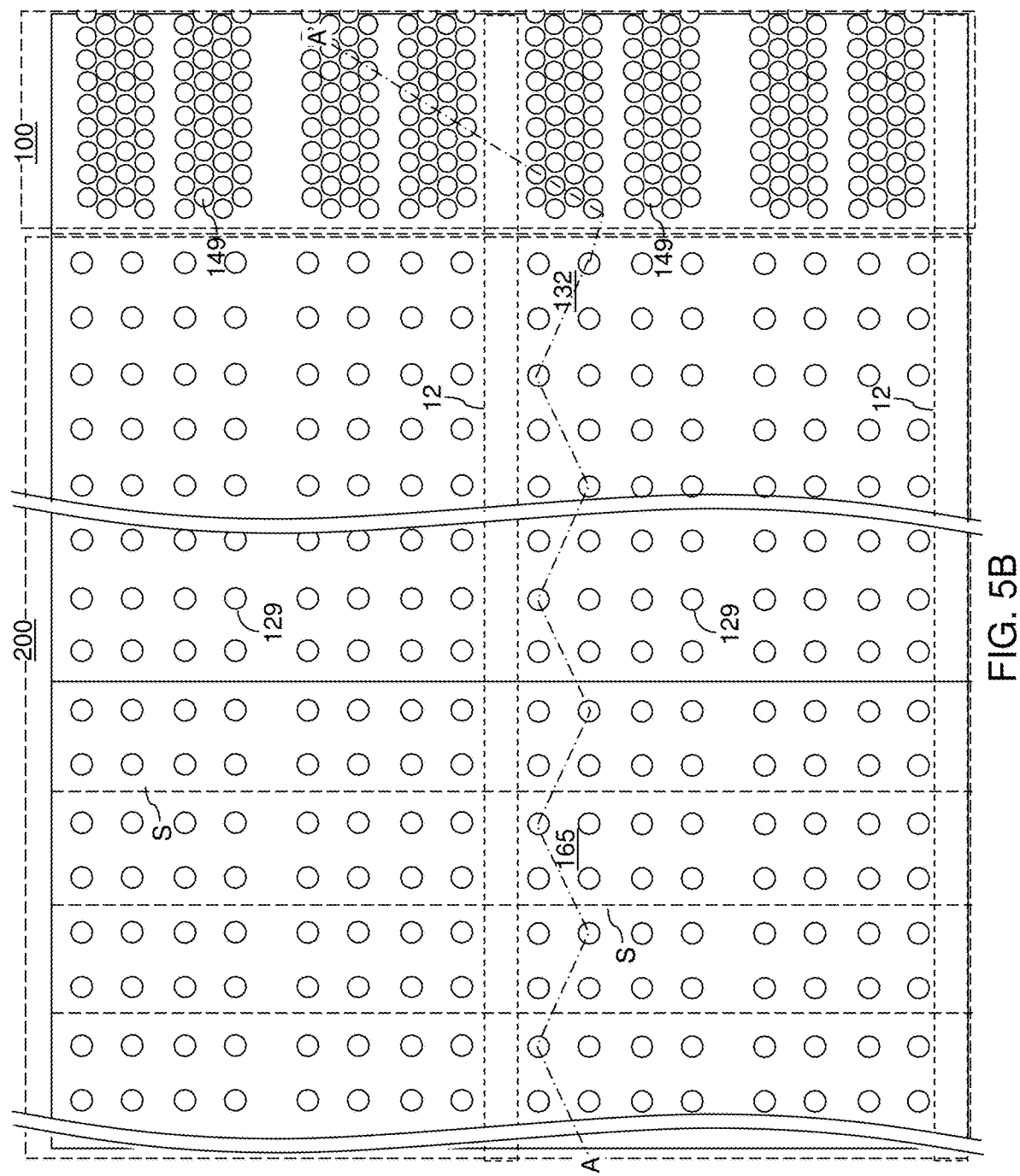

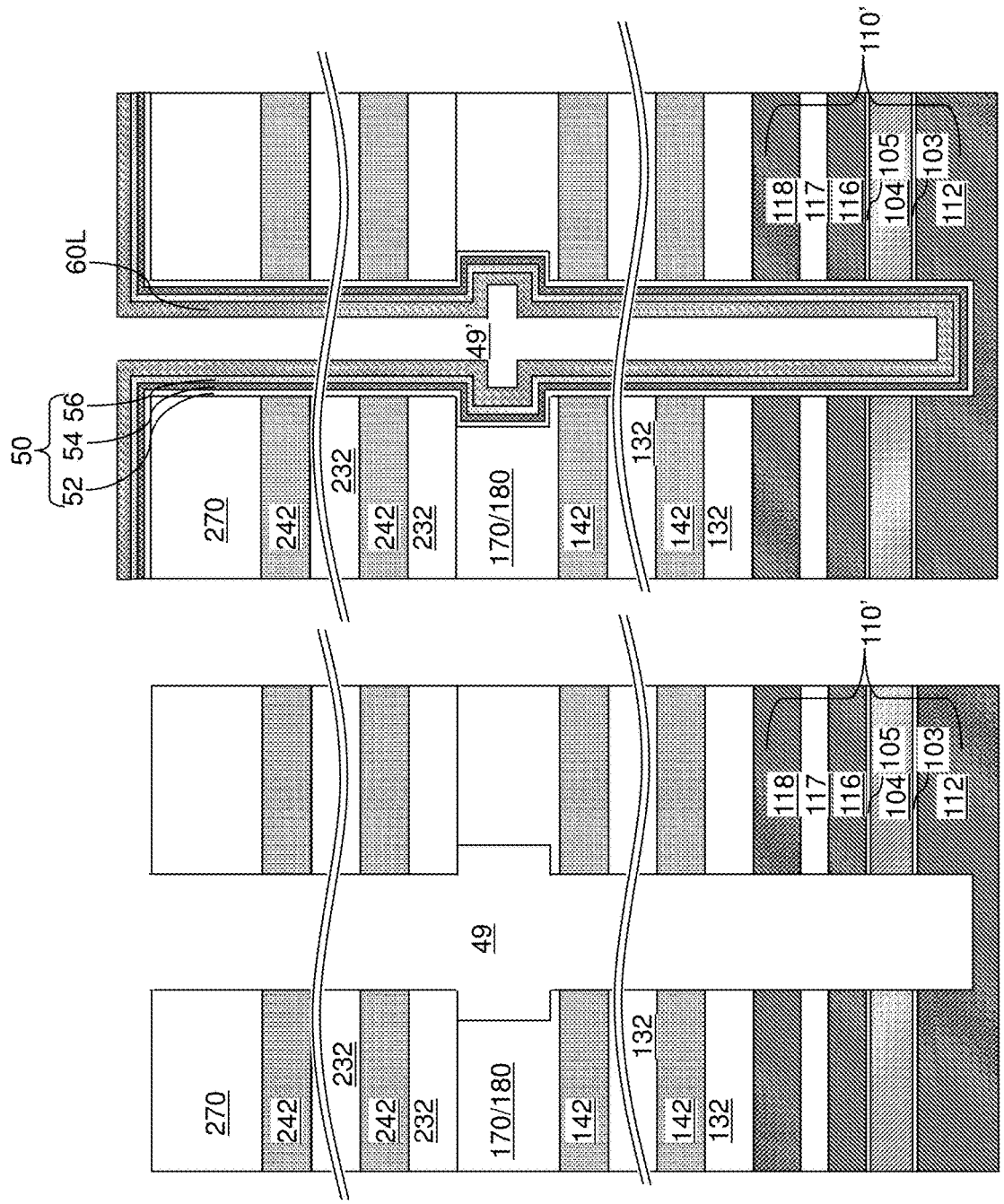

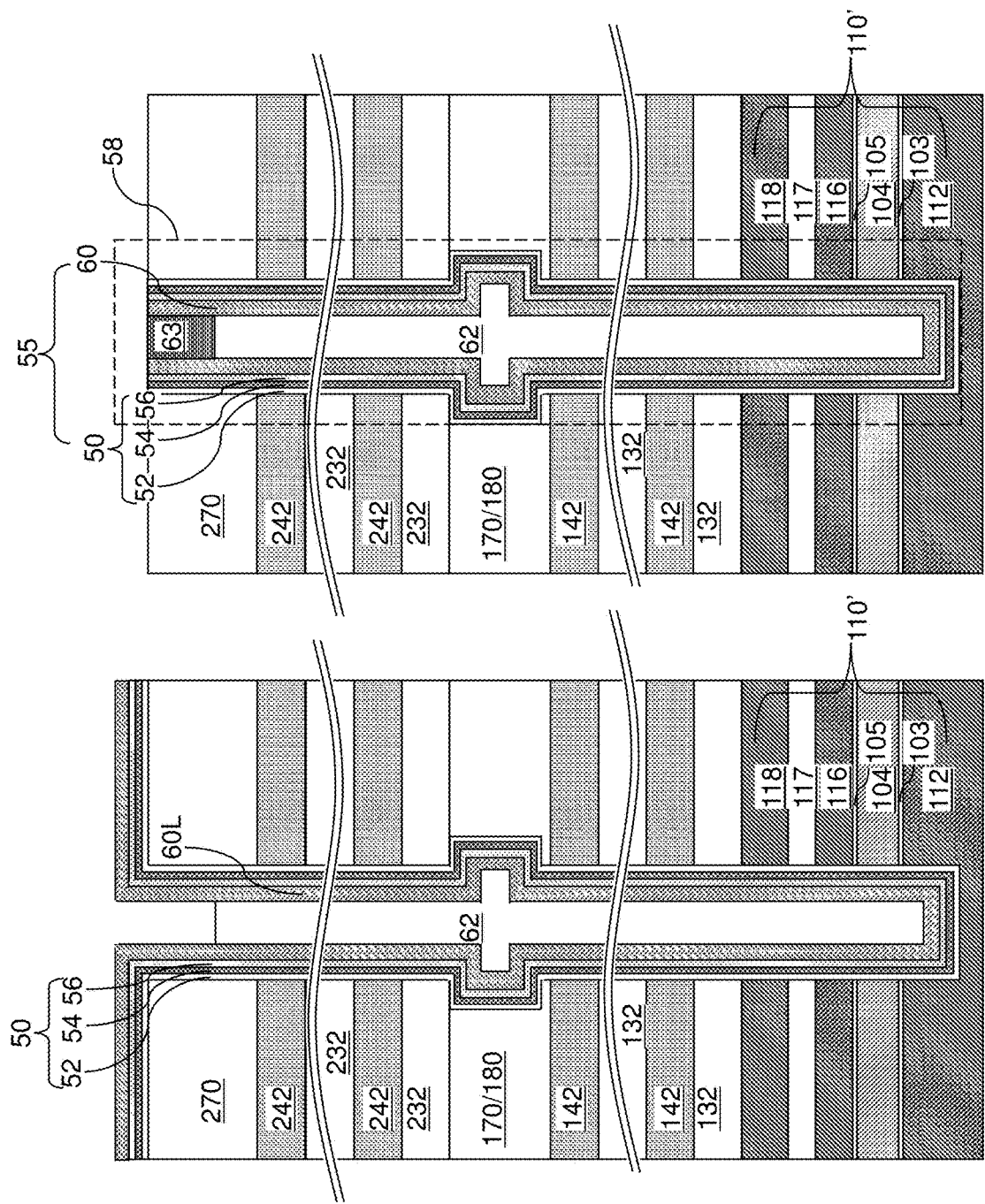

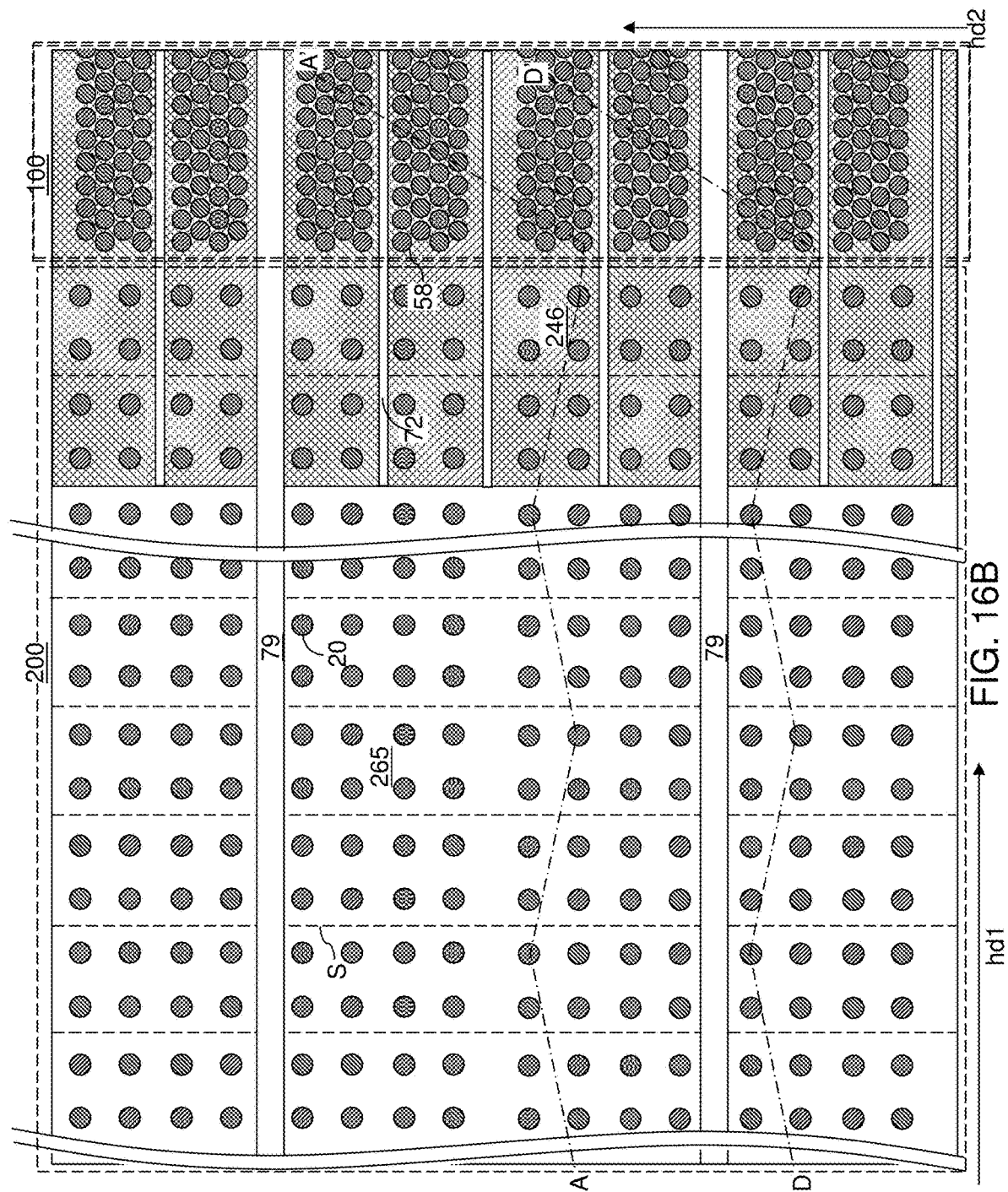

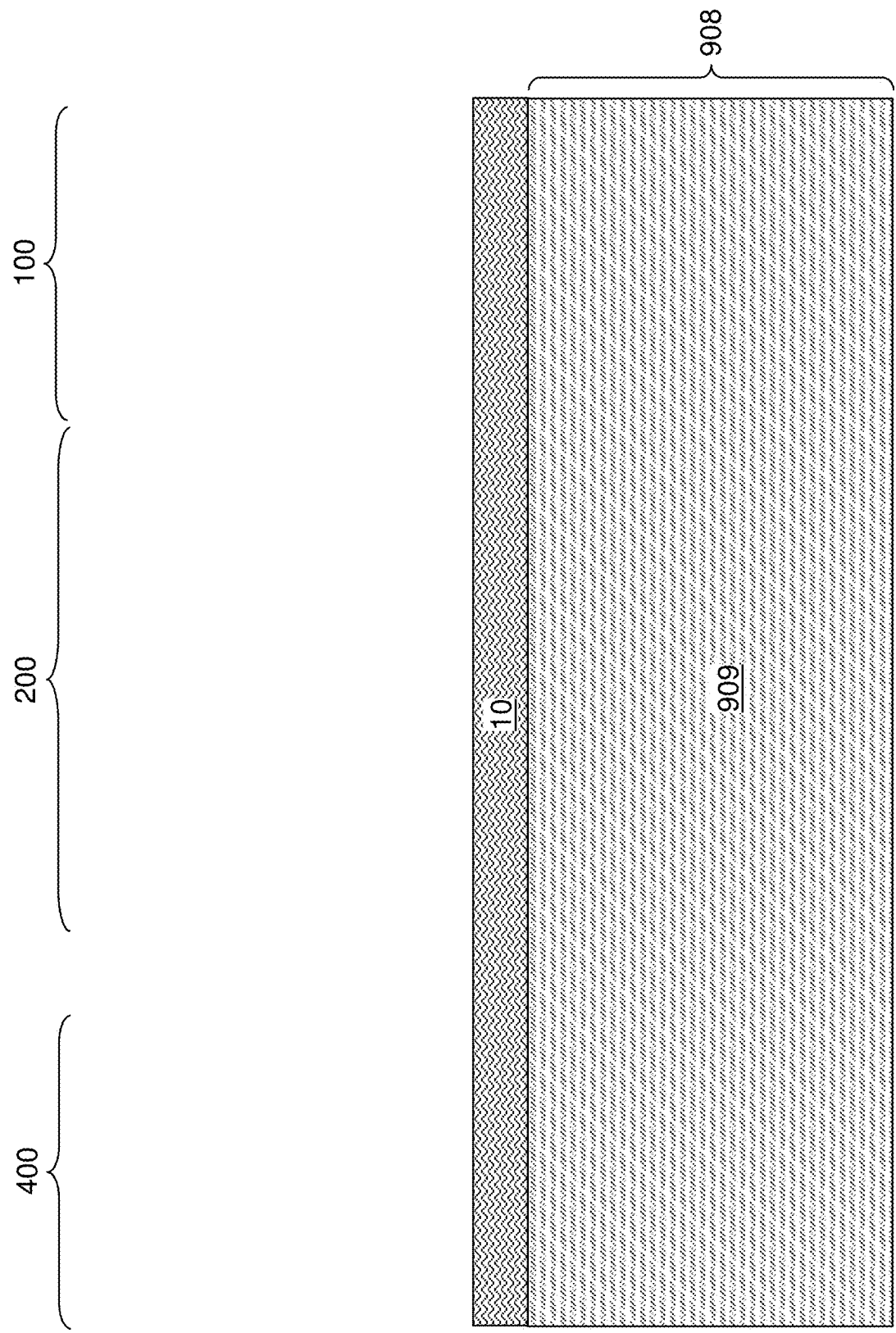

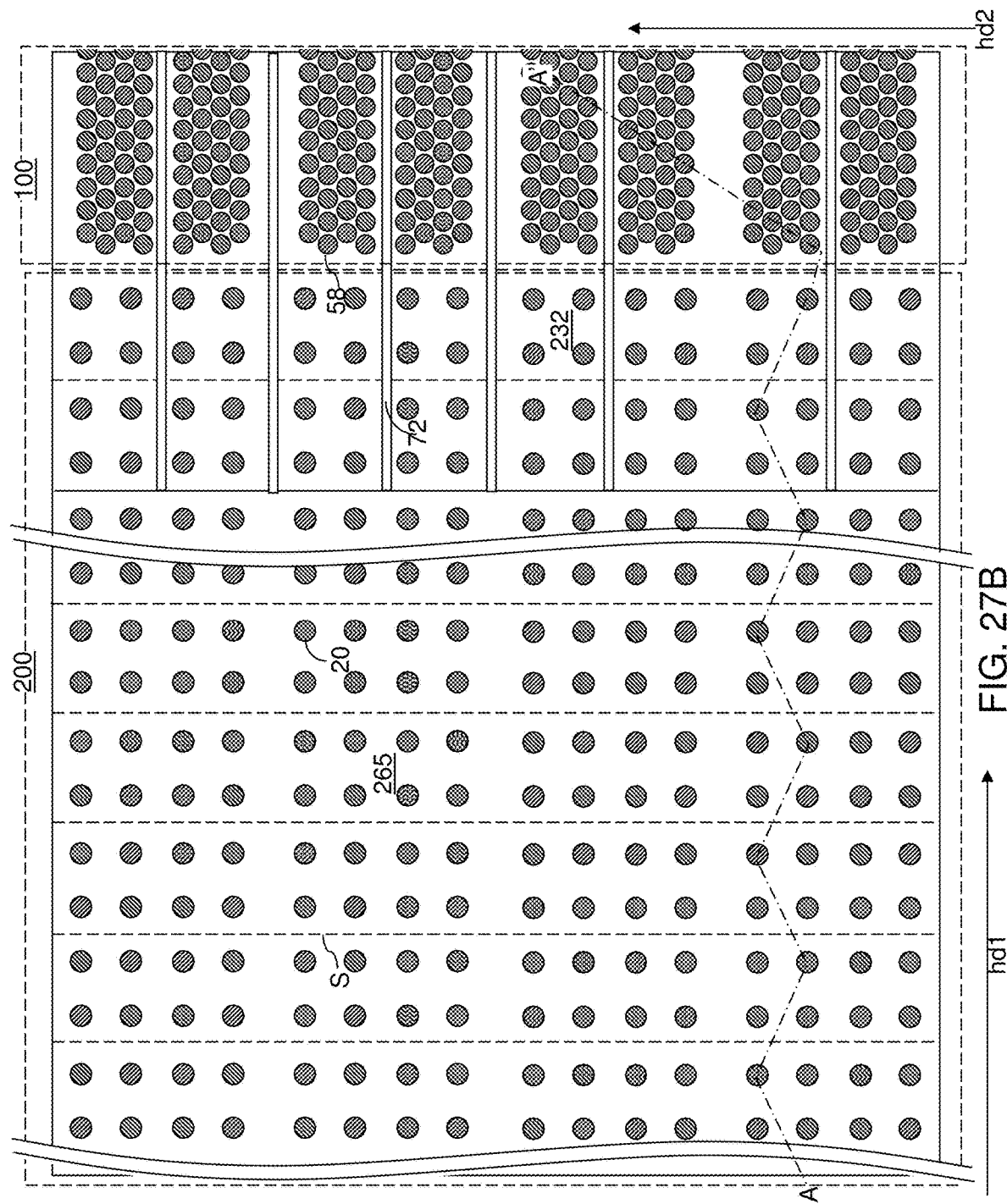

THREE-DIMENSIONAL MEMORY DEVICE INCLUDING LATERALLY SEPARATED SOURCE LINES AND METHOD OF MAKING THE SAME

FIELD

The present disclosure relates generally to the field of semiconductor devices, and particularly to a three-dimensional memory device including laterally separated source lines and methods of manufacturing the same.

BACKGROUND

Three-dimensional vertical NAND strings having one bit per cell are disclosed in an article by T. Endoh et al., titled "Novel Ultra High Density Memory With A Stacked-Surrounding Gate Transistor (S-SGT) Structured Cell", IEDM Proc. (2001) 33-36.

SUMMARY

According to an aspect of the present disclosure, a memory device includes a first memory block containing first word lines and a first source layer segment, and a second memory block containing second word lines and a second source layer segment which is electrically isolated from the first source layer segment. The first word lines in the first memory block are electrically connected to the respective second word lines in the second memory block.

According to another aspect of the present disclosure, a method of forming a memory device comprises forming a laterally alternating sequence of source layer segments and source isolation dielectric structures; forming a vertically alternating sequence of continuous insulating layers and continuous sacrificial material layers; forming memory openings through the vertically alternating sequence; forming memory opening fill structures in the memory openings, wherein each of the memory opening fill structures comprises a respective vertical stack of memory elements and a respective vertical semiconductor channel; dividing the vertically alternating sequence into in-process alternating stacks of insulating layers and sacrificial material layers by forming backside trenches that laterally extend along a first horizontal direction and laterally spaced apart along a second horizontal direction, and replacing the sacrificial material layers with electrically conductive layers to form alternating stacks of insulating layers and electrically conductive which are laterally spaced apart from each other by the backside trenches and which extend over at least one of the source isolation dielectric structures.

BRIEF DESCRIPTION OF THE DRAWINGS

FIG. 1C is a vertical cross-sectional view of the first exemplary structure along the vertical plane C-C' of FIG. 1B.

FIG. 5B is a top-down view of the first exemplary structure of FIG. 5A. The zig-zag vertical plane A-A' corresponds to the plane of the vertical cross-sectional view of FIG. 5A.

FIGS. 10A-10D are sequential vertical cross-sectional views of a pair of inter-tier memory openings during formation of a pair of memory opening fill structures according to the first embodiment of the present disclosure.

Figure 12A:
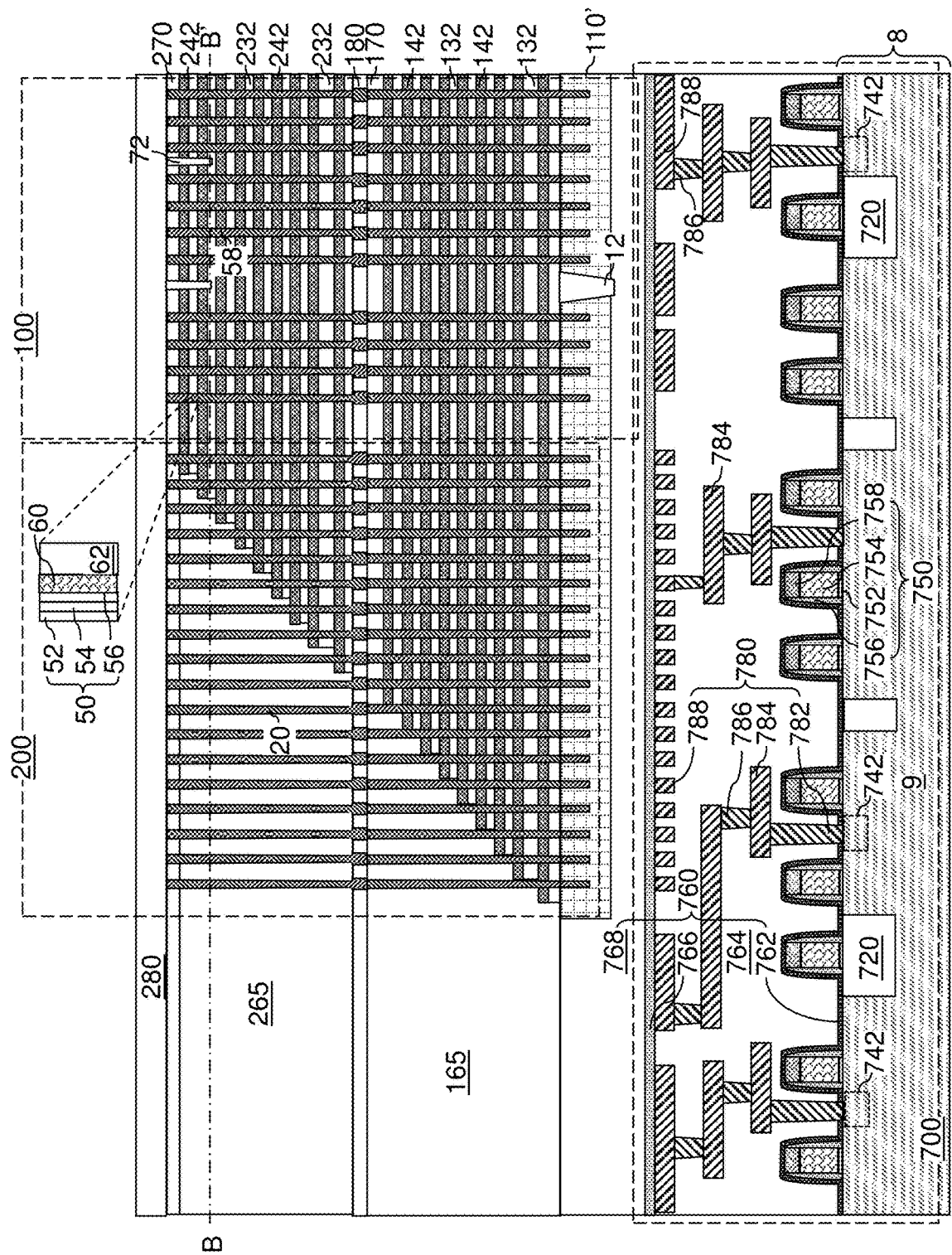
FIG. 12A is a vertical cross-sectional view of the first exemplary structure after formation of backside trenches according to the first embodiment of the present disclosure.

12A. The zig-zag vertical plane A-A' corresponds to the plane of the vertical cross-sectional view of FIG. 12A.

Figure 12B:
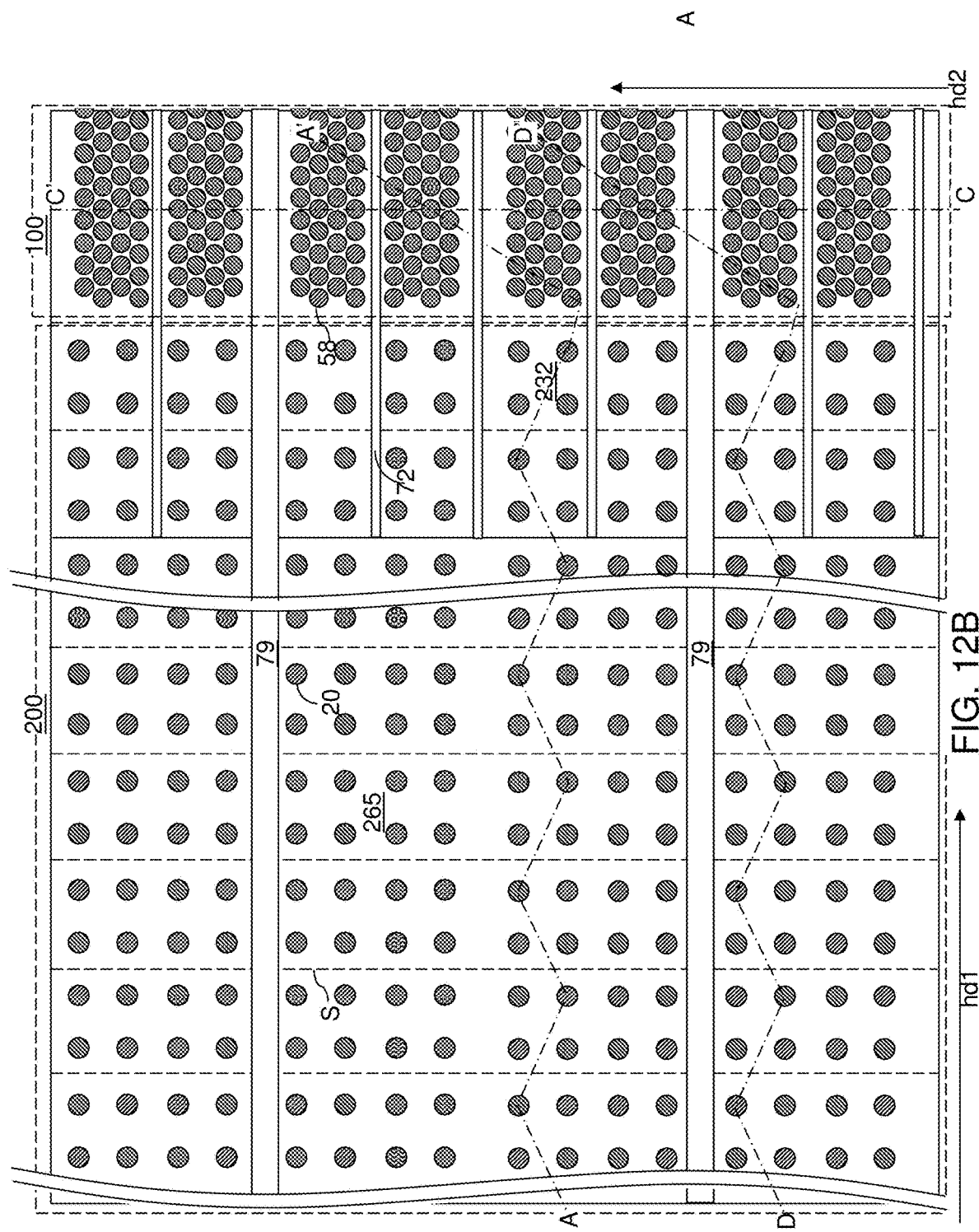
FIG. 12B is a horizontal cross-sectional of the first exemplary structure along the horizontal plane B-B' of FIG.
Figure 12C:
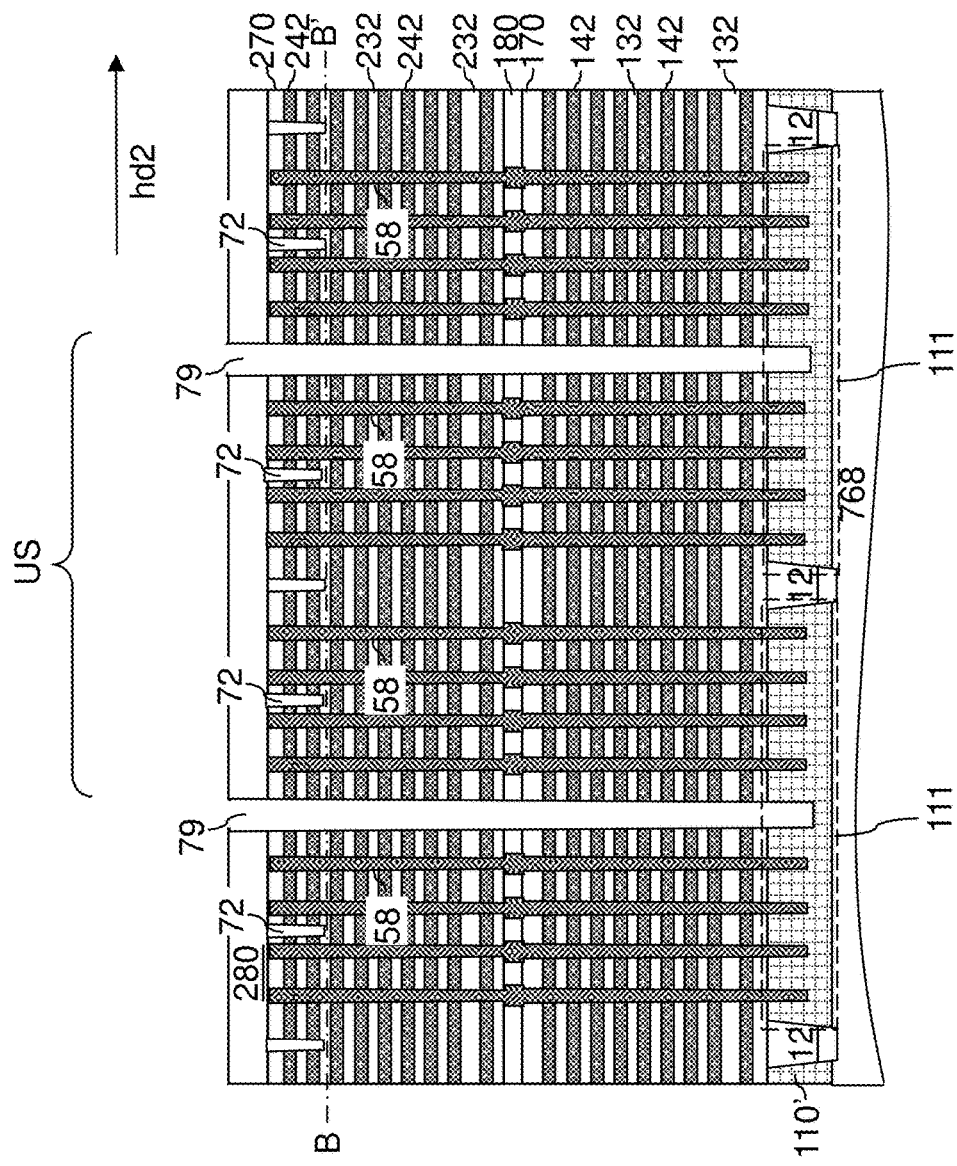

FIG. 12C is a vertical cross-sectional view of the first exemplary structure along the vertical plane C-C' of FIG. 12B.

Figure 12D:
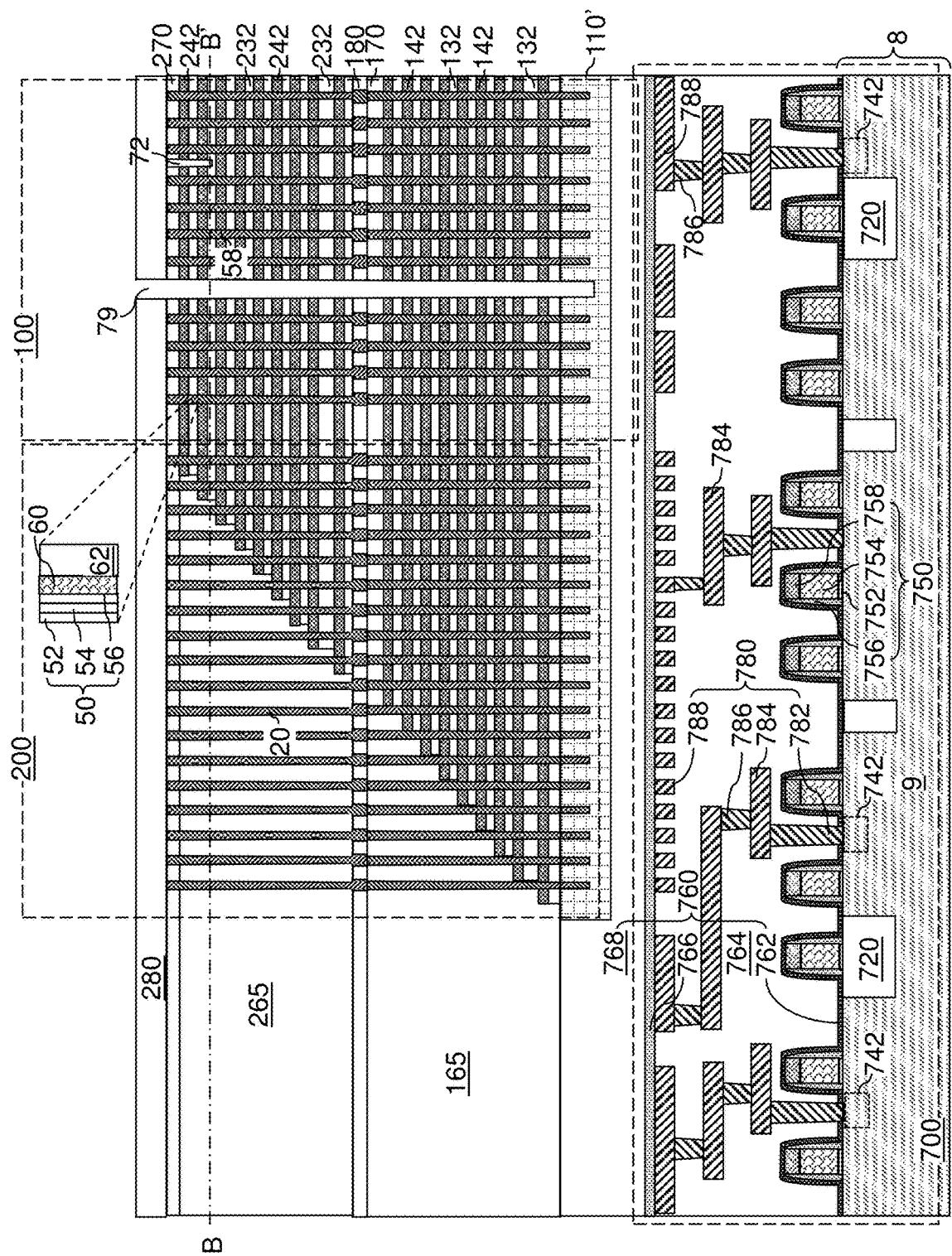

FIG. 12D is a vertical cross-sectional view of the first exemplary structure along the zig-zag vertical plane C-C' of FIG. 12B.

FIGS. 13A-13E illustrate sequential vertical cross-sectional views of a region of the first exemplary structure during formation of a source-level material layers according to the first embodiment of the present disclosure.

Figure 14A:
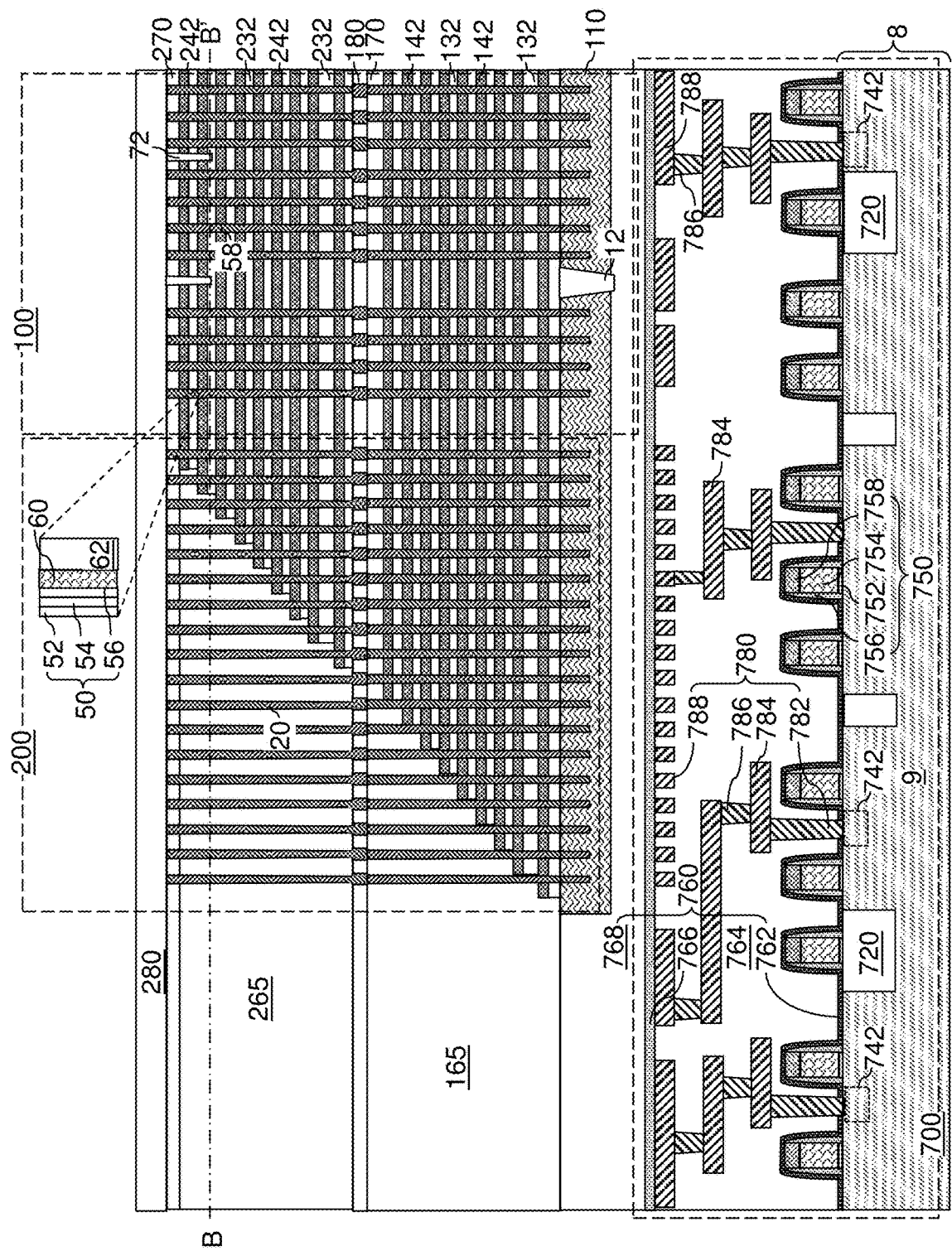

FIG. 14A is a vertical cross-sectional view of the first exemplary structure after formation of the source-level material layers according to the first embodiment of the present disclosure.

Figure 14B:
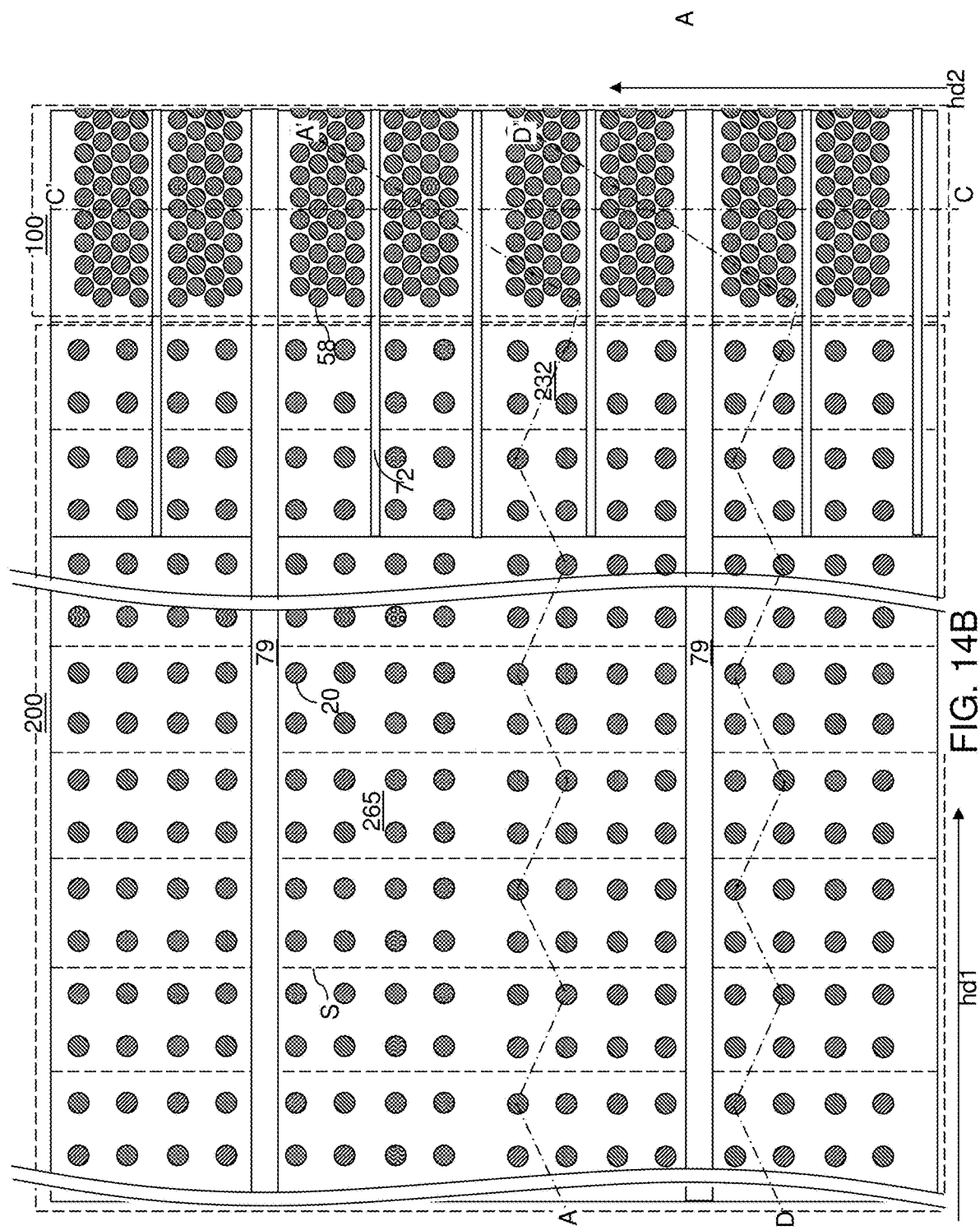

FIG. 14B is a horizontal cross-sectional of the first exemplary structure along the horizontal plane B-B' of FIG. 14A. The zig-zag vertical plane A-A' corresponds to the plane of the vertical cross-sectional view of FIG. 14A.

Figure 14C:
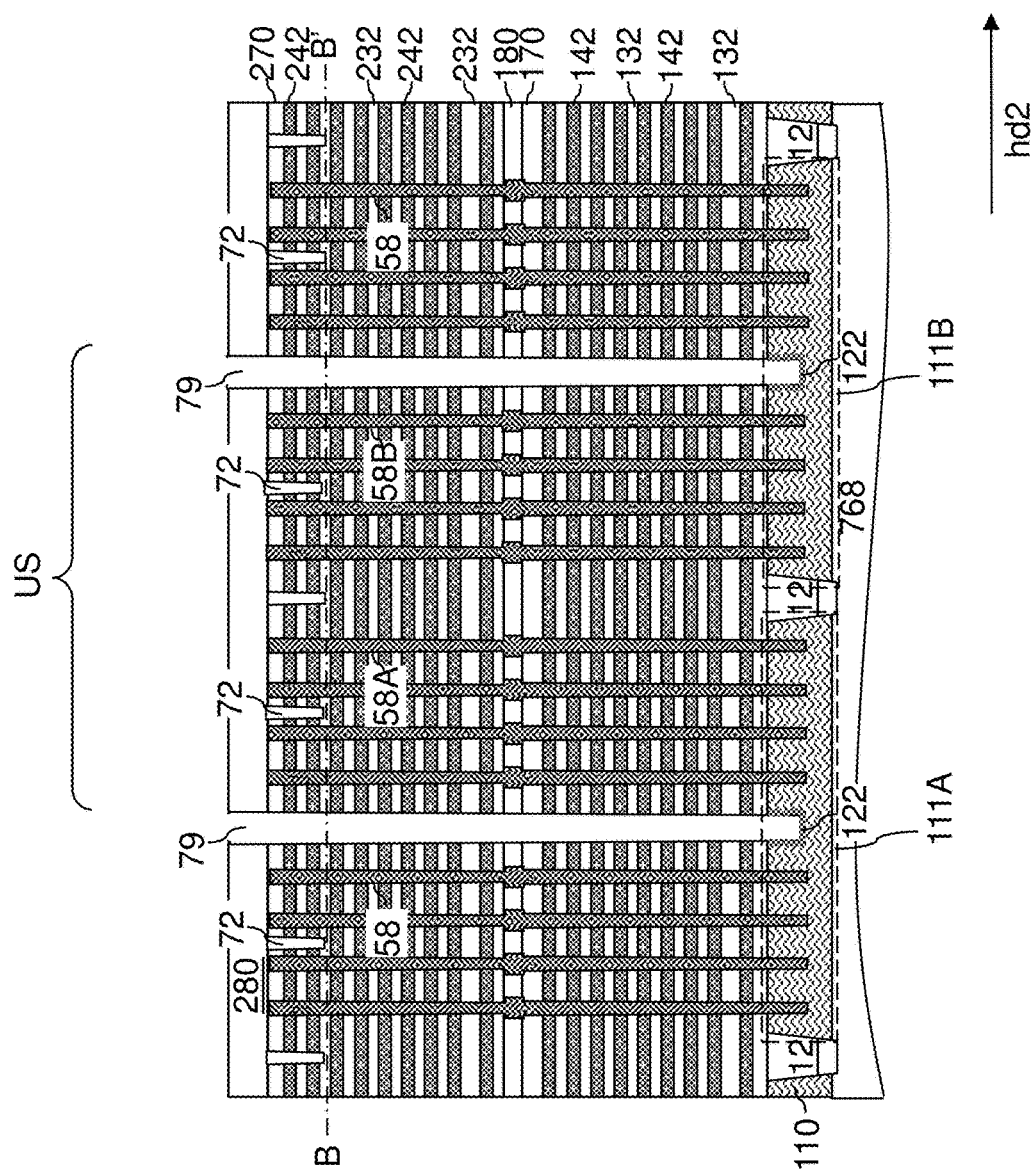

FIG. 14C is a vertical cross-sectional view of the first exemplary structure along the vertical plane C-C' of FIG. 14B.

Figure 14D:
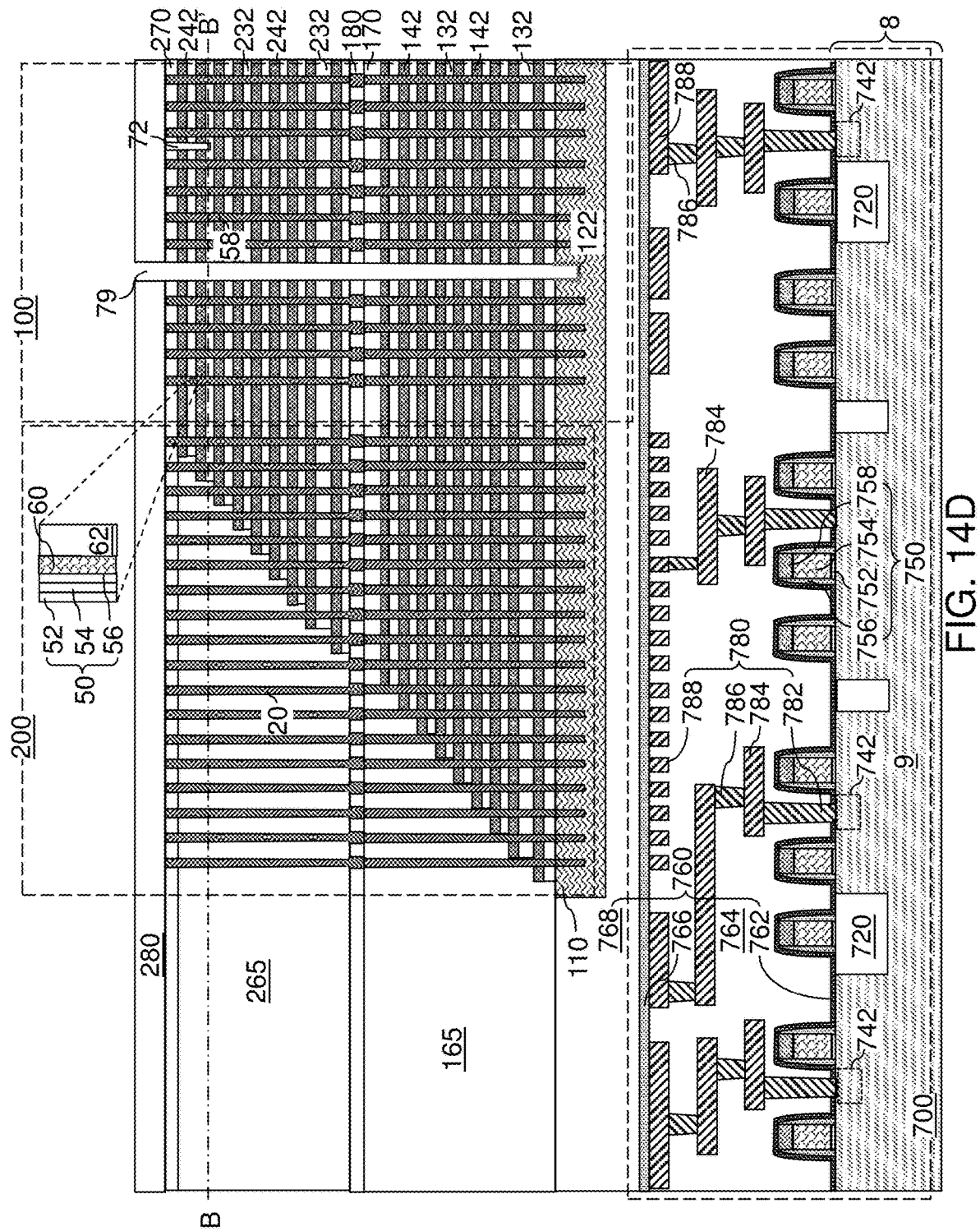

FIG. 14D is a vertical cross-sectional view of the first exemplary structure along the zig-zag vertical plane C-C' of FIG. 14B.

Figure 15:
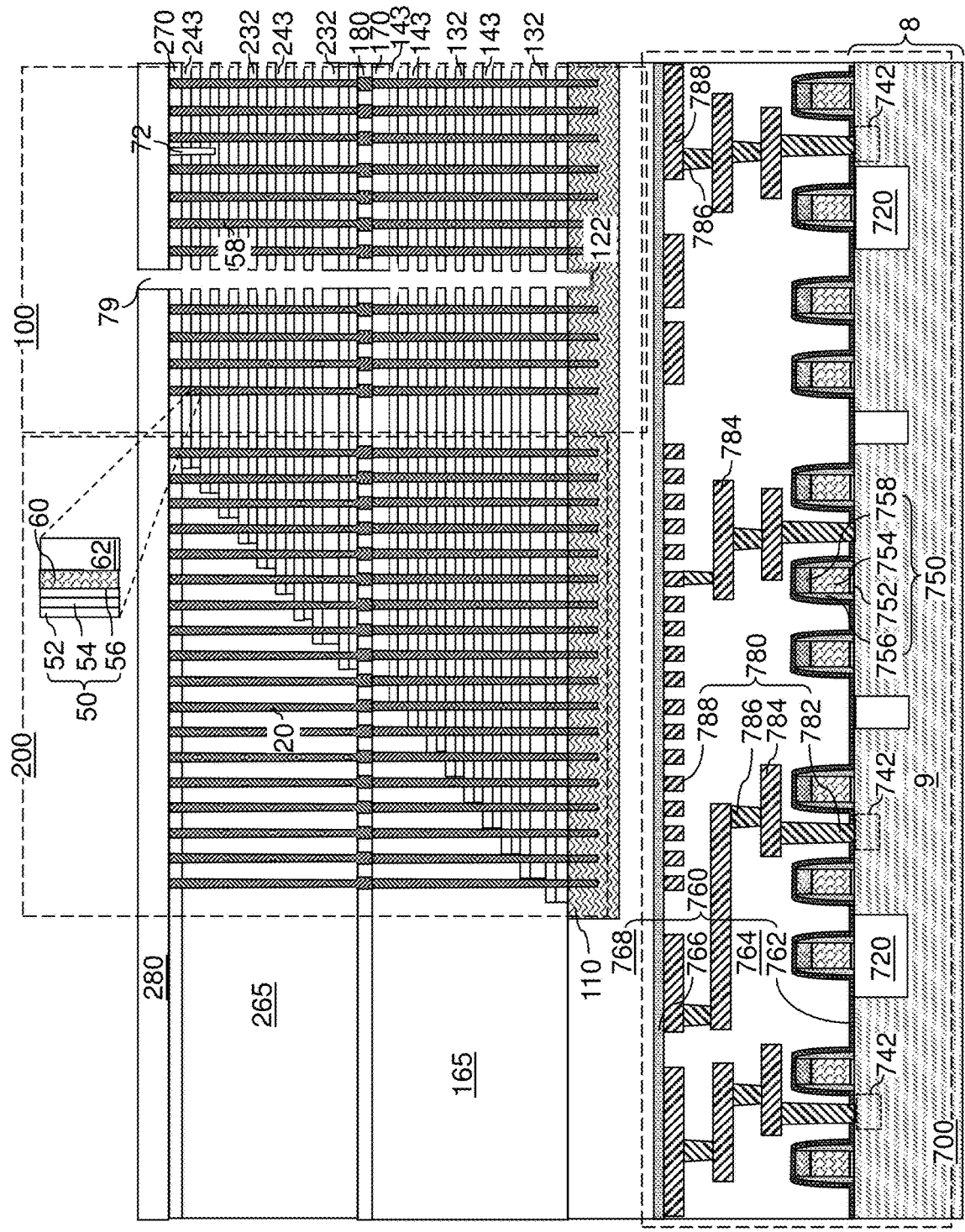

FIG. 15 is a vertical cross-sectional view of the first exemplary structure after formation of backside recesses according to the first embodiment of the present disclosure.

Figure 16A:
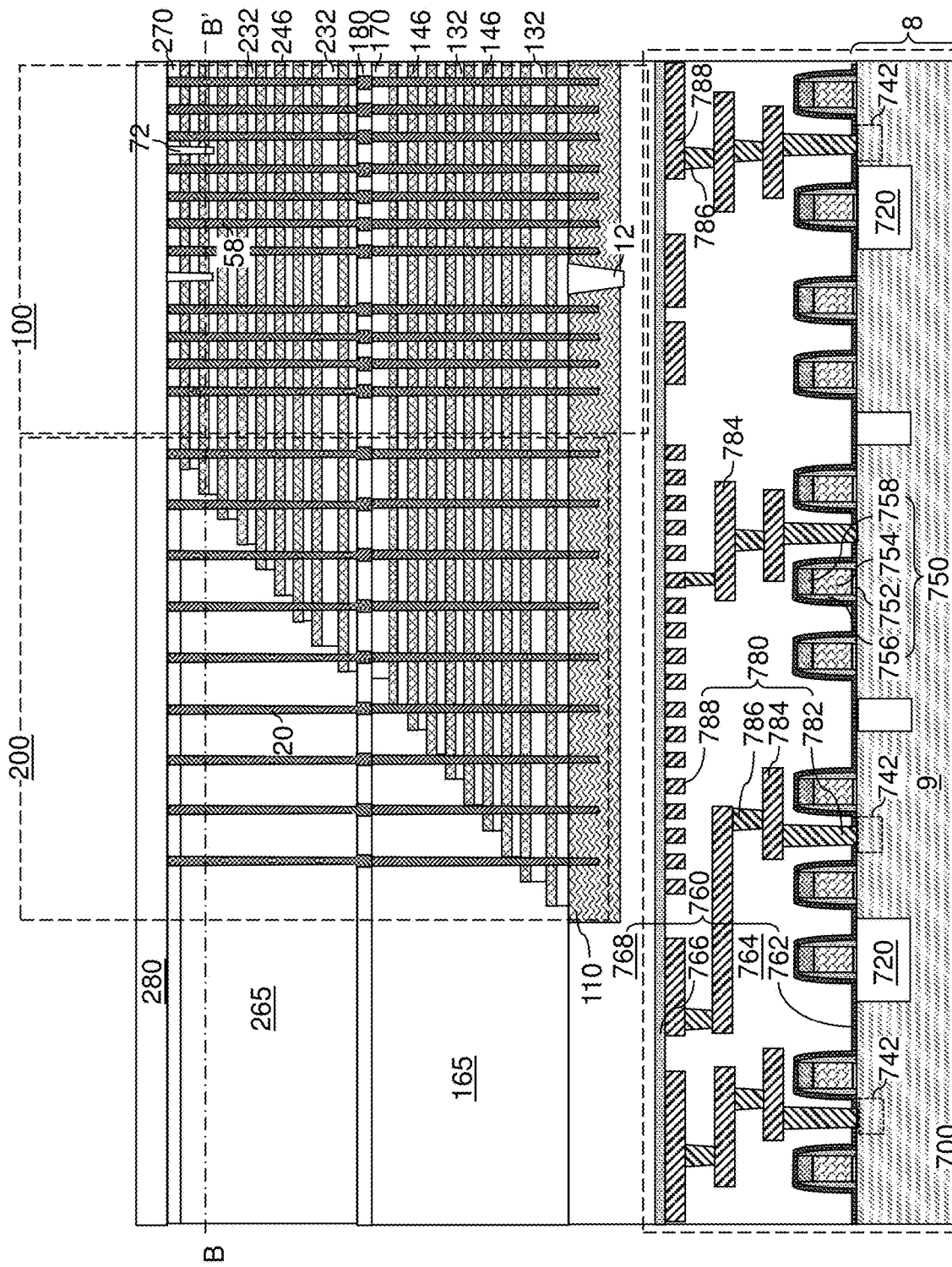

FIG. 16A is a vertical cross-sectional view of the first exemplary structure after formation of electrically conductive layers in the backside recesses according to the first embodiment of the present disclosure.

FIG. 16B is a horizontal cross-sectional view of the first exemplary structure along the horizontal plane B-B' of FIG. 16A. The zig-zag vertical plane A-A' corresponds to the plane of the vertical cross-sectional view of FIG. 16A.

Figure 16C:
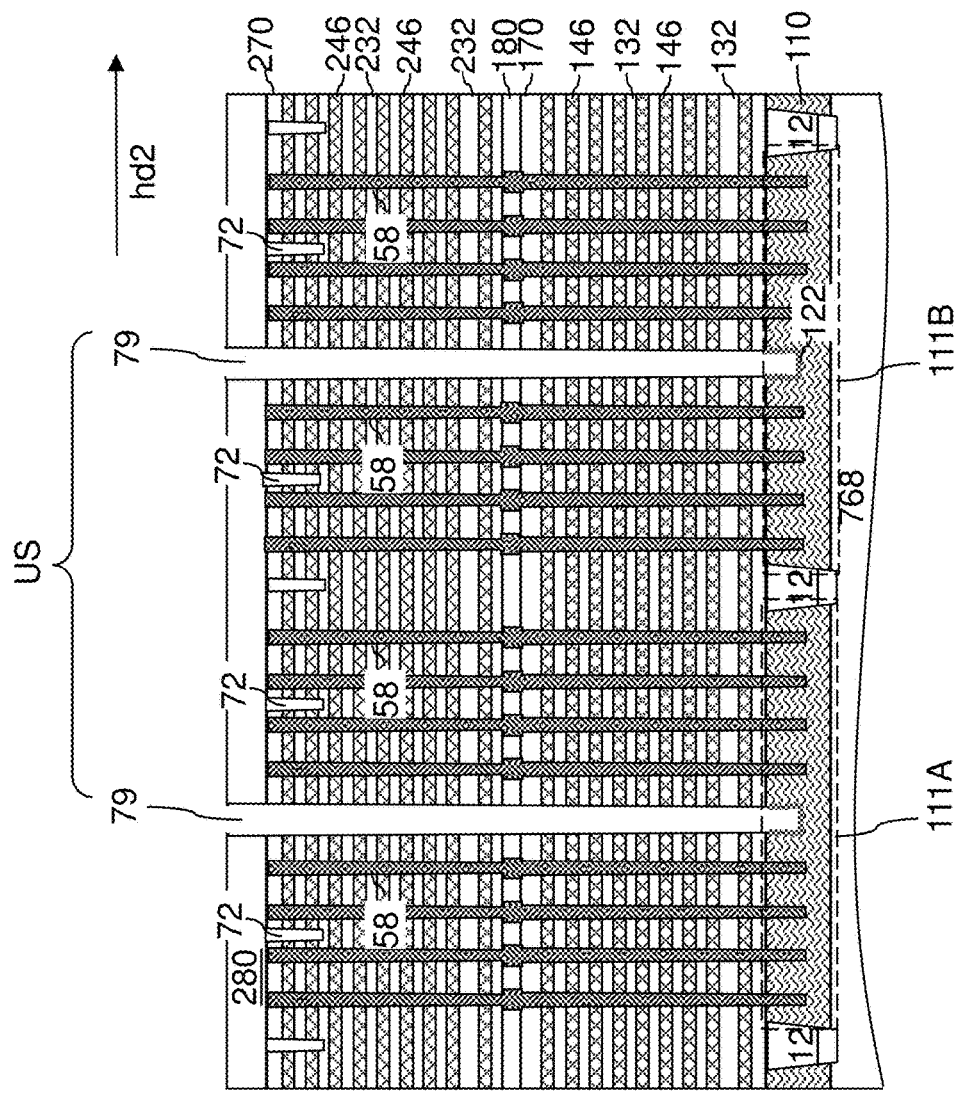

FIG. 16C is a vertical cross-sectional view of the first exemplary structure along the vertical plane C-C' of FIG. 16B.

Figure 16D:
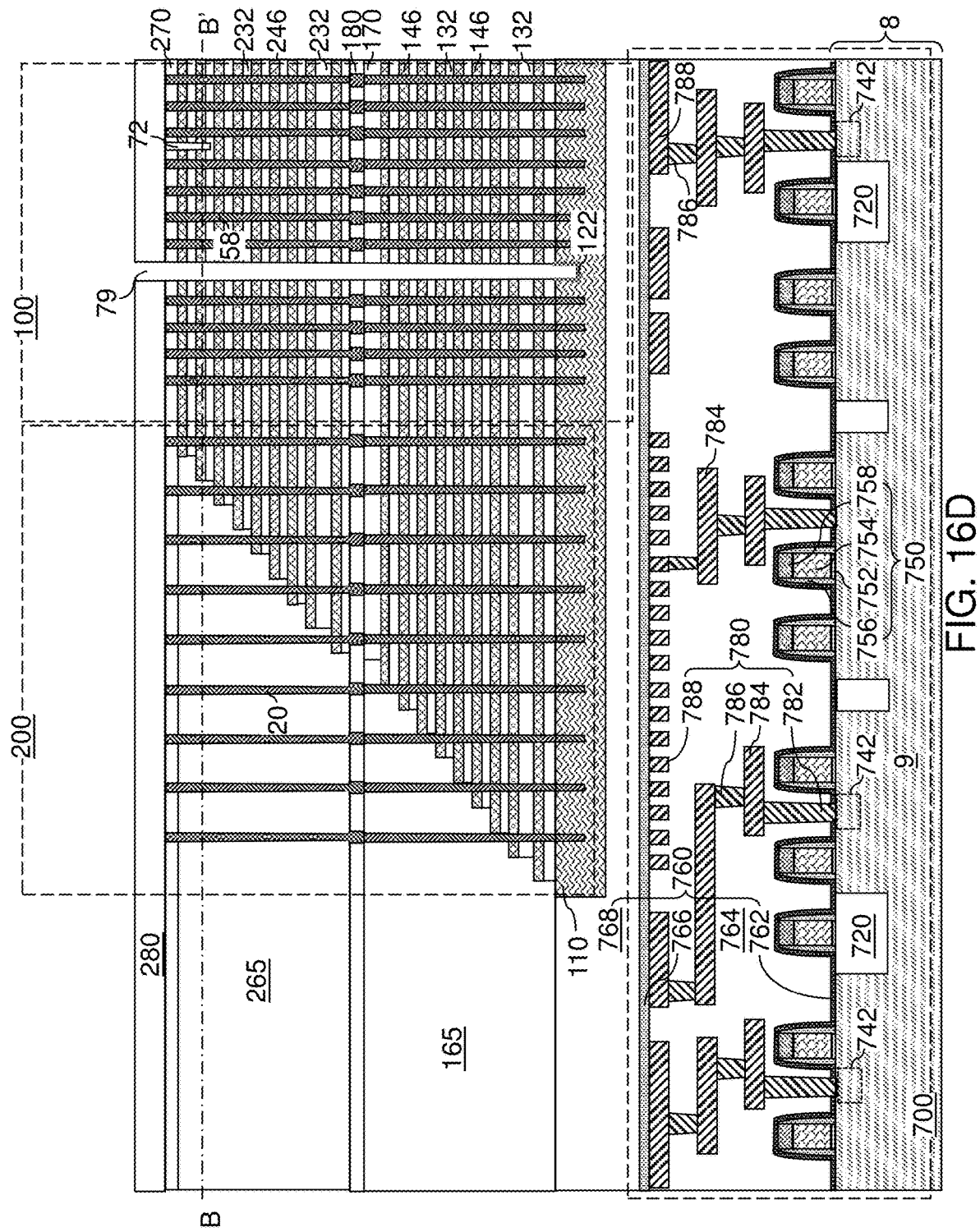

FIG. 16D is a vertical cross-sectional view of the first exemplary structure along the zig-zag vertical plane C-C' of FIG. 16B.

Figure 17A:
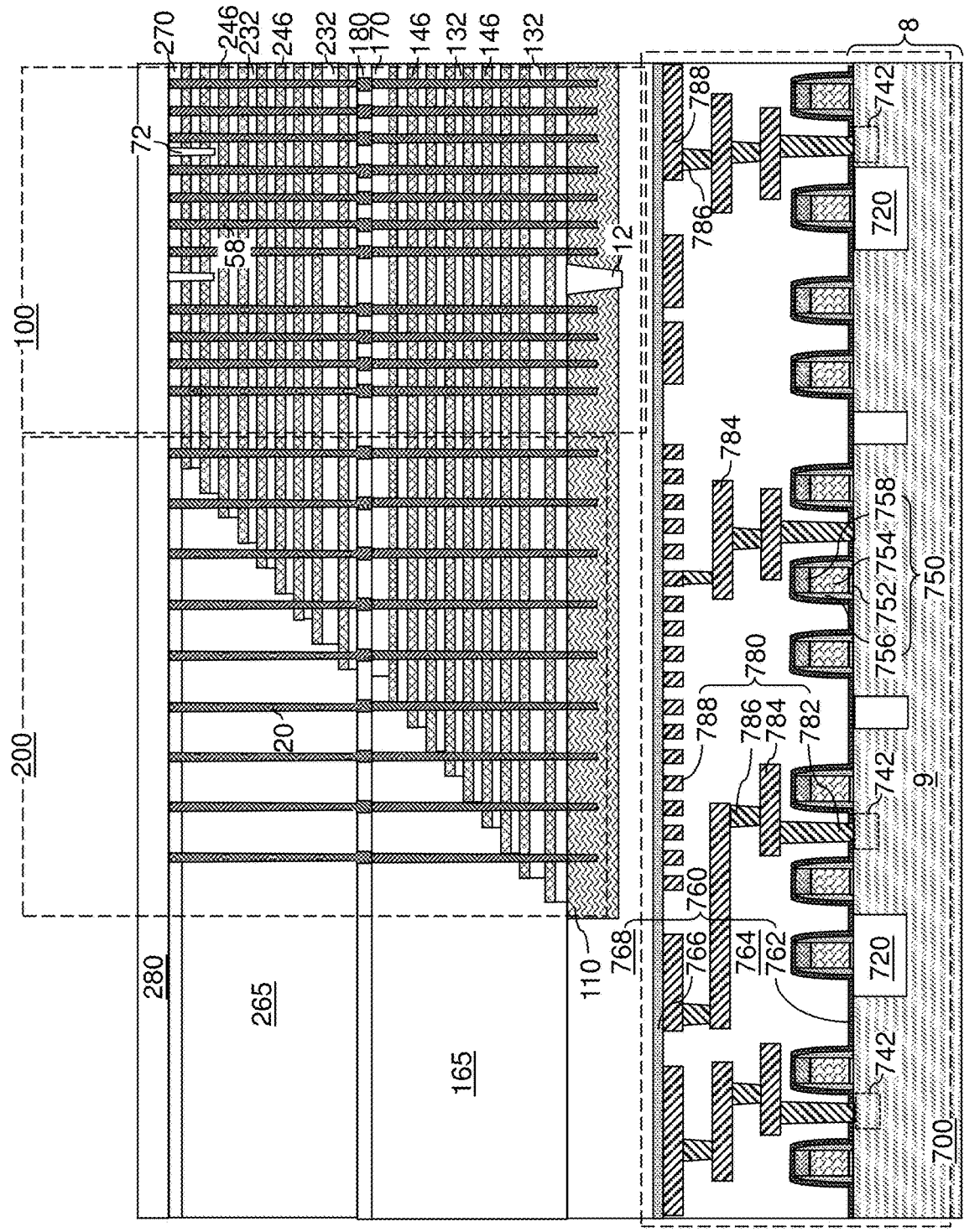

FIG. 17A is a vertical cross-sectional view of the first exemplary structure after formation of backside trench fill structures in the backside trenches according to the first embodiment of the present disclosure.

Figure 17B:
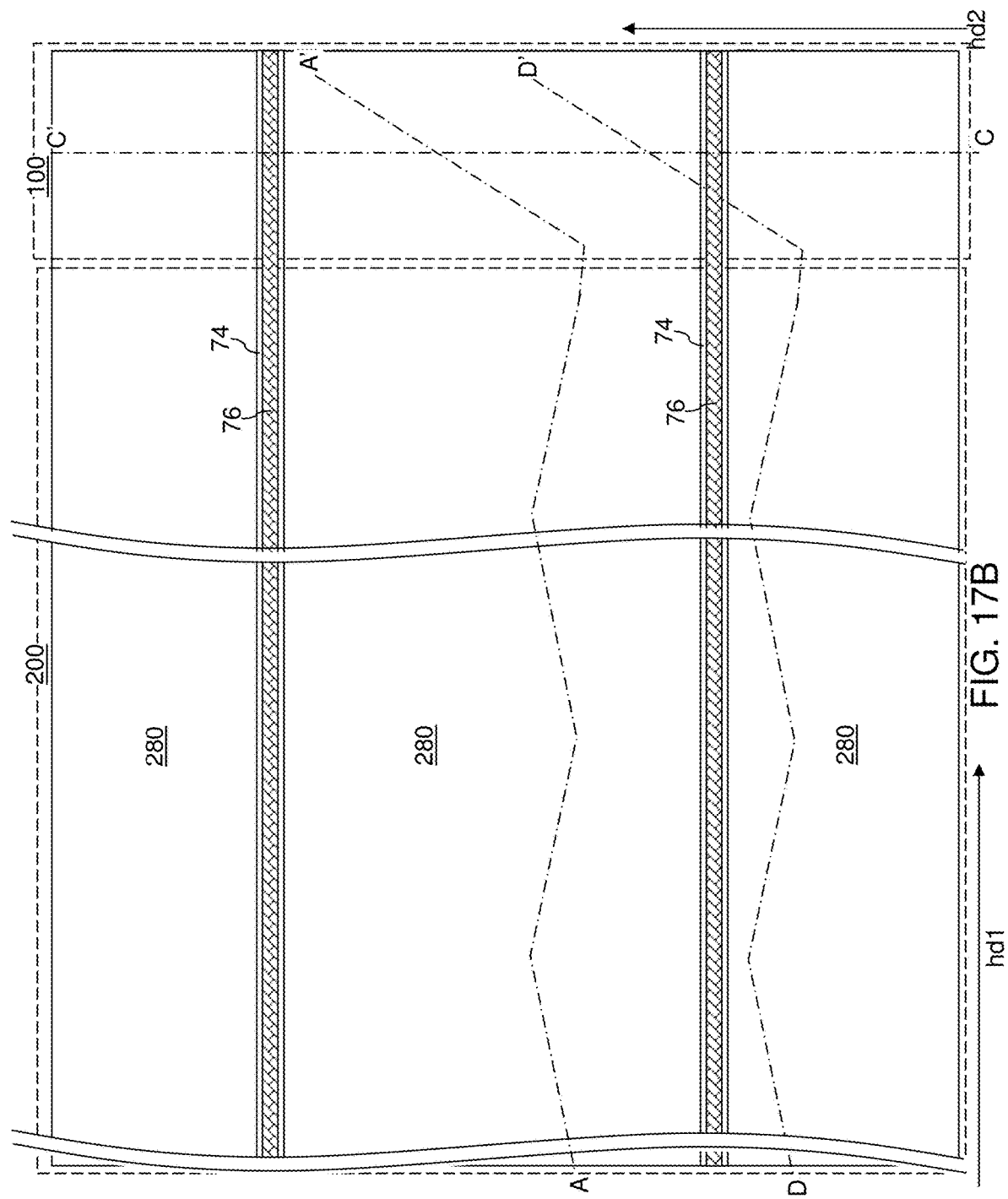

FIG. 17B is a horizontal cross-sectional view of the first exemplary structure along the horizontal plane B-B' of FIG. 17A. The zig-zag vertical plane A-A' corresponds to the plane of the vertical cross-sectional view of FIG. 17A.

Figure 17C:
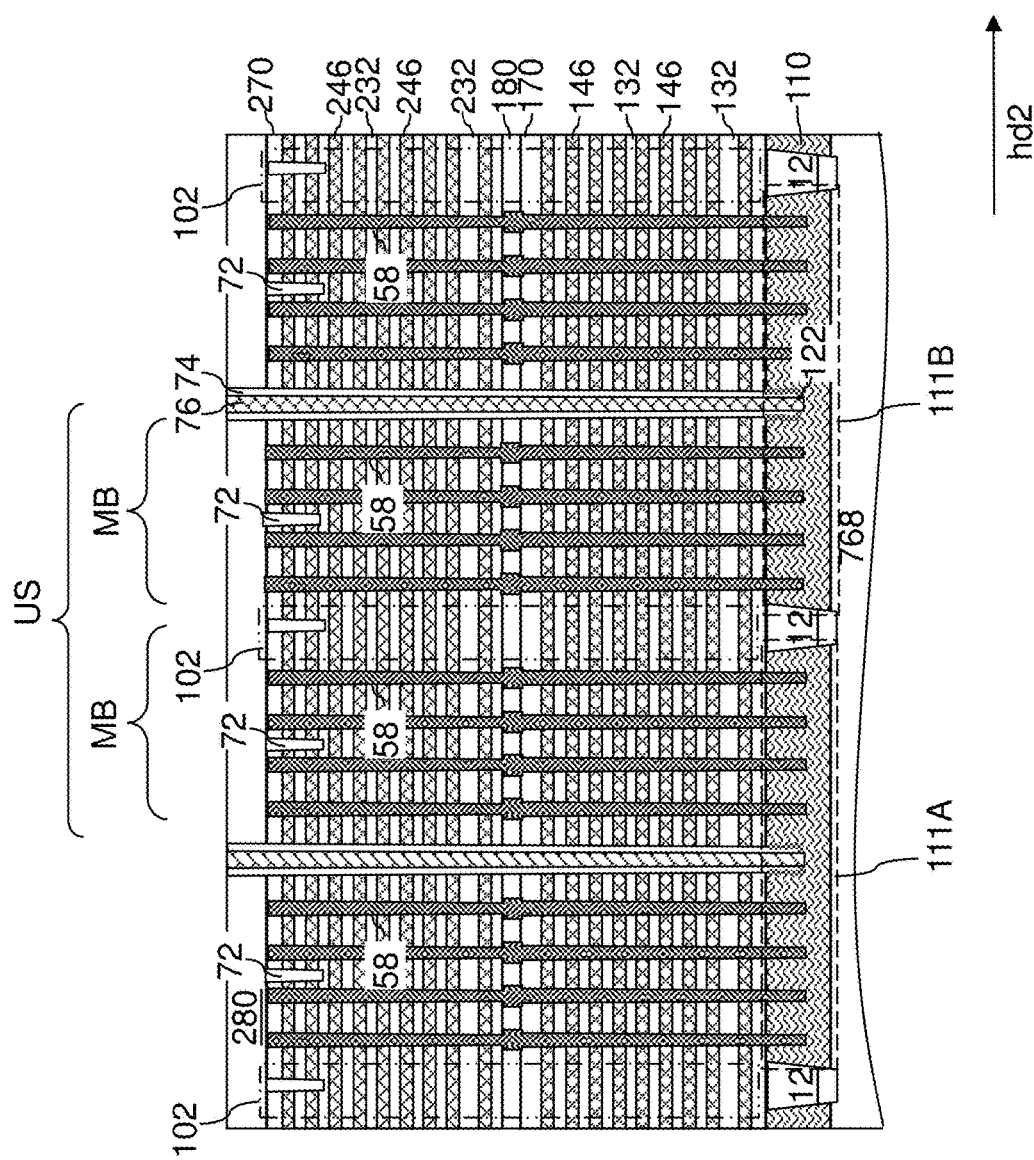

FIG. 17C is a vertical cross-sectional view of the first exemplary structure along the vertical plane C-C' of FIG. 17B.

Figure 17D:
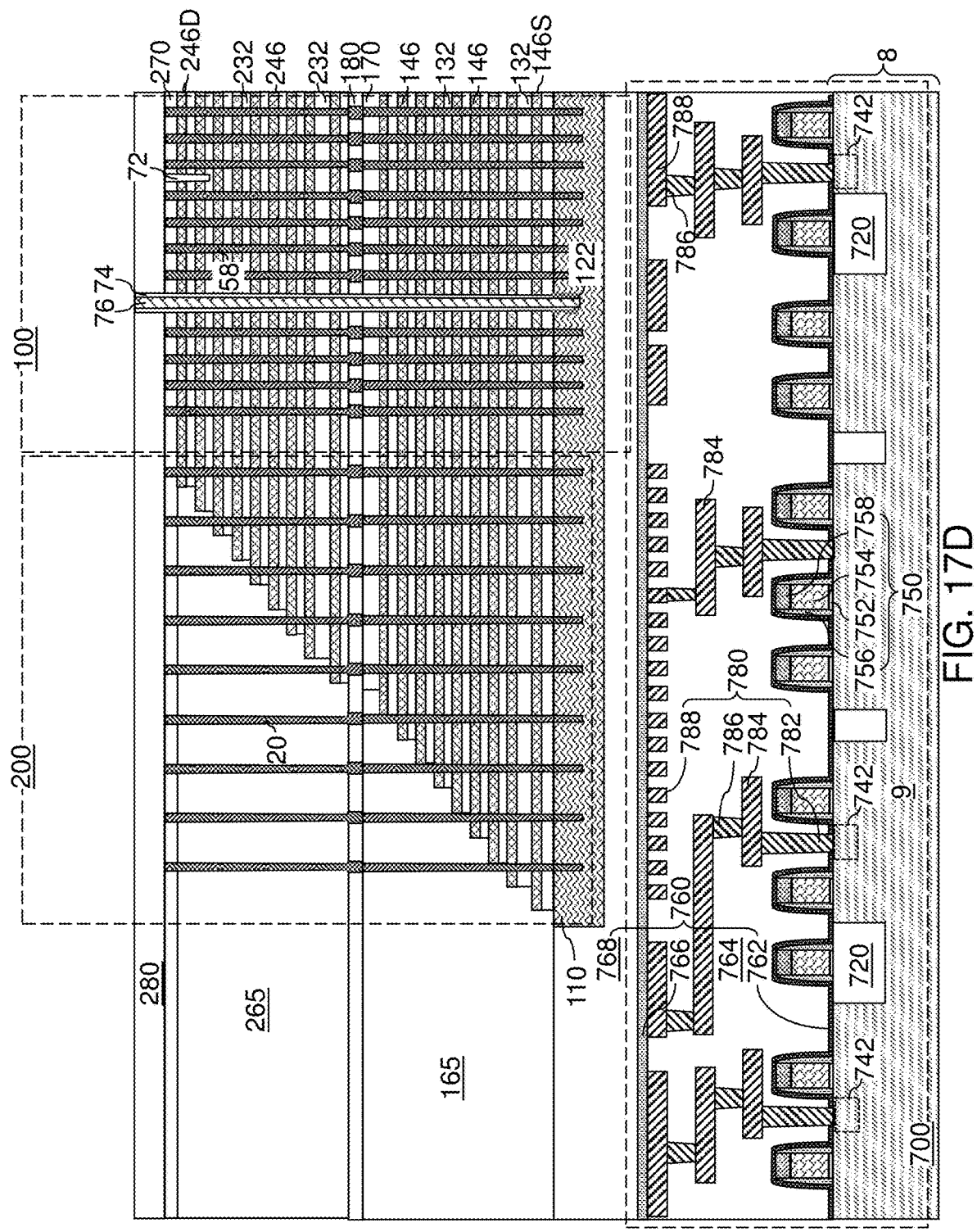

FIG. 17D is a vertical cross-sectional view of the first exemplary structure along the zig-zag vertical plane D-D' of FIG. 17B.

Figure 17E:
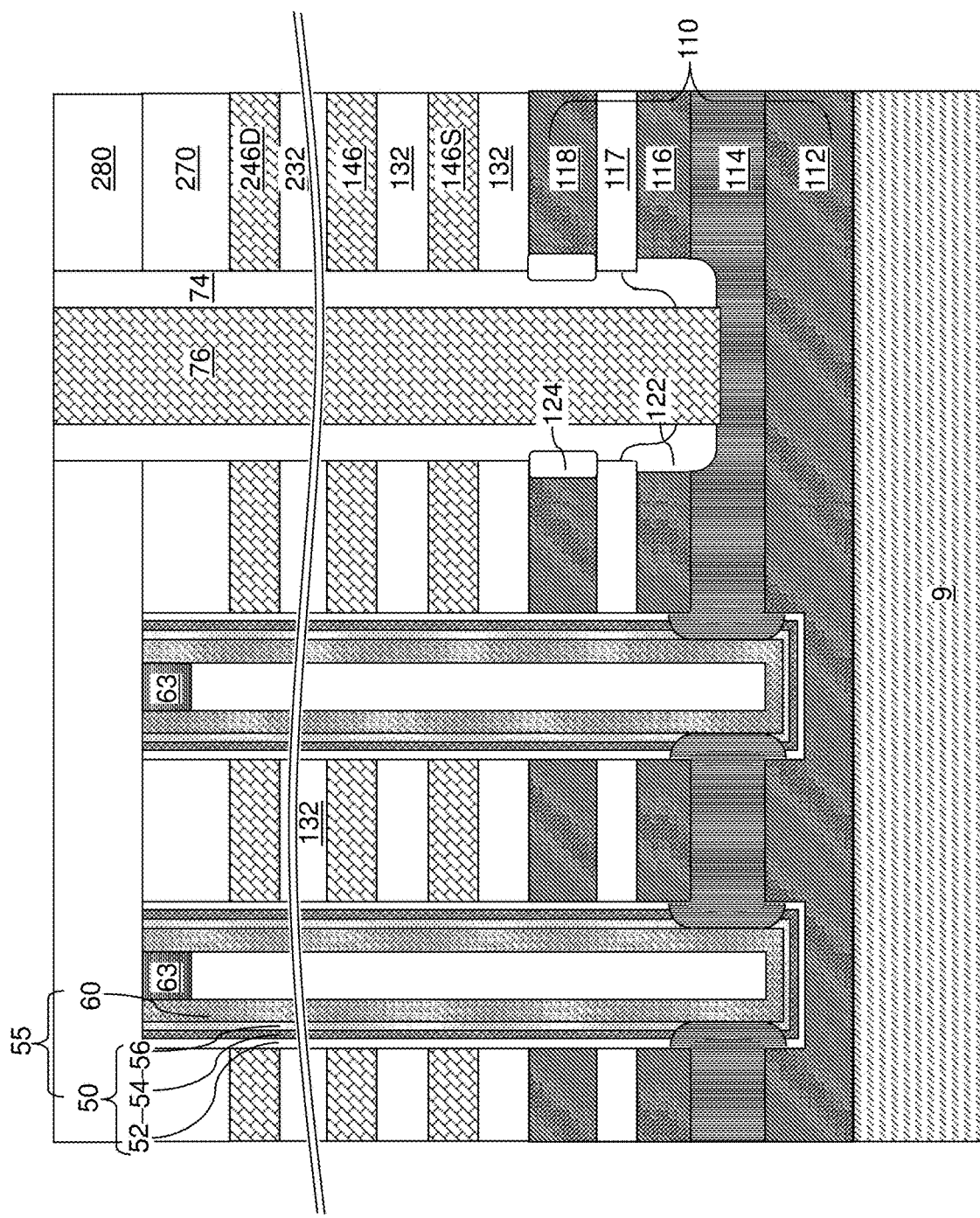

FIG. 17E is a vertical cross-sectional view of a region of the first exemplary structure of FIGS. 17A-17D.

Figure 17F:
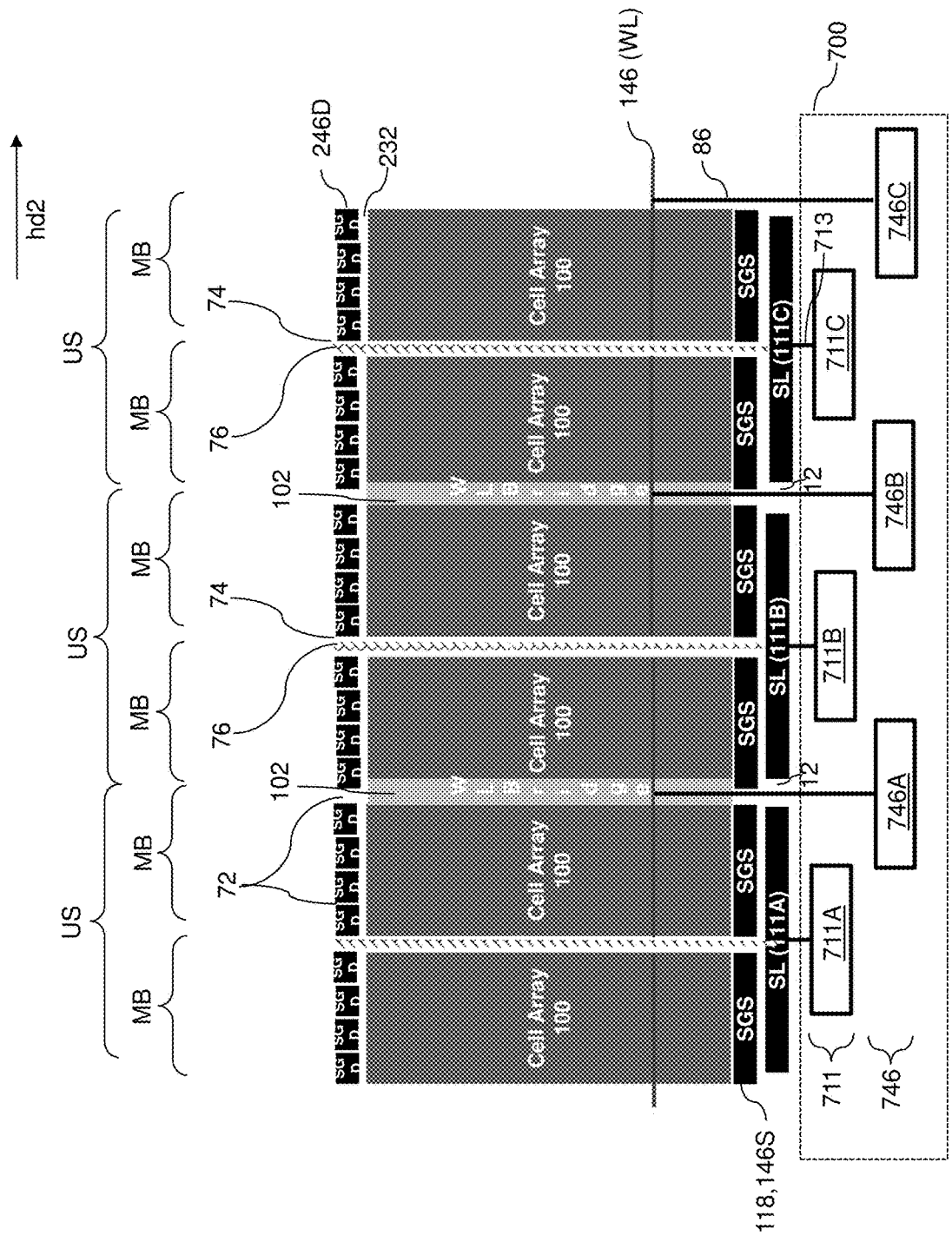

FIG. 17F is a schematic block diagram of the first exemplary structure shown in FIG. 17C.

Figure 17G:
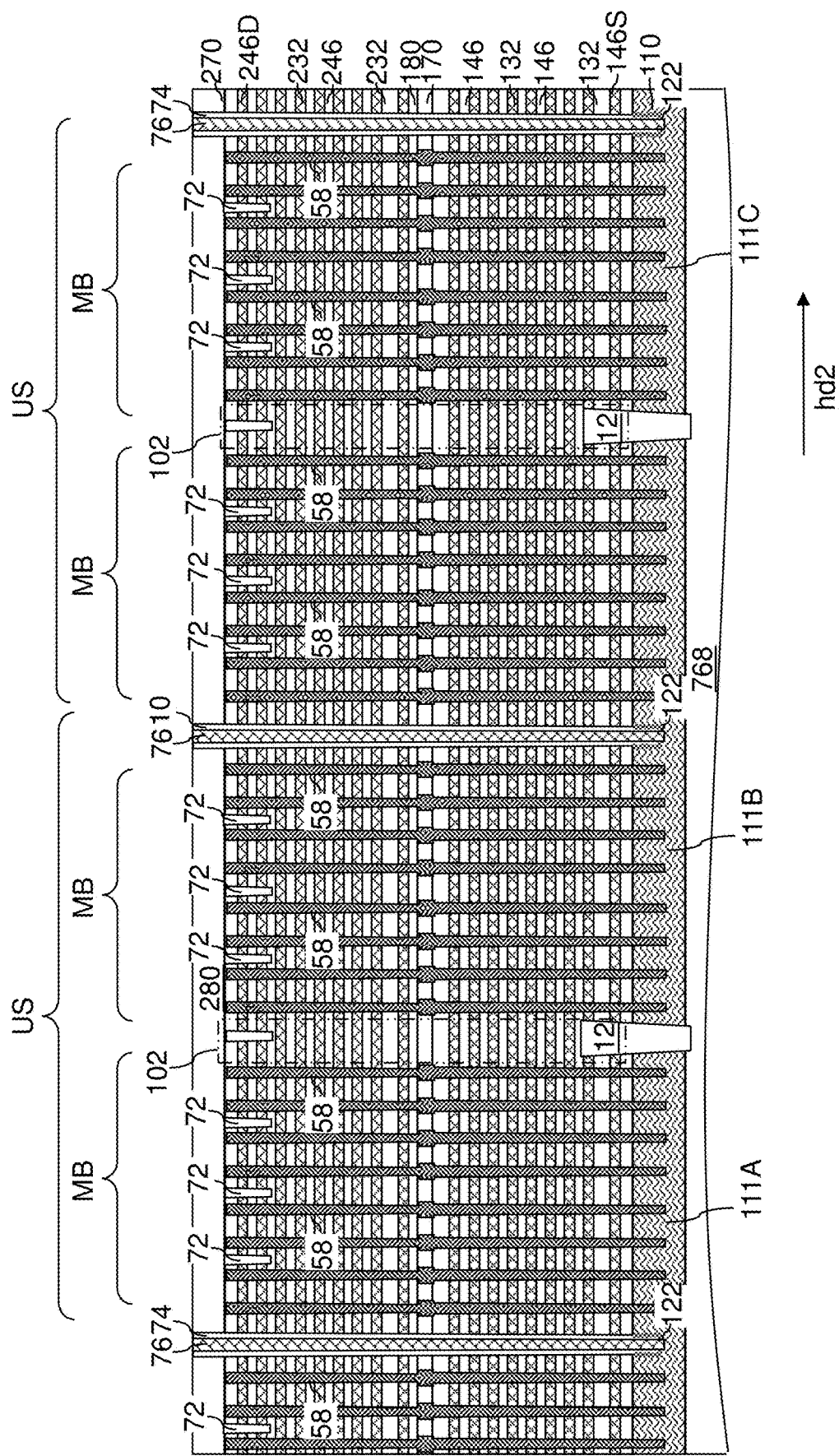

FIG. 17G is a vertical cross-sectional view of an alternative configuration of the first exemplary structure.

Figure 18A:
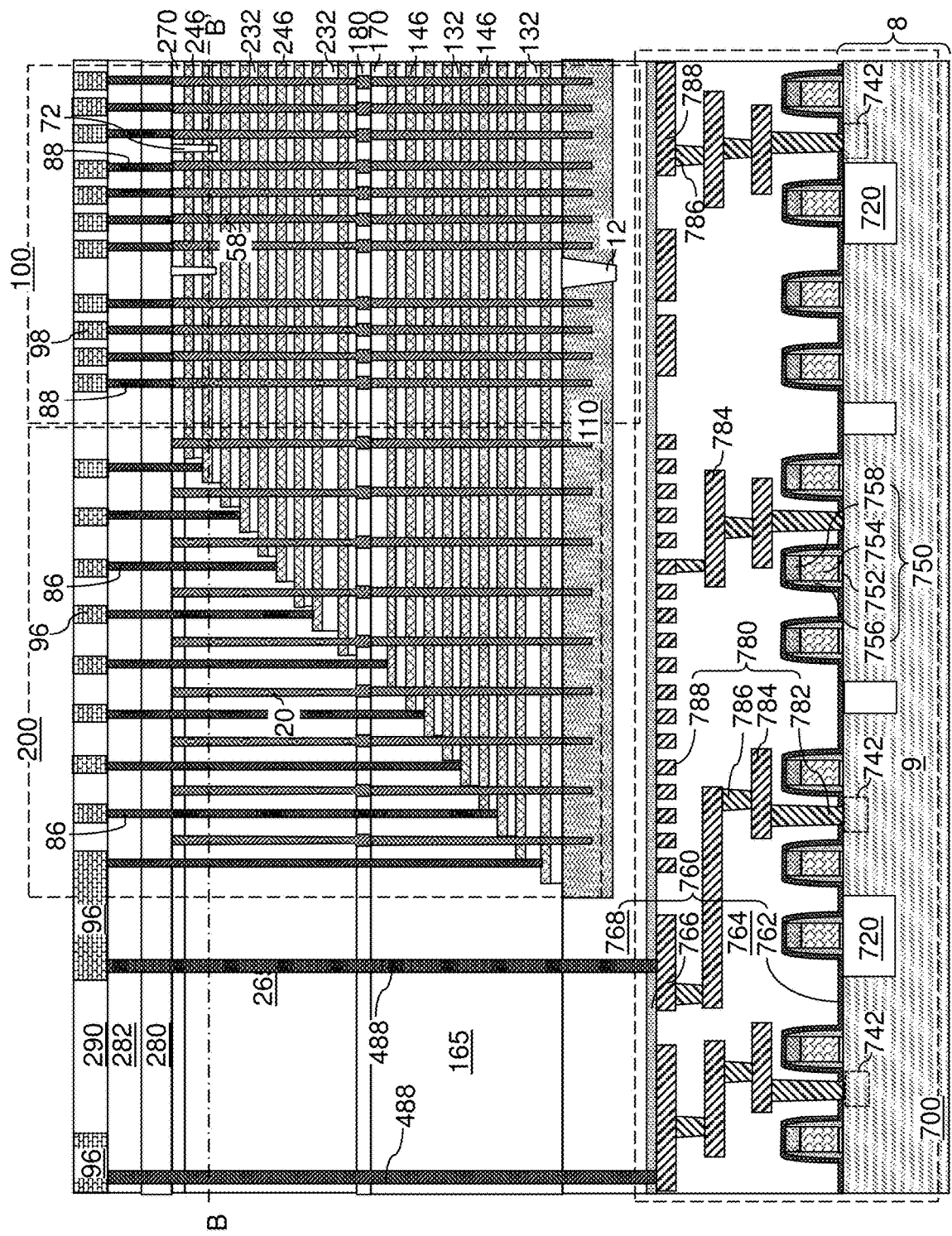

FIG. 18A is a vertical cross-sectional view of the first exemplary structure after formation of contact via structures and upper-level metal interconnect structures according to the first embodiment of the present disclosure.

Figure 18B:
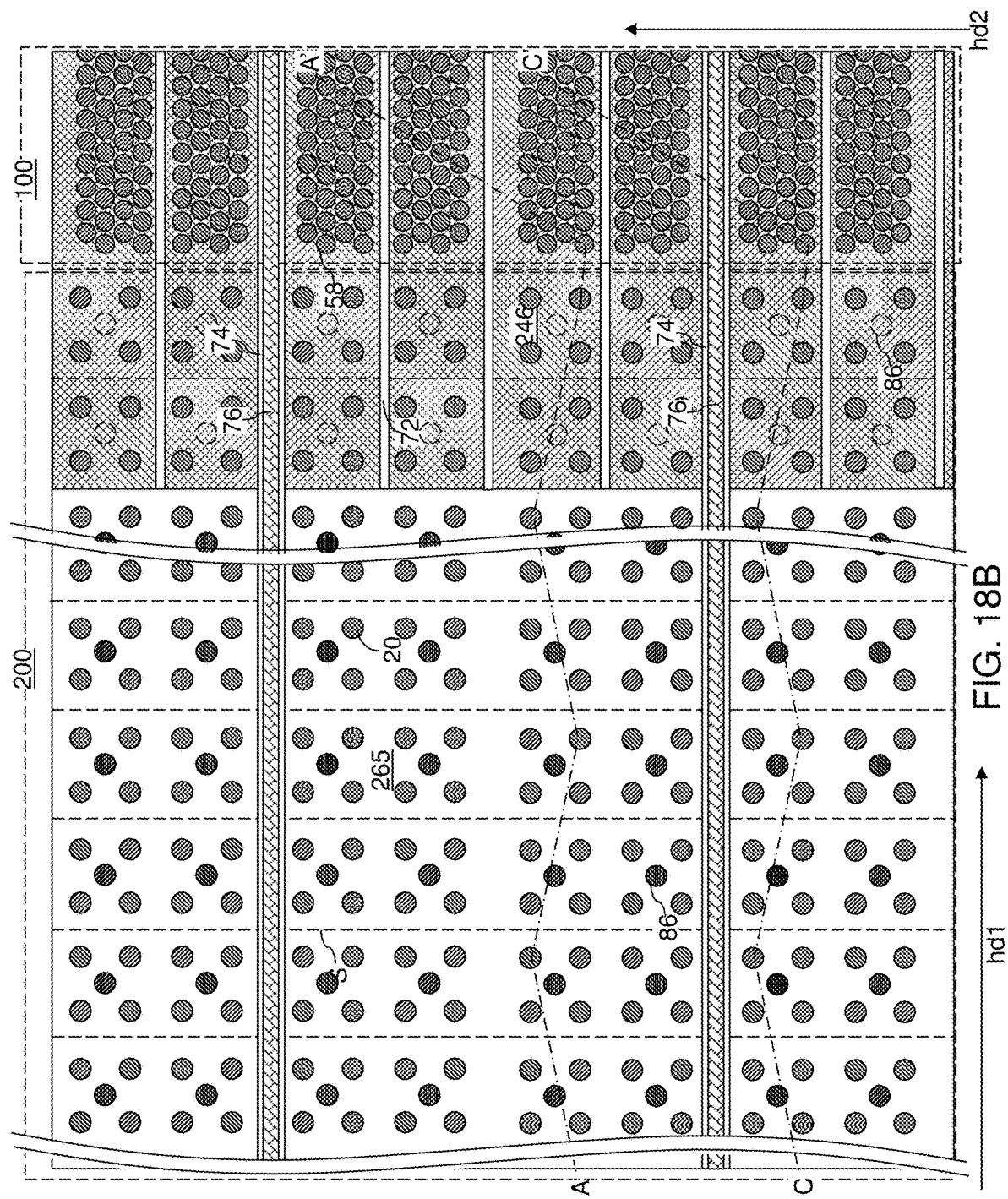

FIG. 18B is a horizontal cross-sectional view of the first exemplary structure along the horizontal plane B-B' of FIG. 18A. The zig-zag vertical plane A-A' corresponds to the plane of the vertical cross-sectional view of FIG. 18A.

Figure 18C:
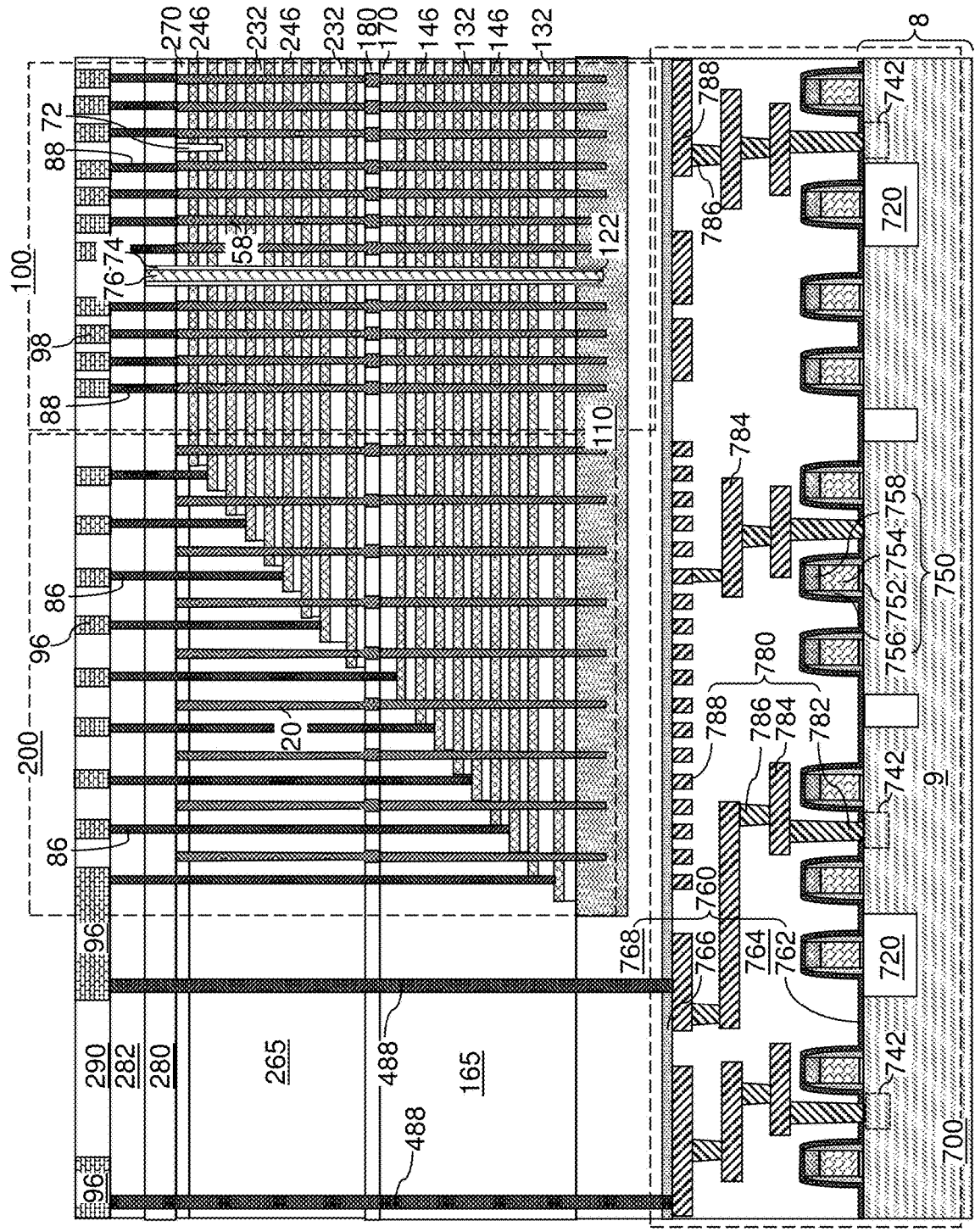

FIG. 18C is a vertical cross-sectional view of the first exemplary structure along the zig-zag vertical plane C-C' of FIG. 18B.

FIG. 19 is a vertical cross-sectional view of a second exemplary structure after formation of in-process source-level material layers and source-isolation dielectric structures on a substrate according to a second embodiment of the present disclosure.

Figure 20:
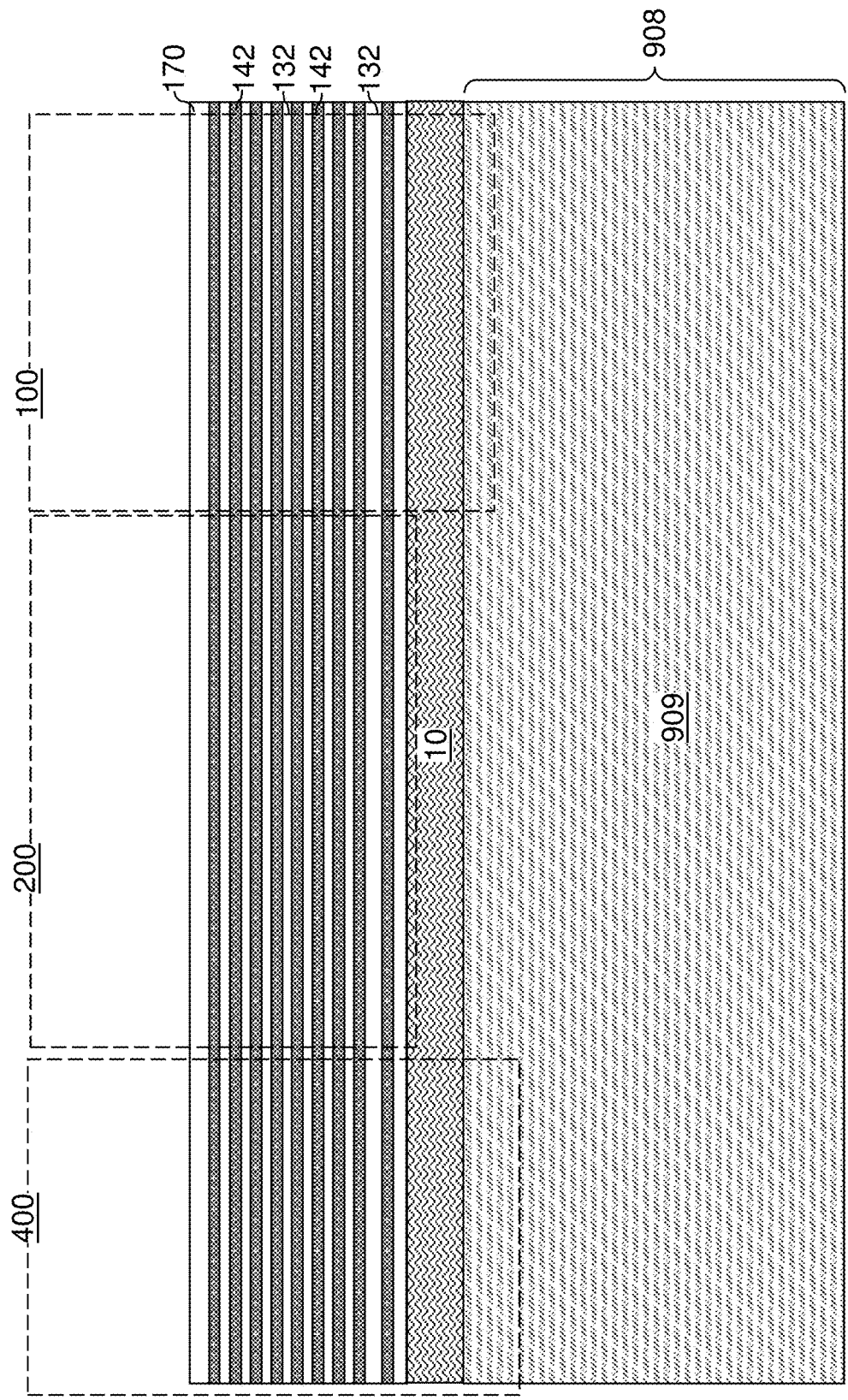

FIG. 20 is a vertical cross-sectional view of the second exemplary structure after formation of a first vertically alternating sequence of first insulating layers and first spacer material layers according to the second embodiment of the present disclosure.

Figure 21:
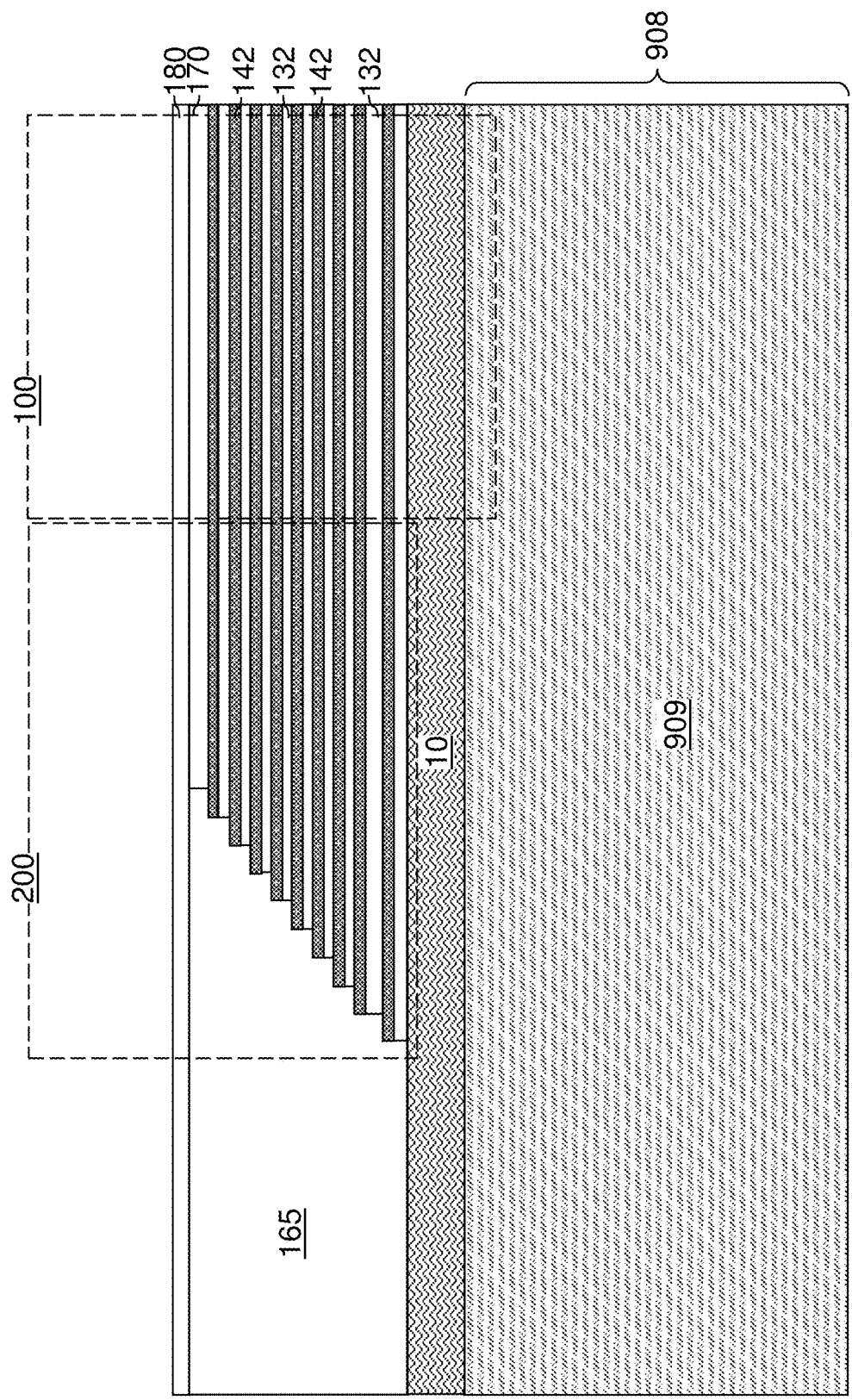

FIG. 21 is a vertical cross-sectional view of the second exemplary structure after patterning first stepped surfaces, a first retro-stepped dielectric material portion, and an inter-tier dielectric layer according to the second embodiment of the present disclosure.

Figure 22A:
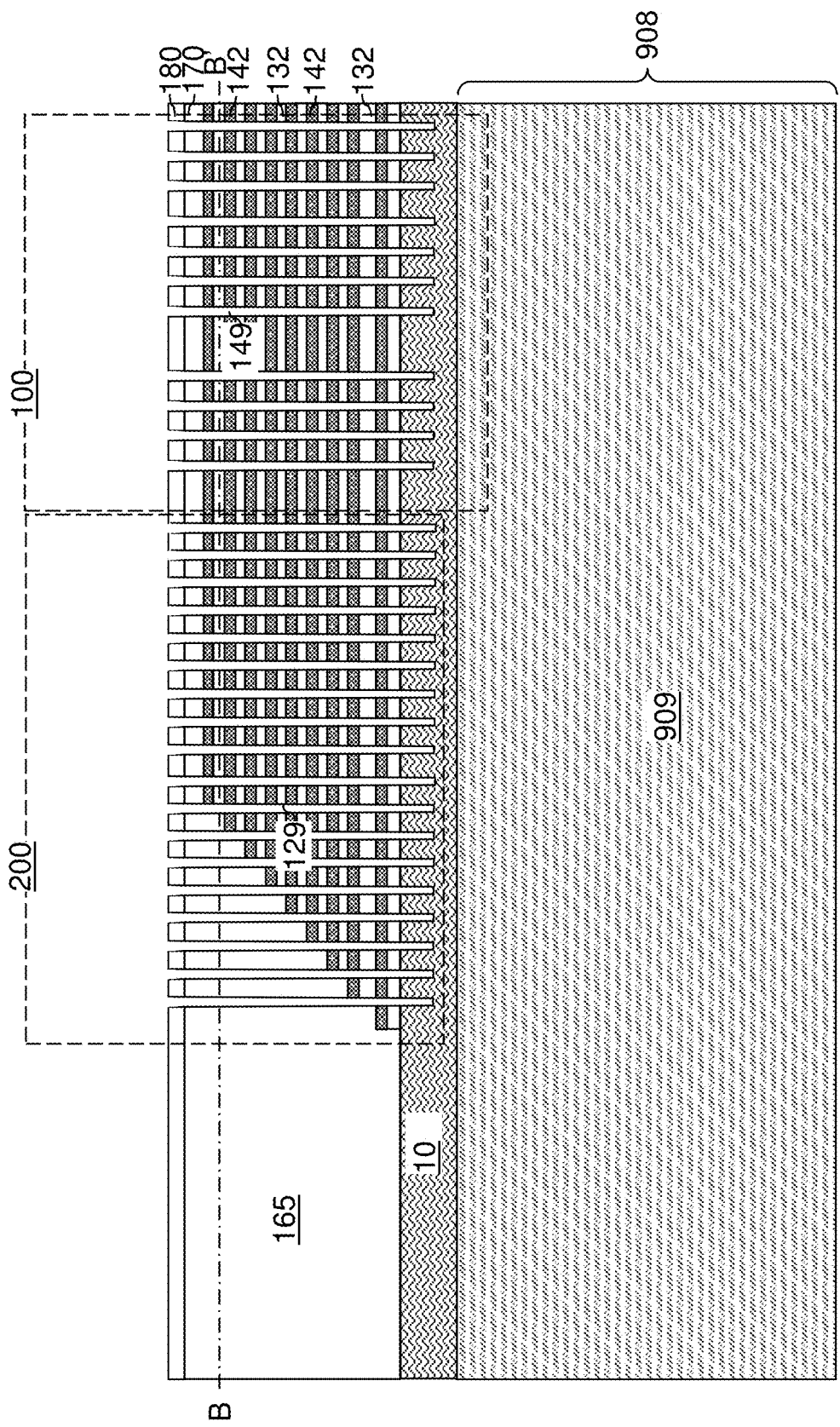

FIG. 22A is a vertical cross-sectional view of the second exemplary structure after formation of first-tier memory openings and first-tier support openings according to the second embodiment of the present disclosure.

Figure 22B:
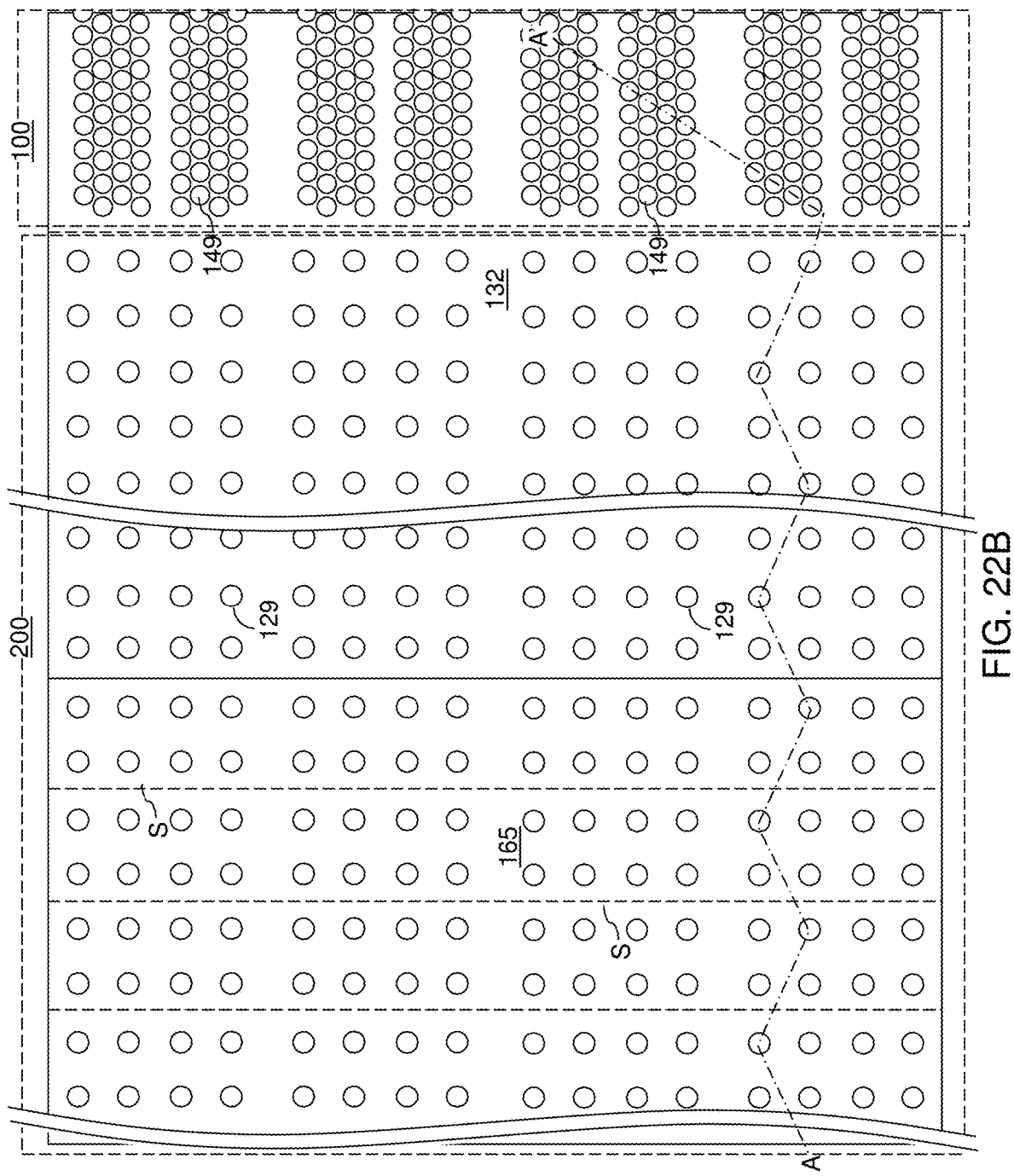

FIG. 22B is a horizontal cross-sectional view of the first exemplary structure along the horizontal plane B-B' of FIG. 22A. The zig-zag vertical plane A-A' corresponds to the plane of the vertical cross-sectional view of FIG. 22A.

Figure 23:
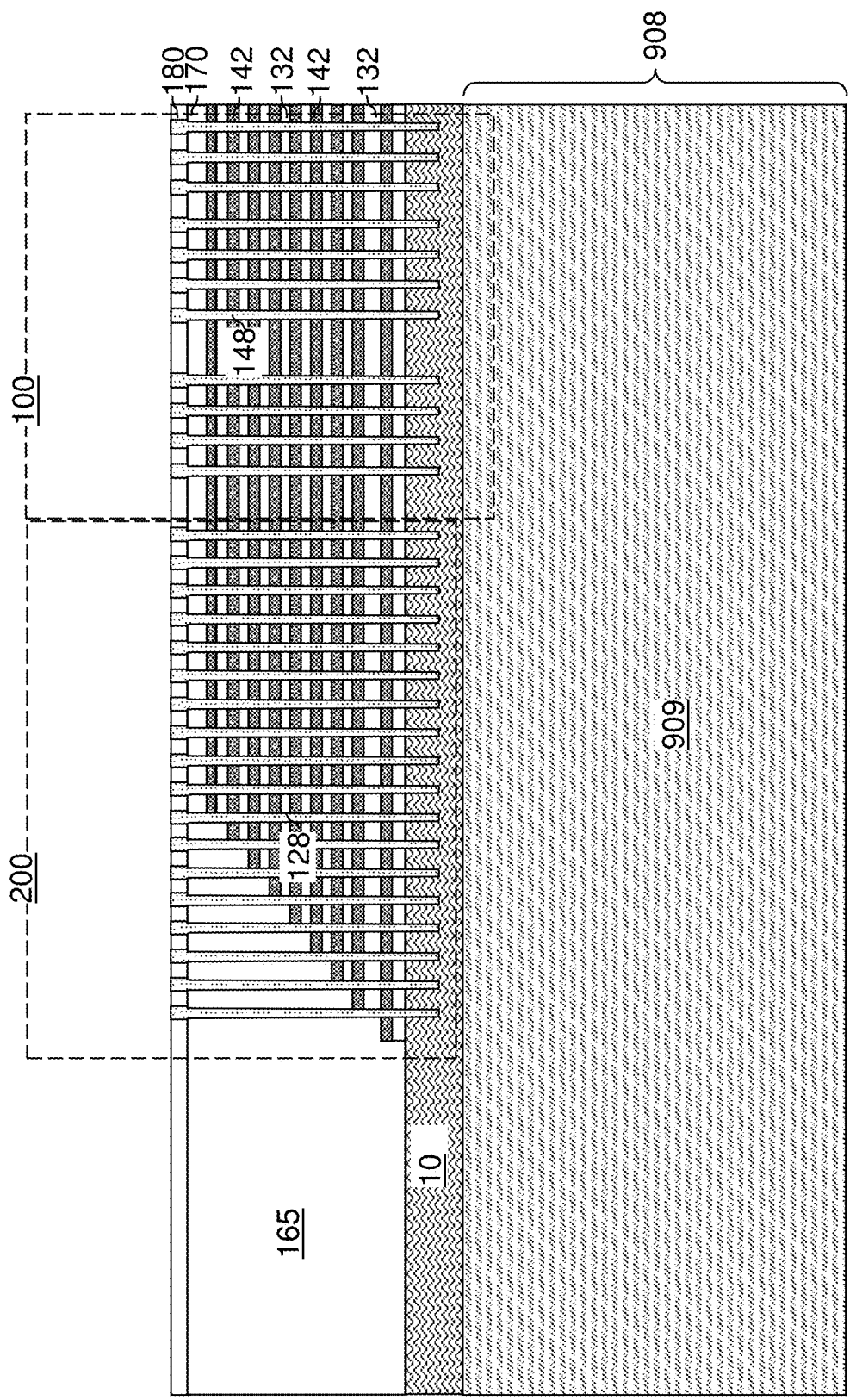

FIG. 23 is a vertical cross-sectional view of the second exemplary structure after formation of sacrificial memory opening fill portions and first-tier support opening fill portions according to the second embodiment of the present disclosure.

Figure 24:
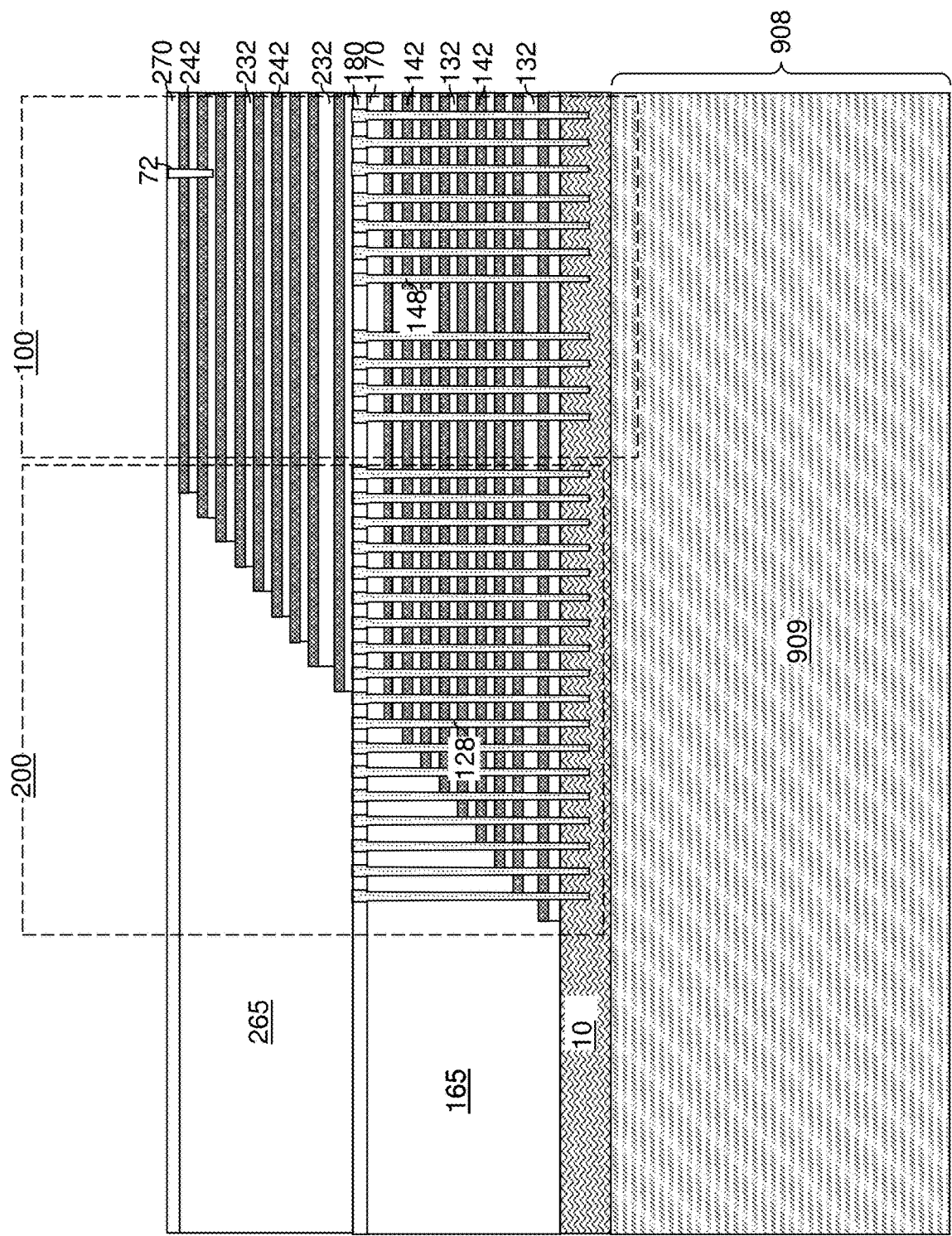

FIG. 24 is a vertical cross-sectional view of the second exemplary structure after formation of a second vertically alternating sequence of second insulating layers and second spacer material layers, second stepped surfaces, a second retro-stepped dielectric material portion, and drain-select-level isolation structures according to the second embodiment of the present disclosure.

Figure 25A:
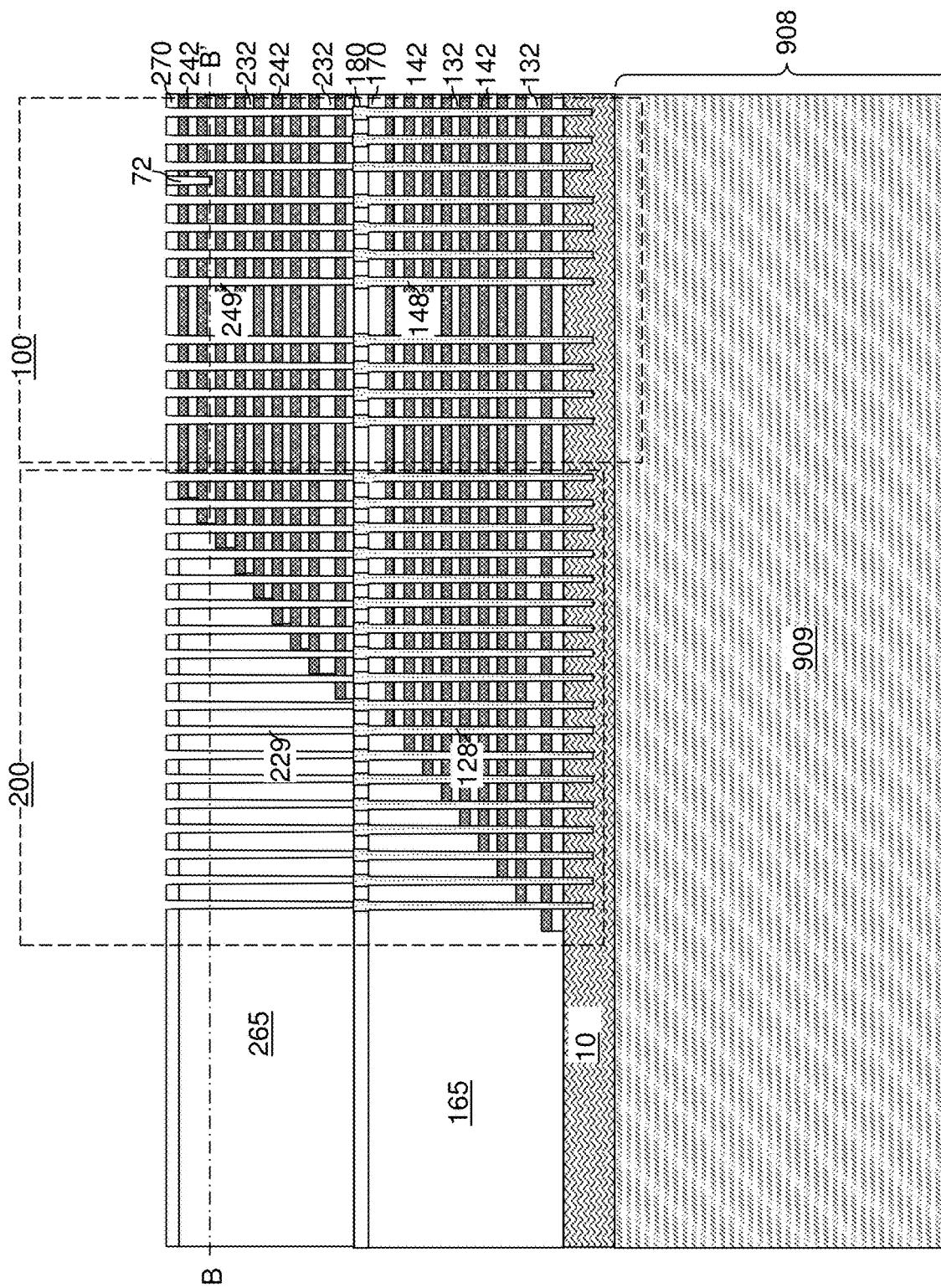

FIG. 25A is a vertical cross-sectional view of the second exemplary structure after formation of second-tier memory openings and second-tier support openings according to the second embodiment of the present disclosure.

Figure 25B:
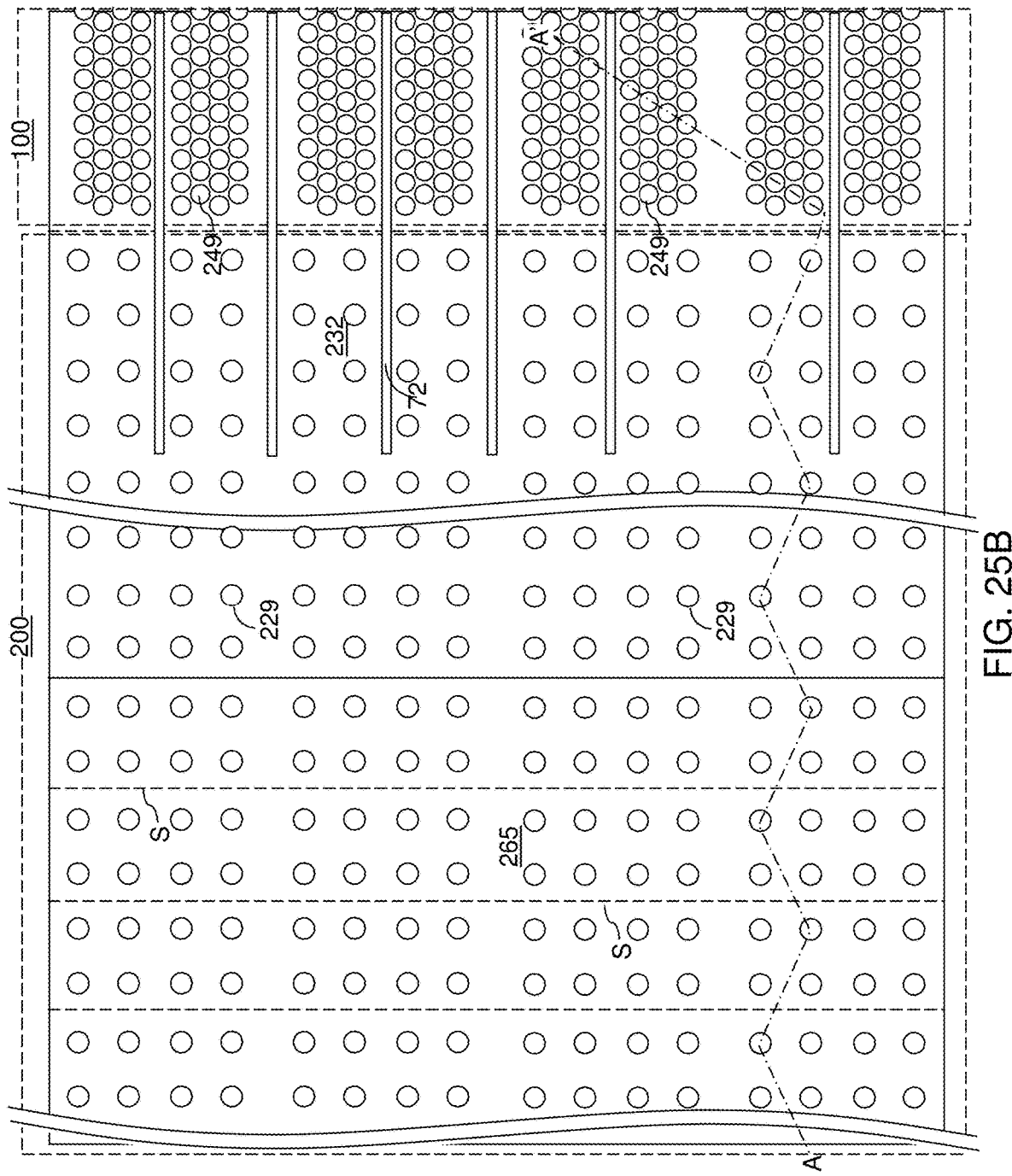

FIG. 25B is a top-down view of the second exemplary structure of FIG. 25A. The zig-zag vertical plane A-A' corresponds to the plane of the vertical cross-sectional view of FIG. 25A.

Figure 26:
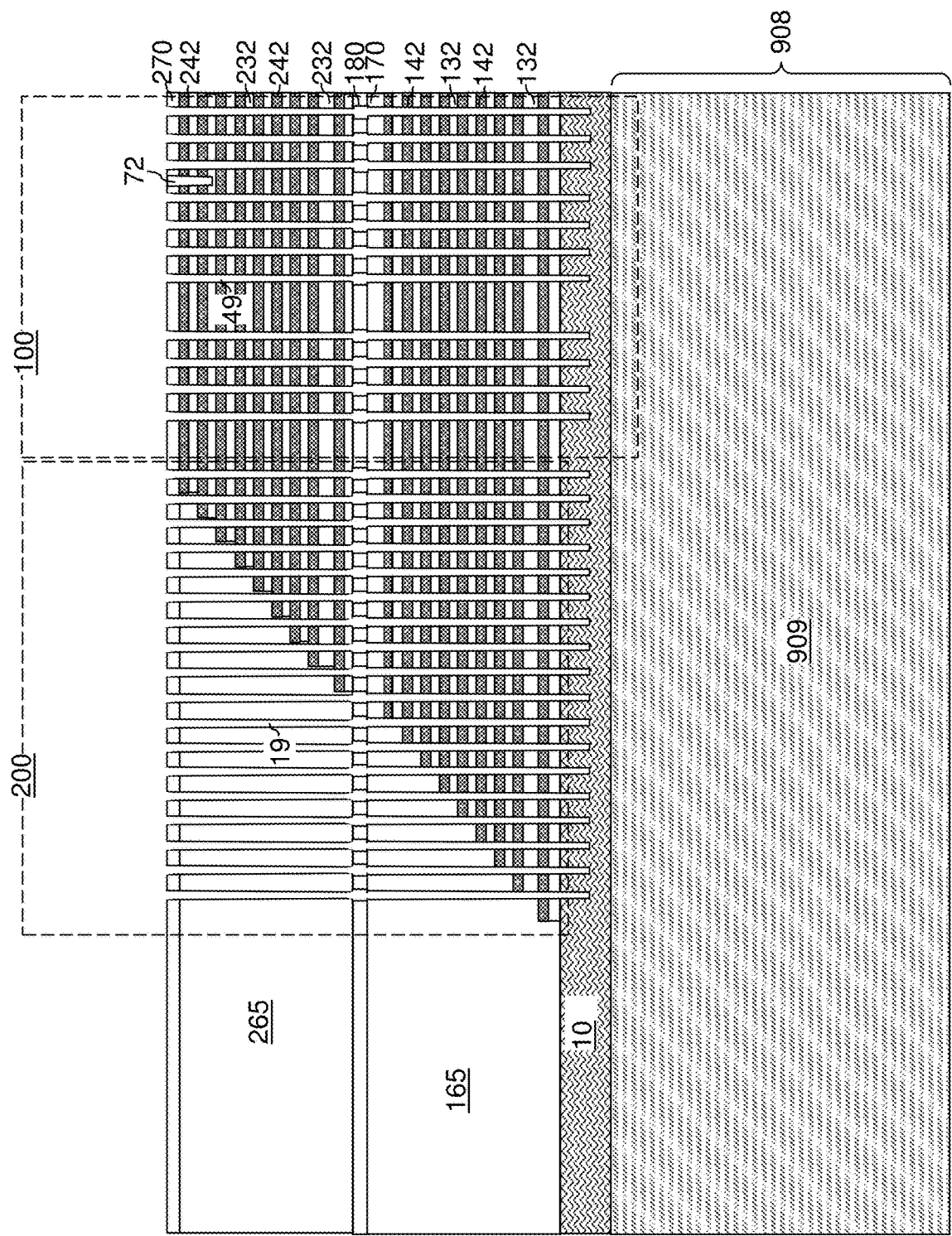

FIG. 26 is a vertical cross-sectional view of the second exemplary structure after formation of inter-tier memory openings according to the second embodiment of the present disclosure.

Figure 27A:
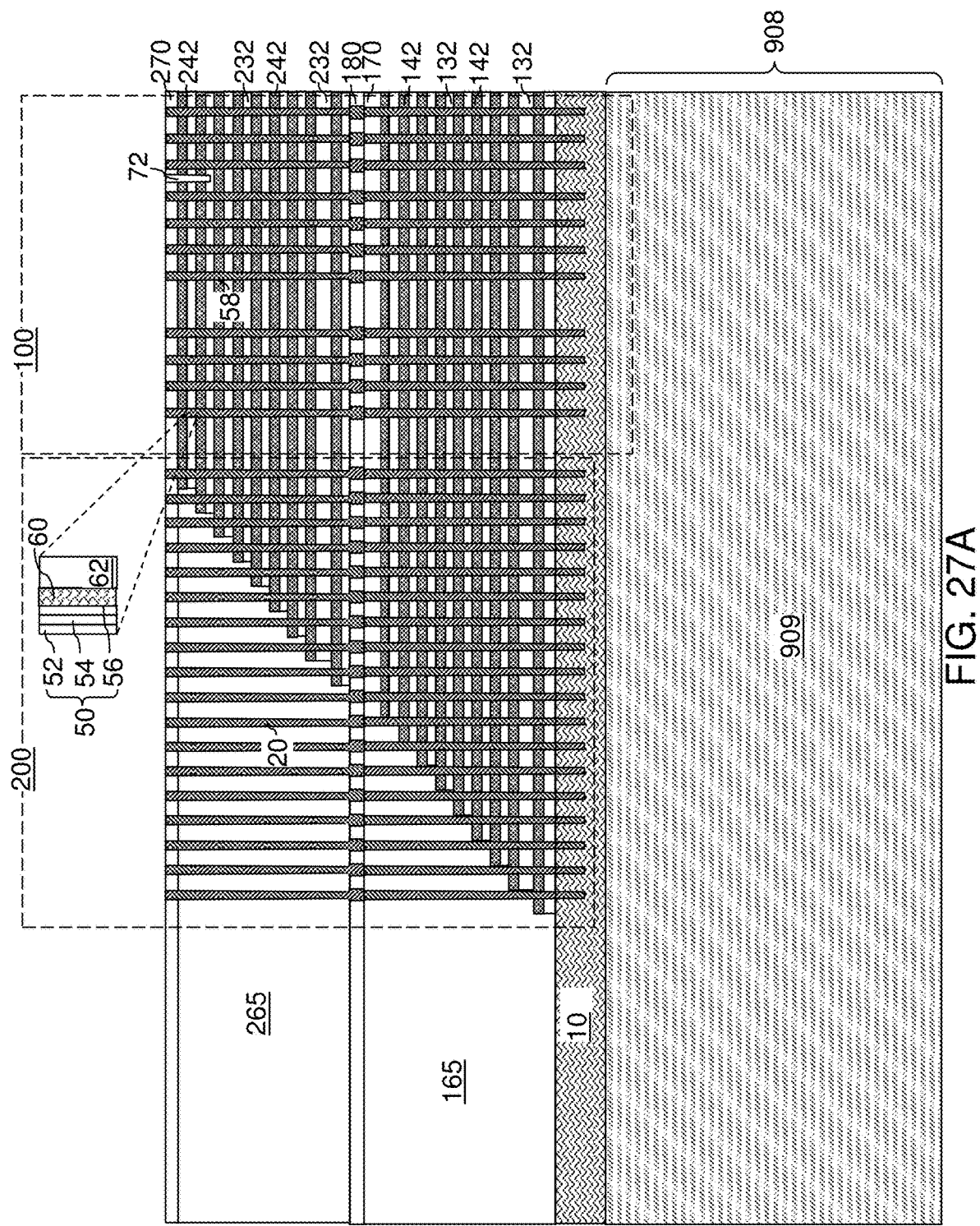

FIG. 27A is a vertical cross-sectional view of the second exemplary structure after formation of memory opening fill structures and support pillar structures according to the second embodiment of the present disclosure.

FIG. 27B is a top-down view of the second exemplary structure of FIG. 27A. The zig-zag vertical plane A-A' corresponds to the plane of the vertical cross-sectional view of FIG. 27A.

Figure 28A:
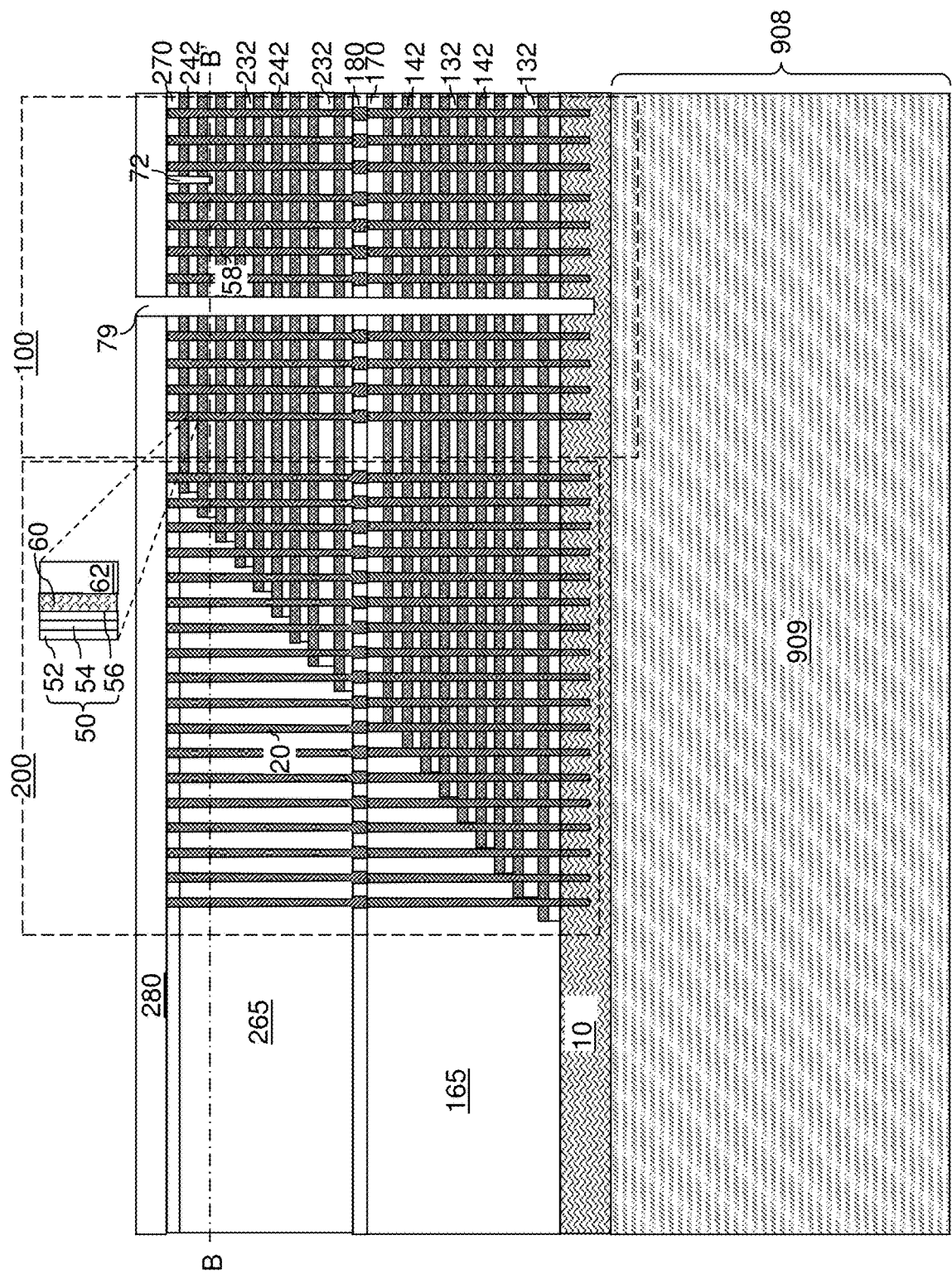

FIG. 28A is a vertical cross-sectional view of the second exemplary structure after formation of a contact-level dielectric layer and backside trenches according to the second embodiment of the present disclosure.

Figure 28B:
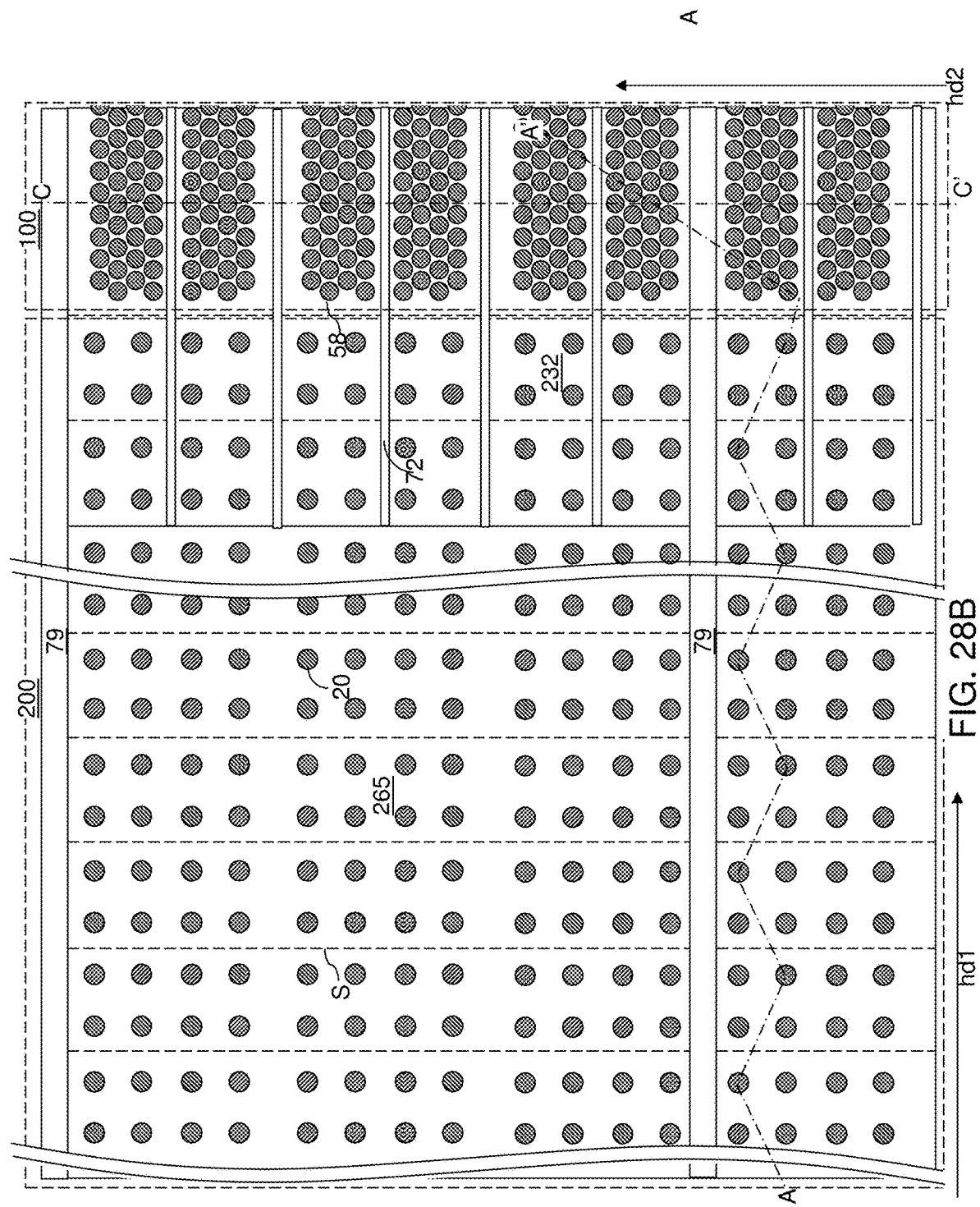

FIG. 28B is a top-down view of the second exemplary structure of FIG. 28A. The zig-zag vertical plane A-A' corresponds to the plane of the vertical cross-sectional view of FIG. 28A.

Figure 28C:
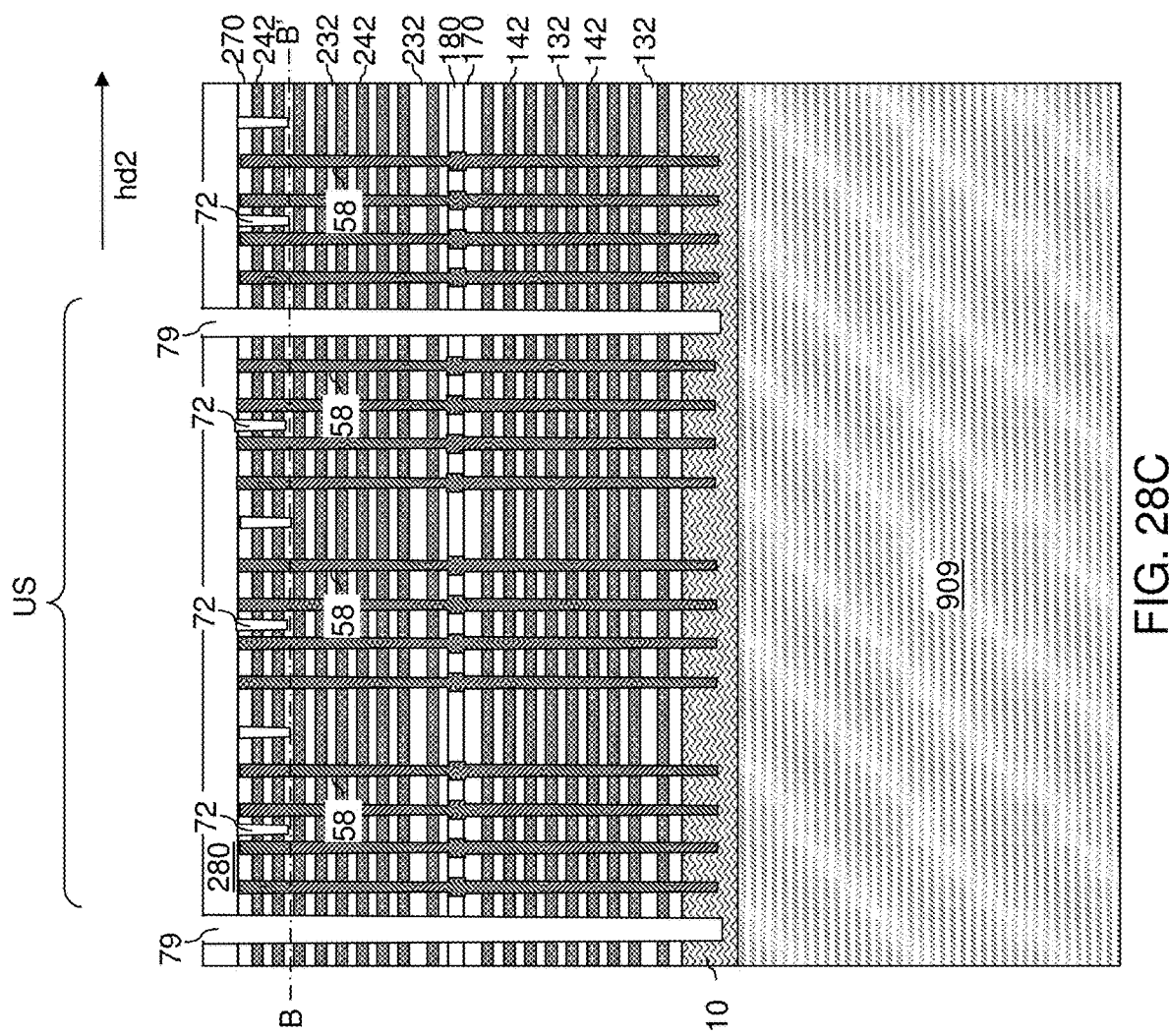

FIG. 28C is a vertical cross-sectional view of the second exemplary structure along the vertical plane C-C' of FIG. 28B.

Figure 29:
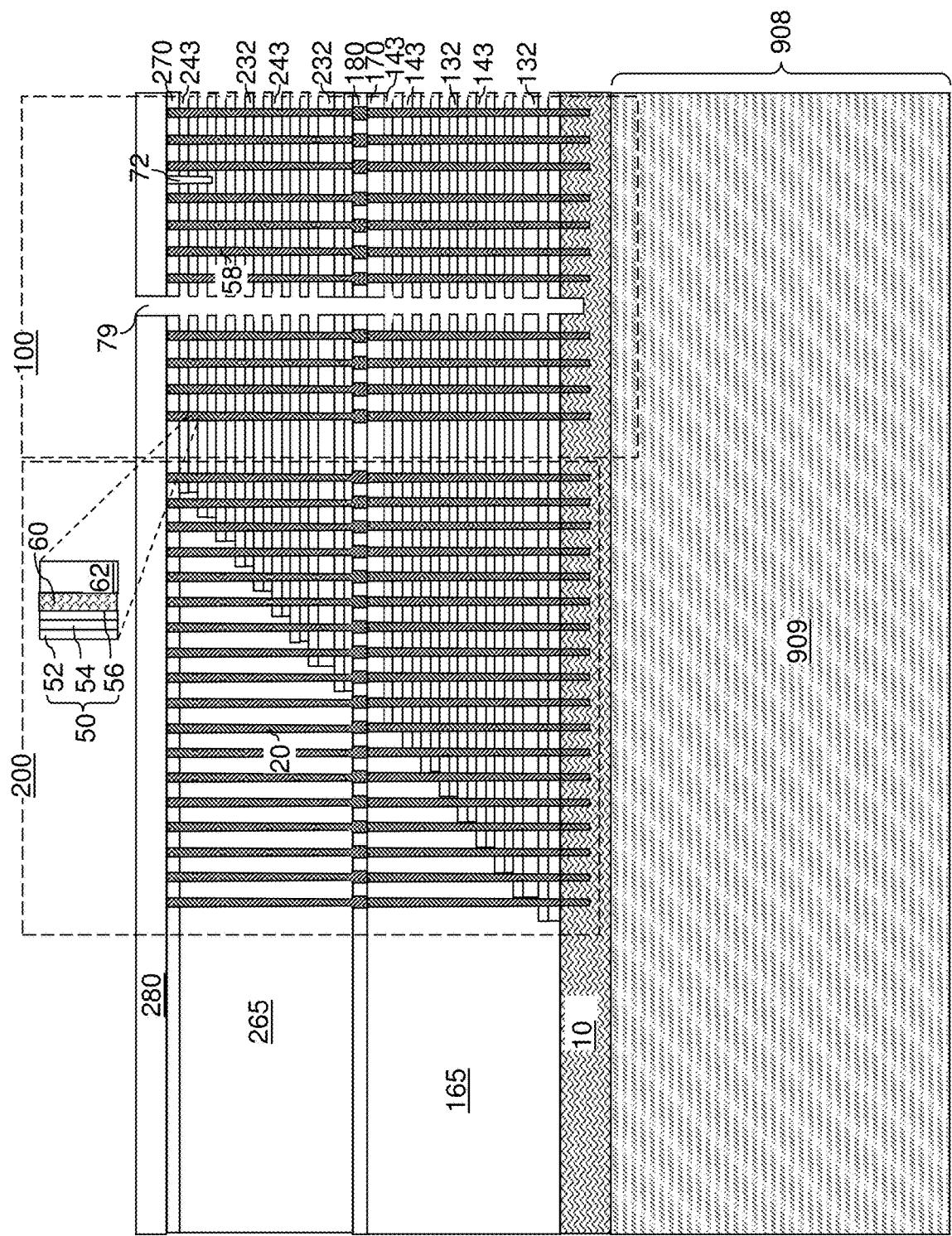

FIG. 29 is a vertical cross-sectional view of the second exemplary structure after formation of backside recesses according to the second embodiment of the present disclosure.

Figure 30A:
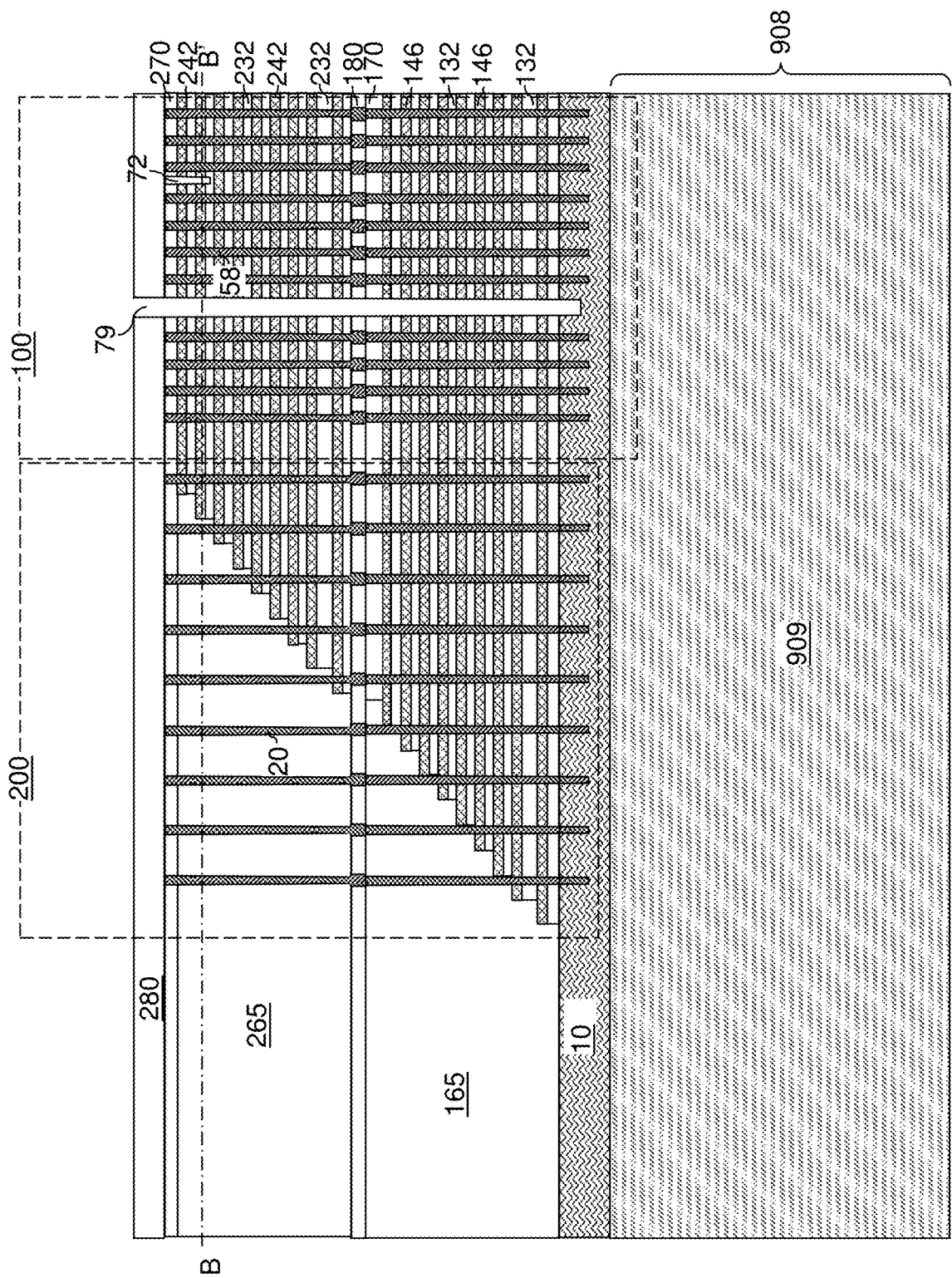

FIG. 30A is a vertical cross-sectional view of the second exemplary structure after formation of electrically conductive layers in the backside recesses according to the second embodiment of the present disclosure.

Figure 30B:
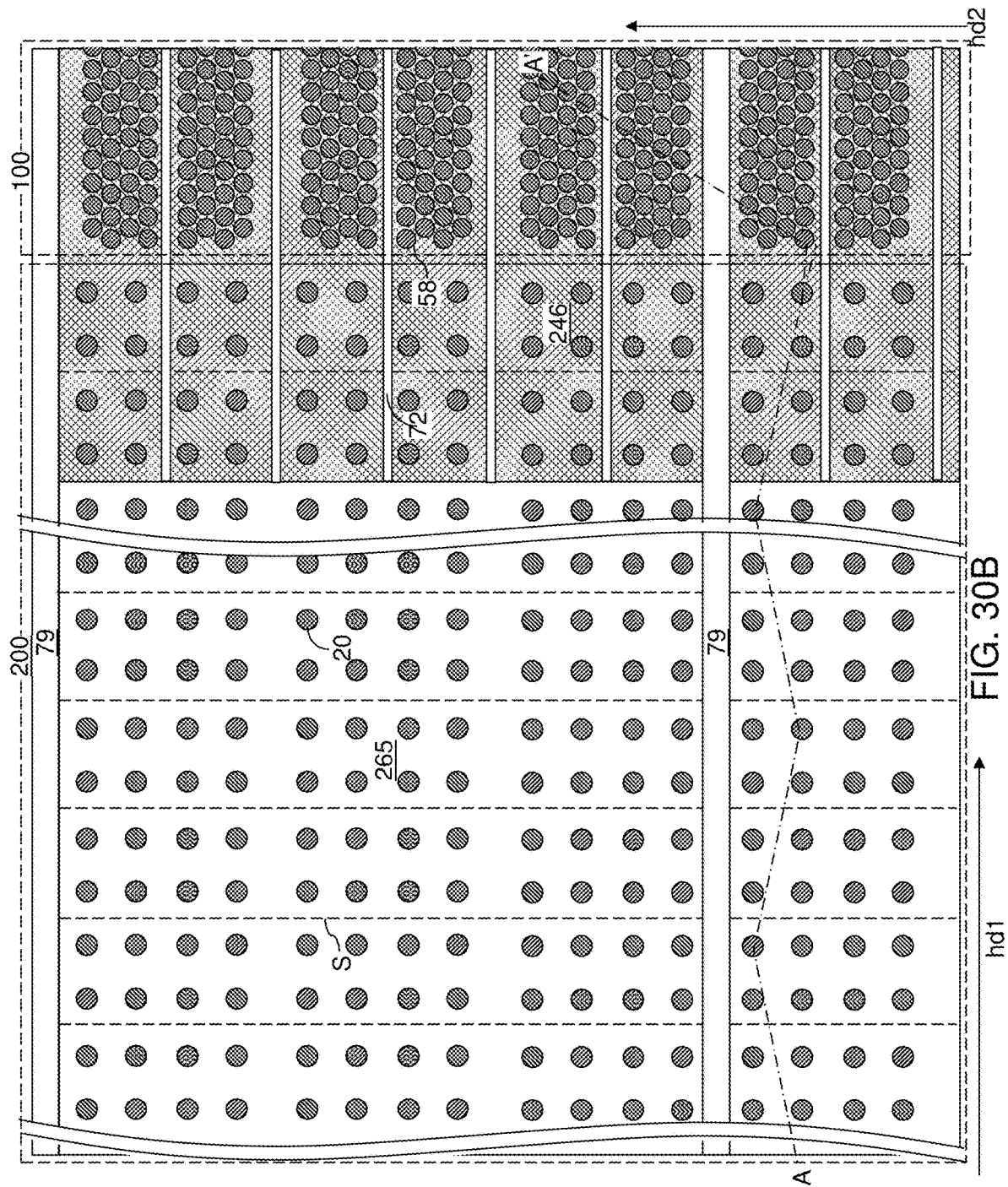

FIG. 30B is a top-down view of the second exemplary structure of FIG. 30A. The zig-zag vertical plane A-A' corresponds to the plane of the vertical cross-sectional view of FIG. 30A.

Figure 31A:
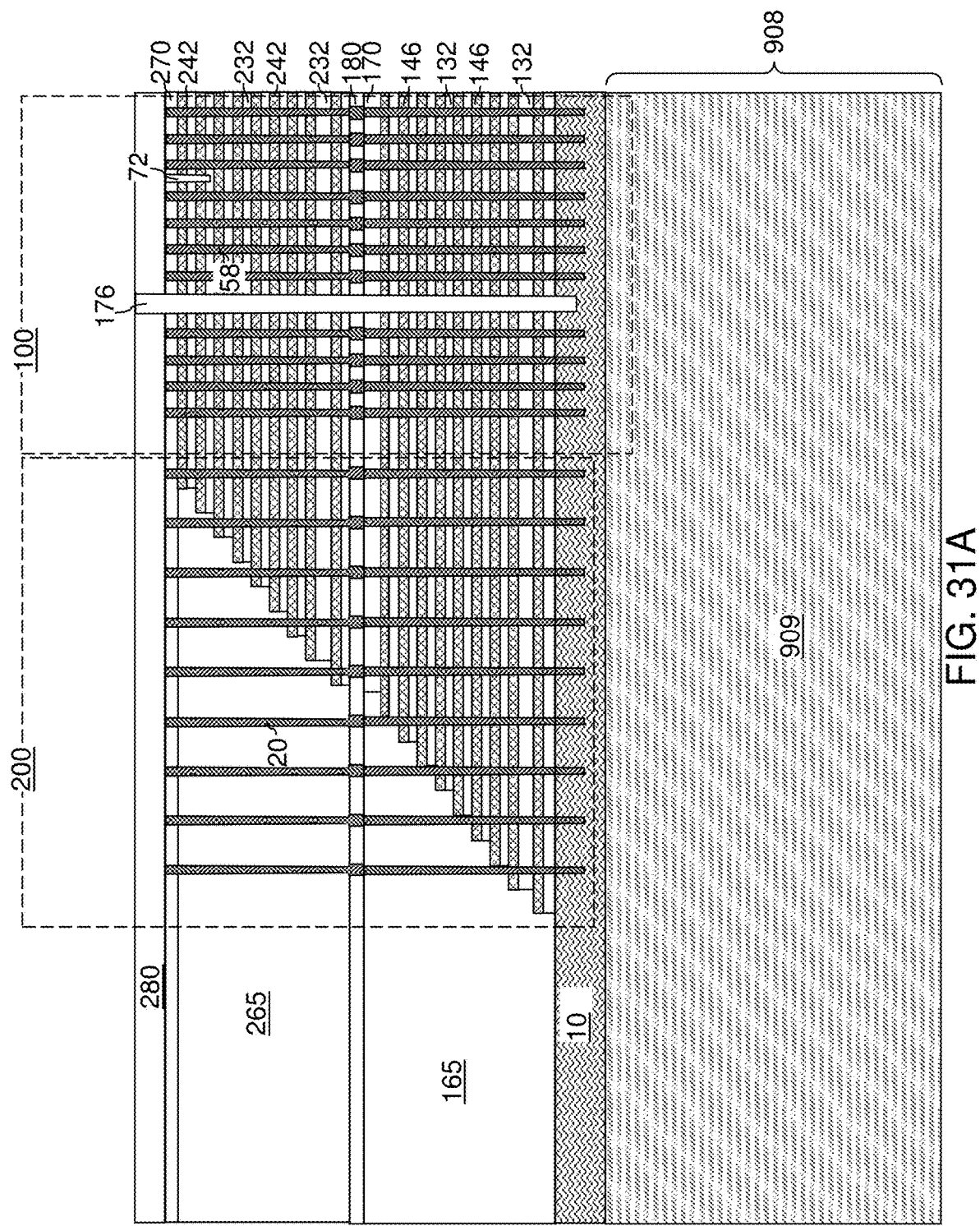

FIG. 31A is a vertical cross-sectional view of the second exemplary structure after formation of backside trench fill structures in the backside trenches according to the second embodiment of the present disclosure.

Figure 31B:
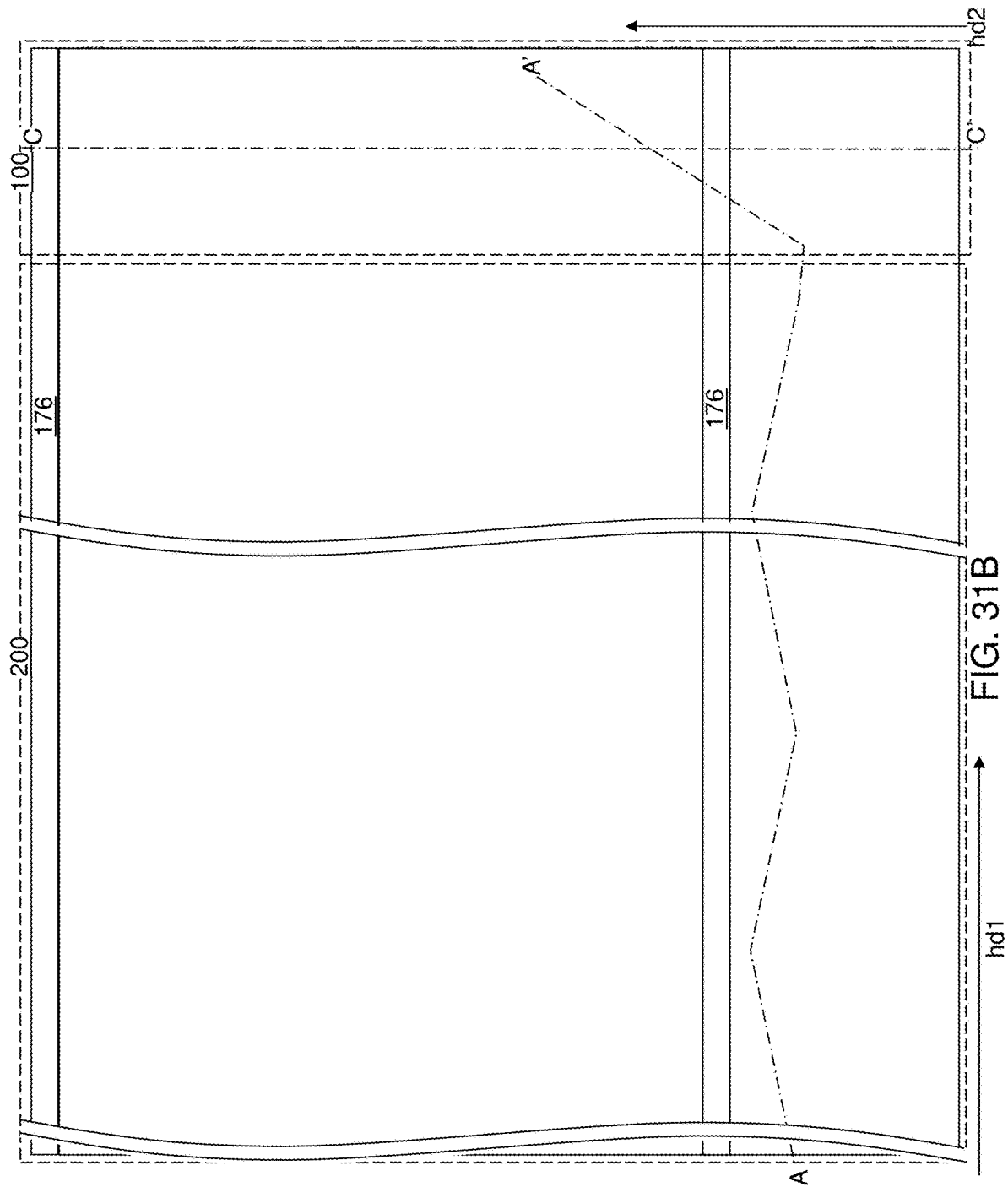

FIG. 31B is a top-down view of the second exemplary structure of FIG. 31A. The zig-zag vertical plane A-A' corresponds to the plane of the vertical cross-sectional view of FIG. 31A.

Figure 31C:
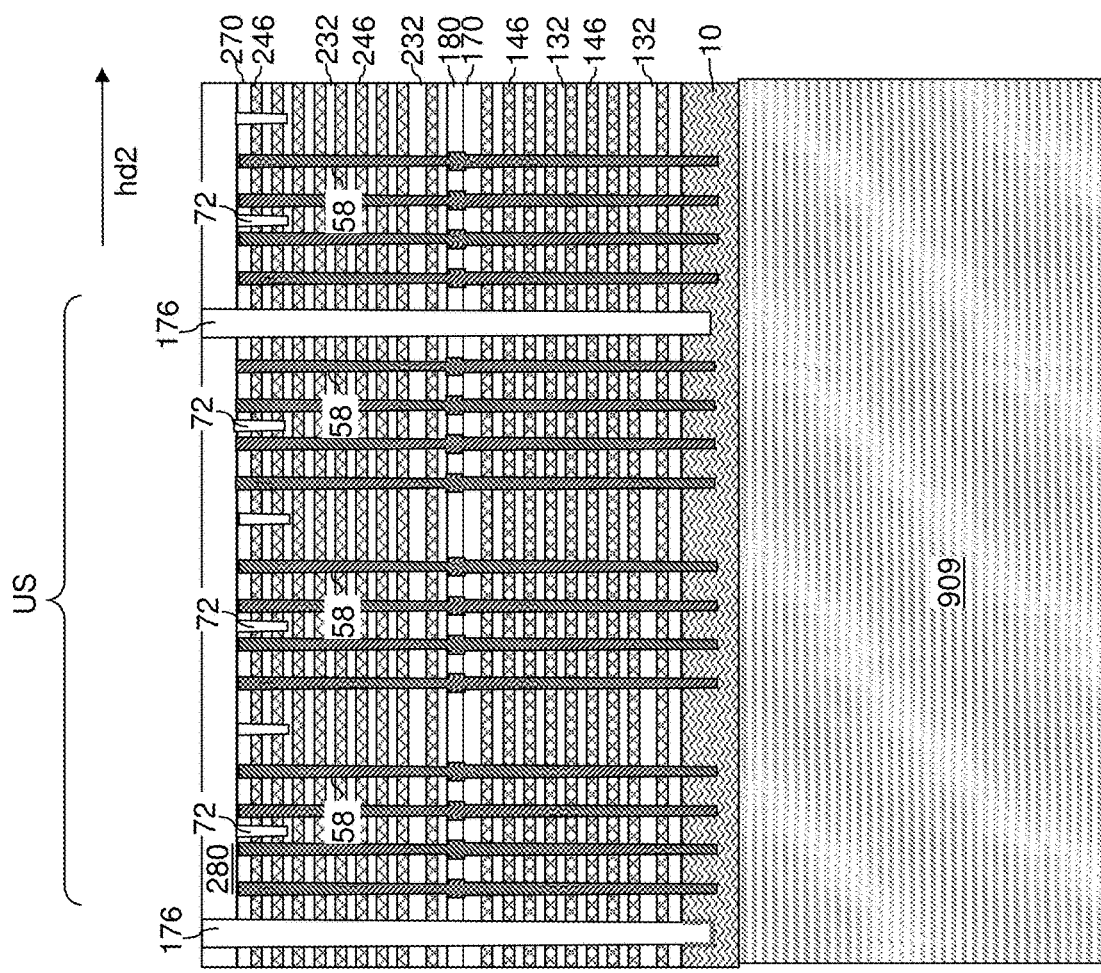

FIG. 31C is a vertical cross-sectional view of the second exemplary structure along the vertical plane C-C' of FIG. 31B.

Figure 32A:
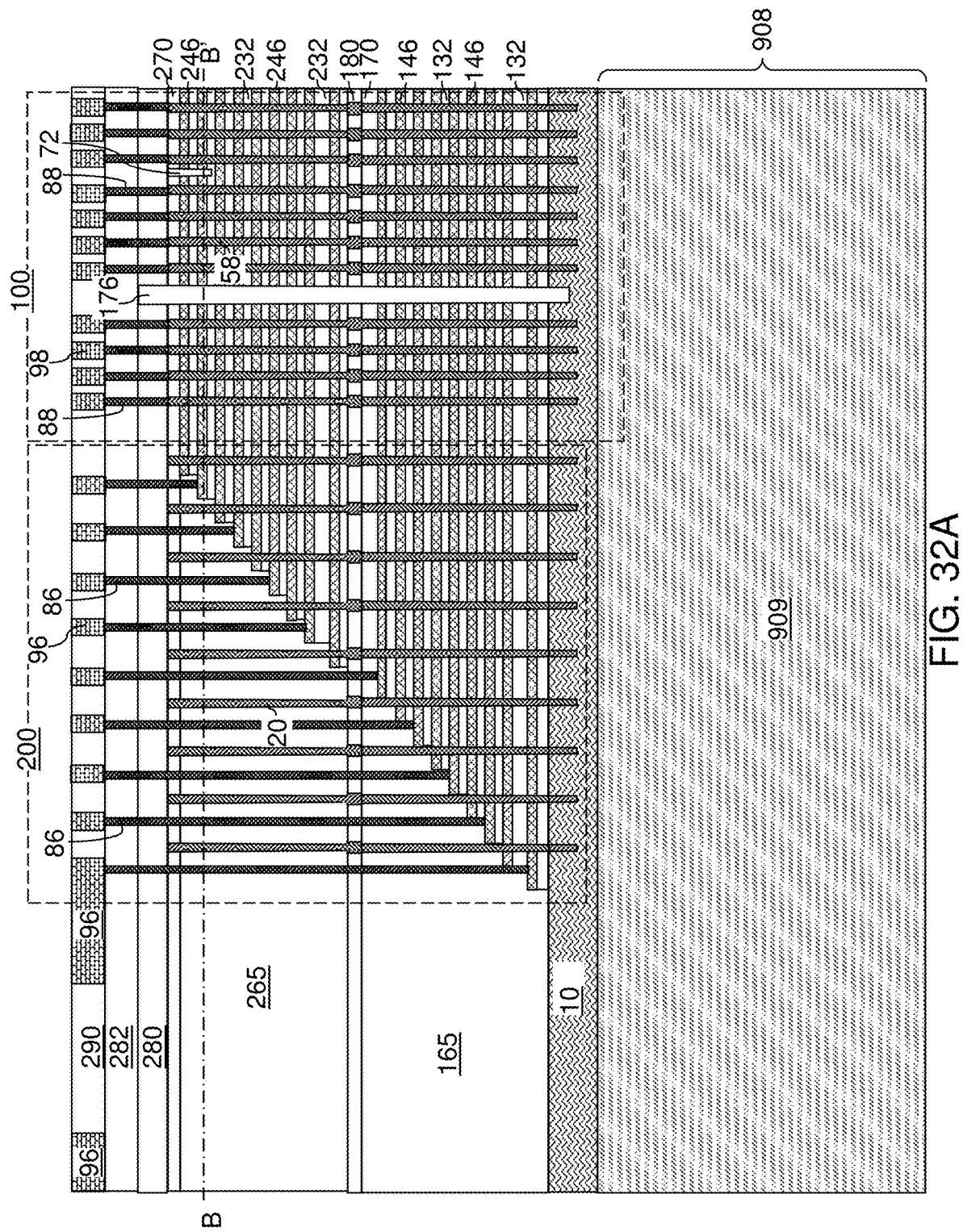

FIG. 32A is a vertical cross-sectional view of the second exemplary structure after formation of drain contact via structures and layer contact via structures according to the second embodiment of the present disclosure.

Figure 32B:
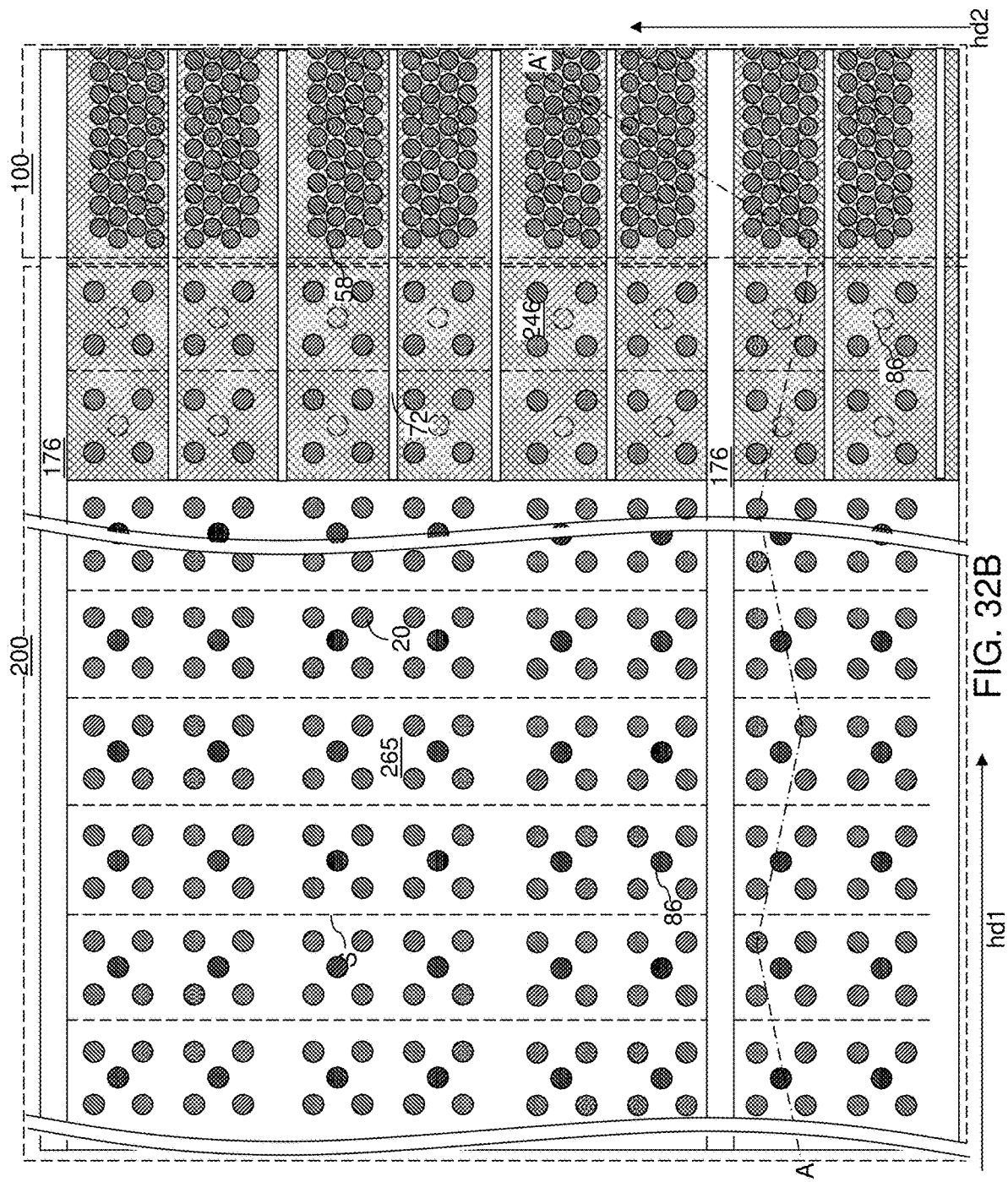

FIG. 32B is a horizontal cross-sectional view of the second exemplary structure of FIG. 32A. The zig-zag vertical plane A-A' corresponds to the plane of the vertical cross-sectional view of FIG. 32A.

Figure 33:
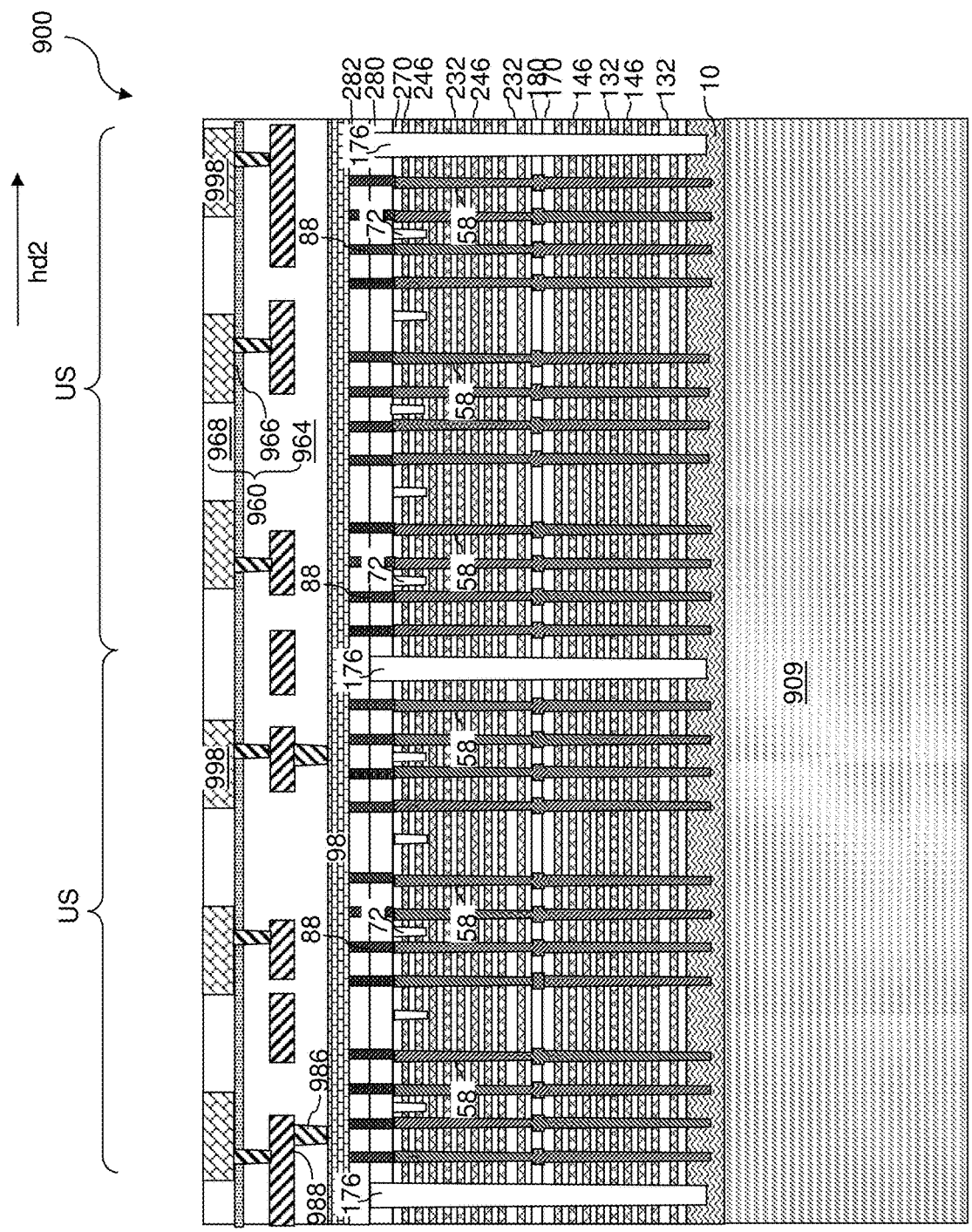

FIG. 33 is a vertical cross-sectional view of the second exemplary structure after formation of a memory die according to the second embodiment of the present disclosure.

Figure 34:
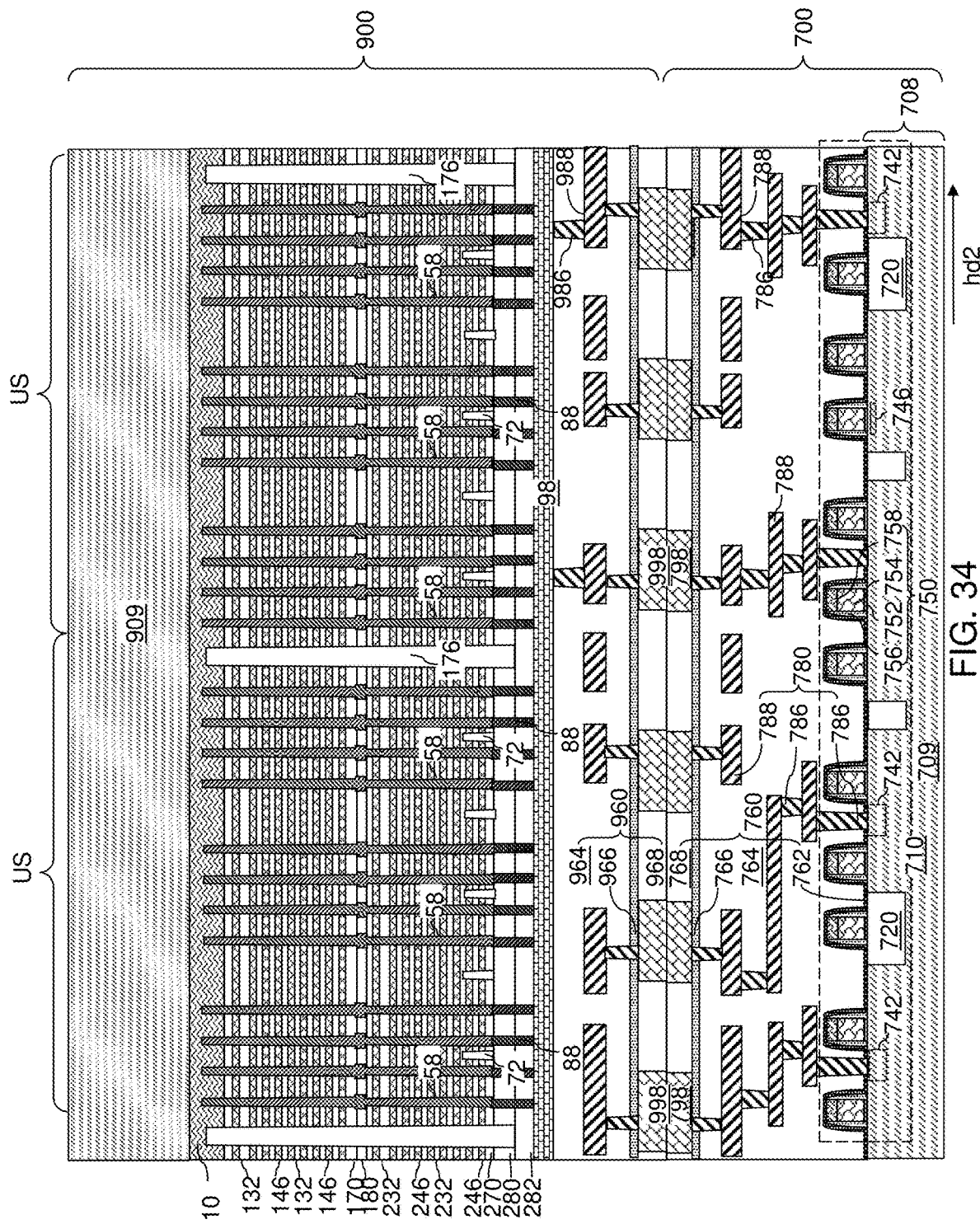

FIG. 34 is a vertical cross-sectional view of the second exemplary structure after bonding a logic die to the memory die according to the second embodiment of the present disclosure.

Figure 35:
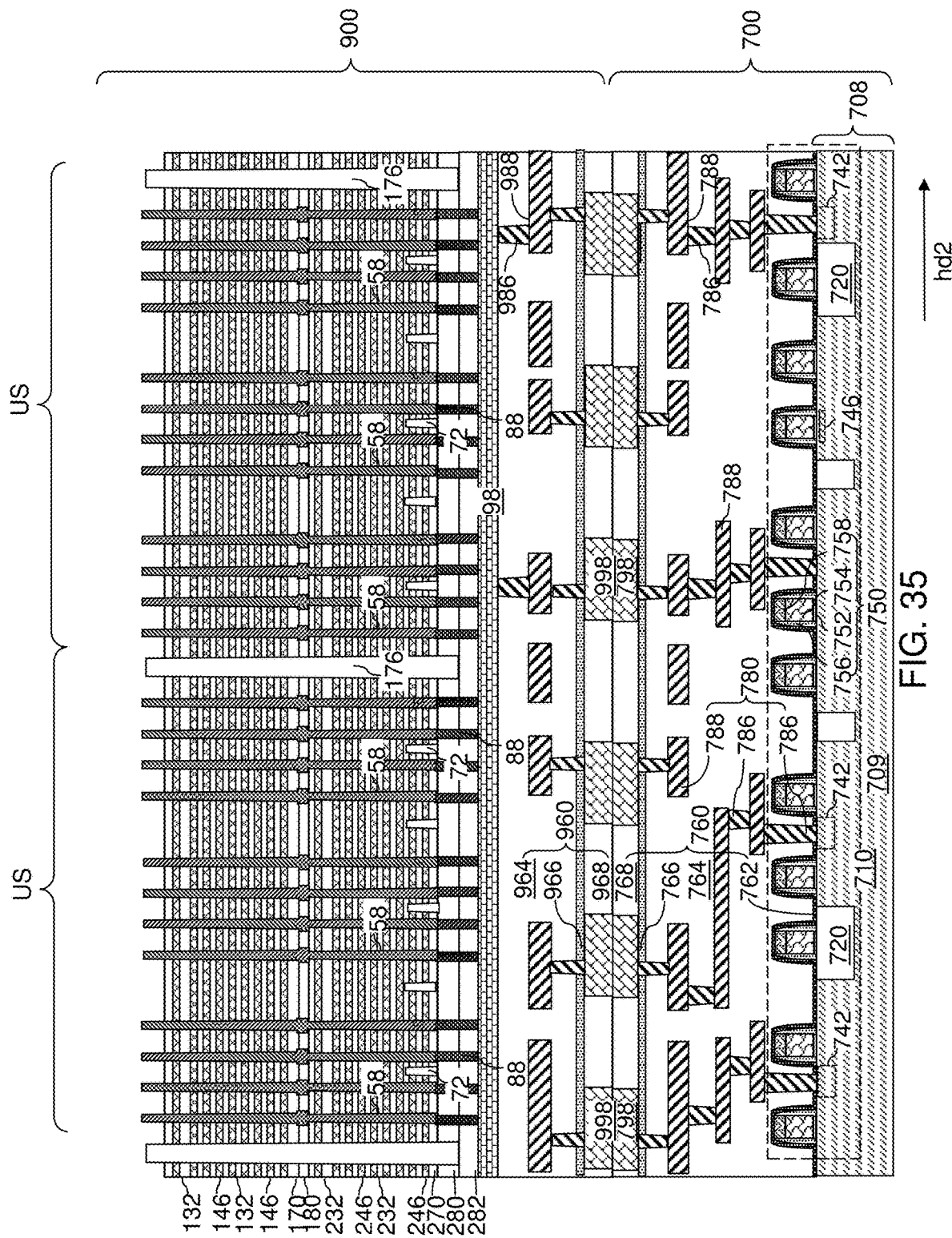

FIG. 35 is a vertical cross-sectional view of the second exemplary structure after removing the memory-side substrate of the memory die according to the second embodiment of the present disclosure.

Figure 36:
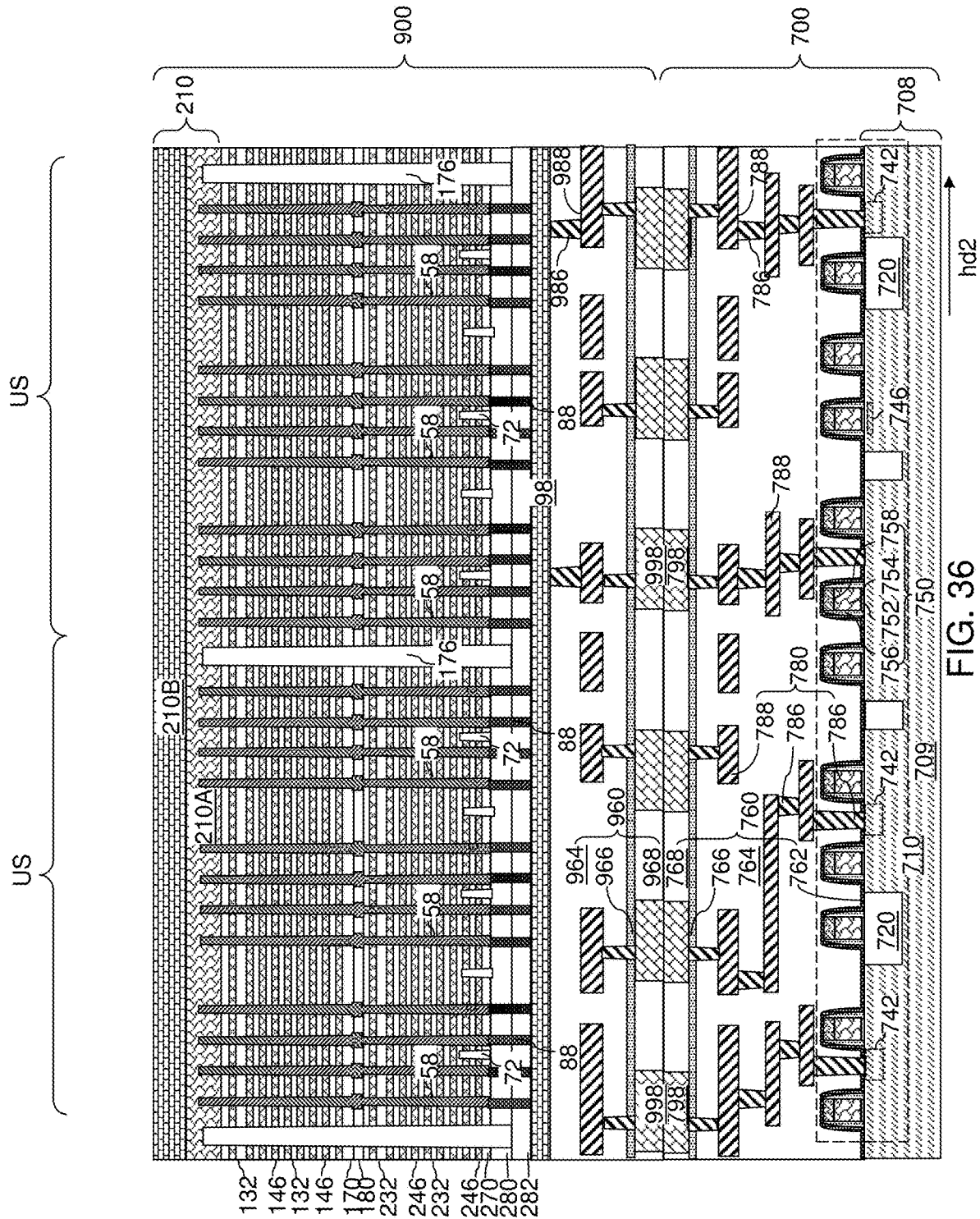

FIG. 36 is a vertical cross-sectional view of the second exemplary structure after forming a top source contact.

Figure 37:
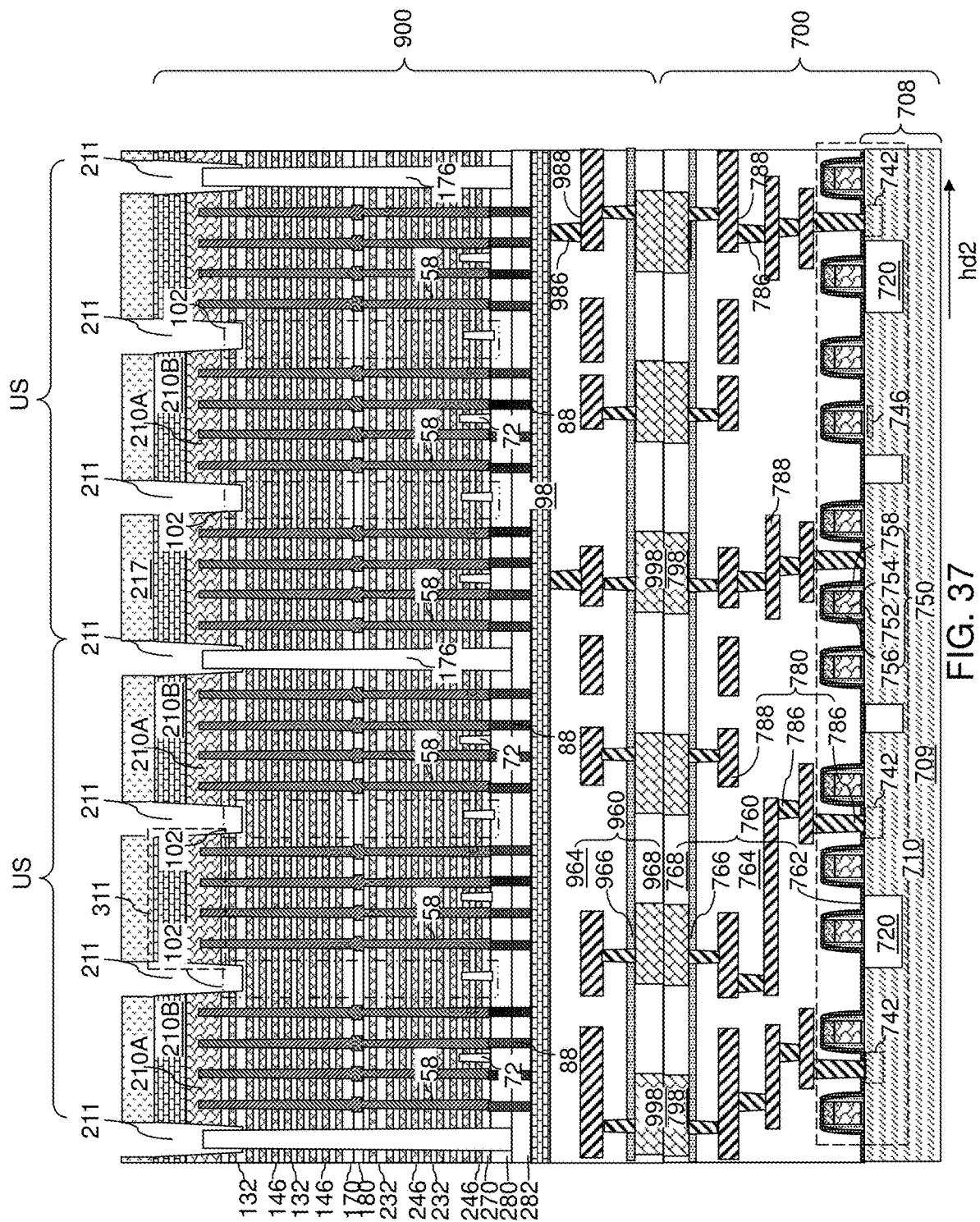

FIG. 37 is a vertical cross-sectional view of the second exemplary structure after formation of source isolation trenches according to the second embodiment of the present disclosure.

Figure 38:
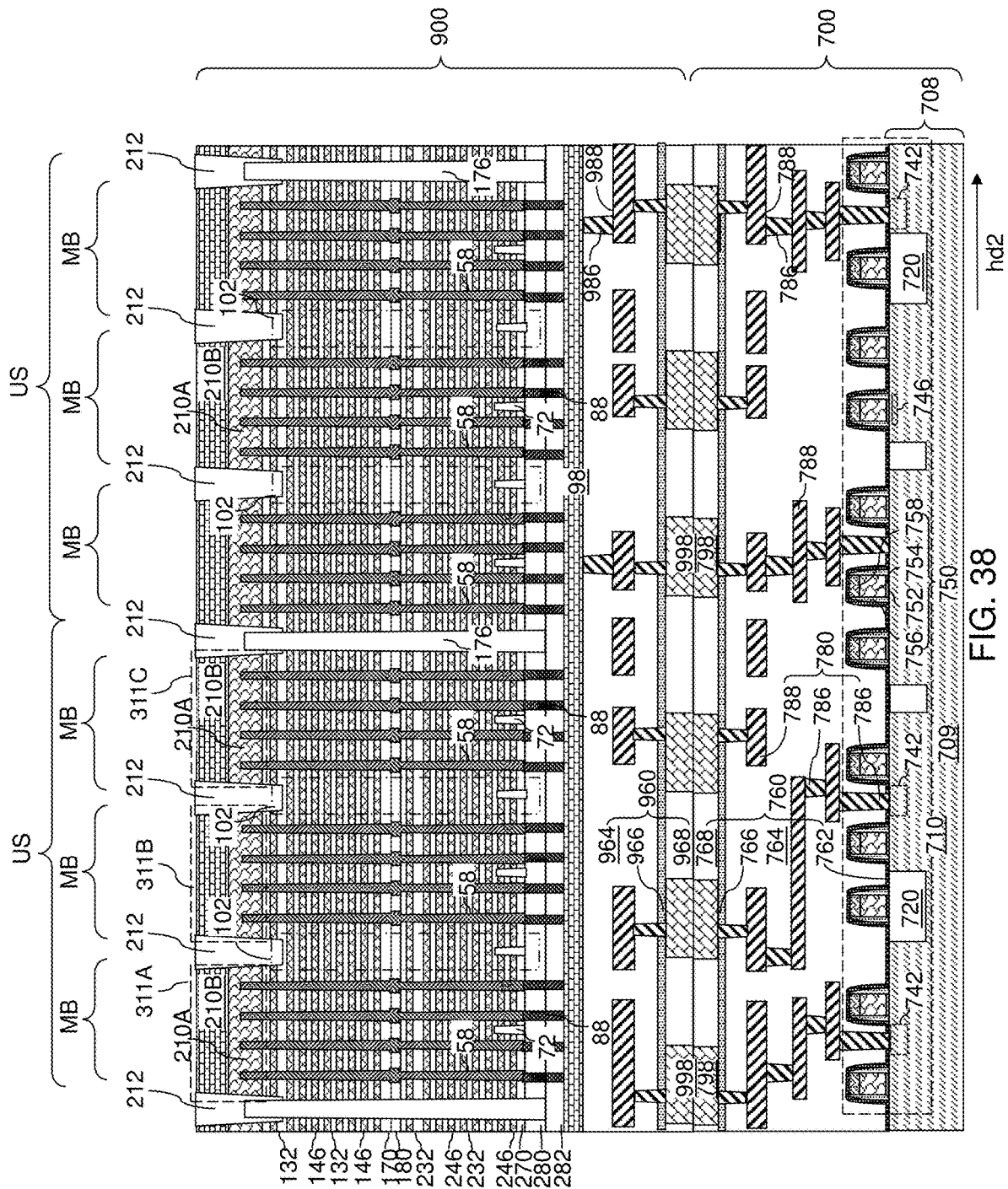

FIG. 38 is a vertical cross-sectional view of the second exemplary structure after formation of source isolation dielectric structures according to the second embodiment of the present disclosure.

Figure 39:
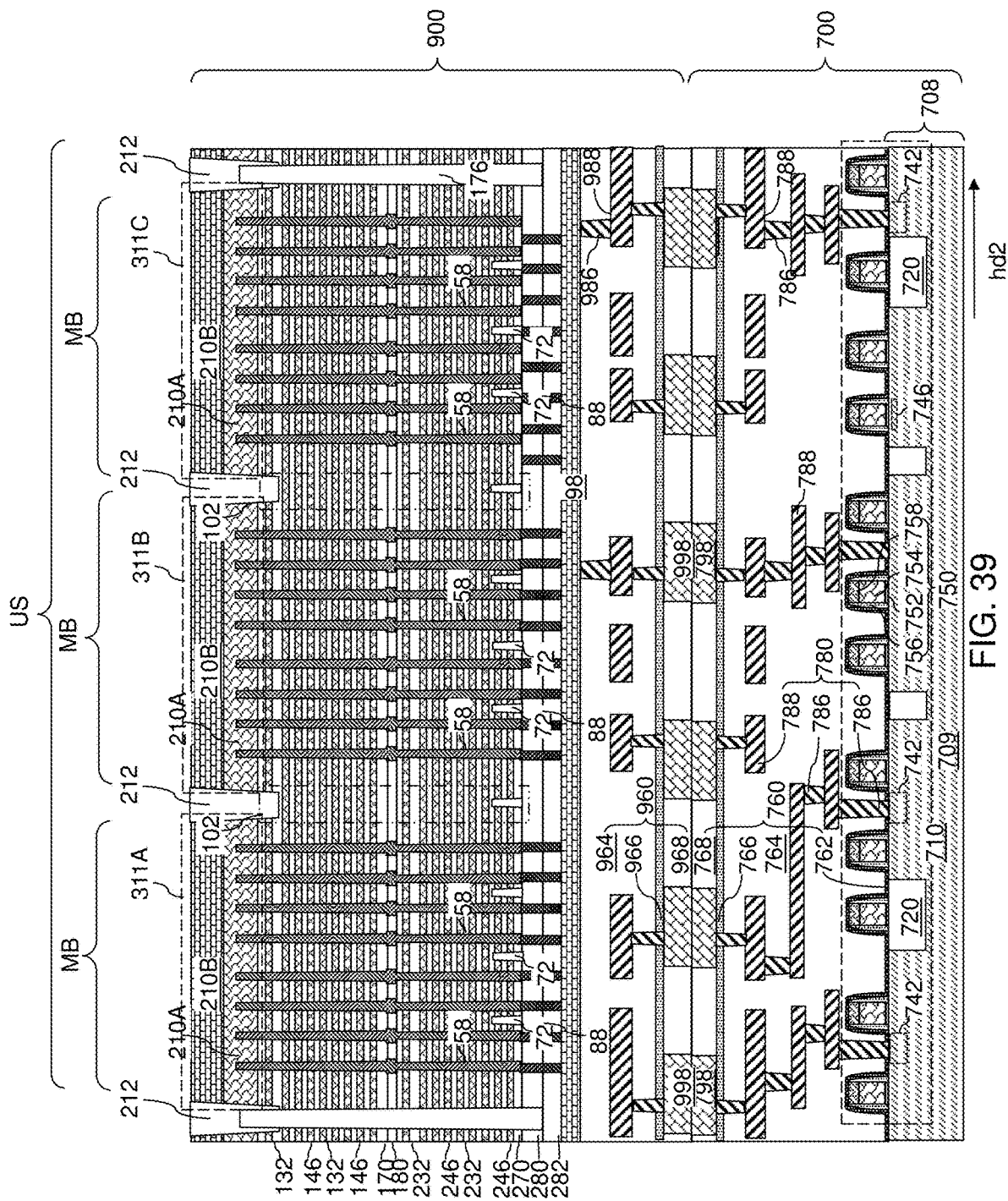

FIG. 39 is a vertical cross-sectional view of an alternative embodiment of the second exemplary structure after formation of source isolation dielectric structures according to the second embodiment of the present disclosure.

Figure 40:
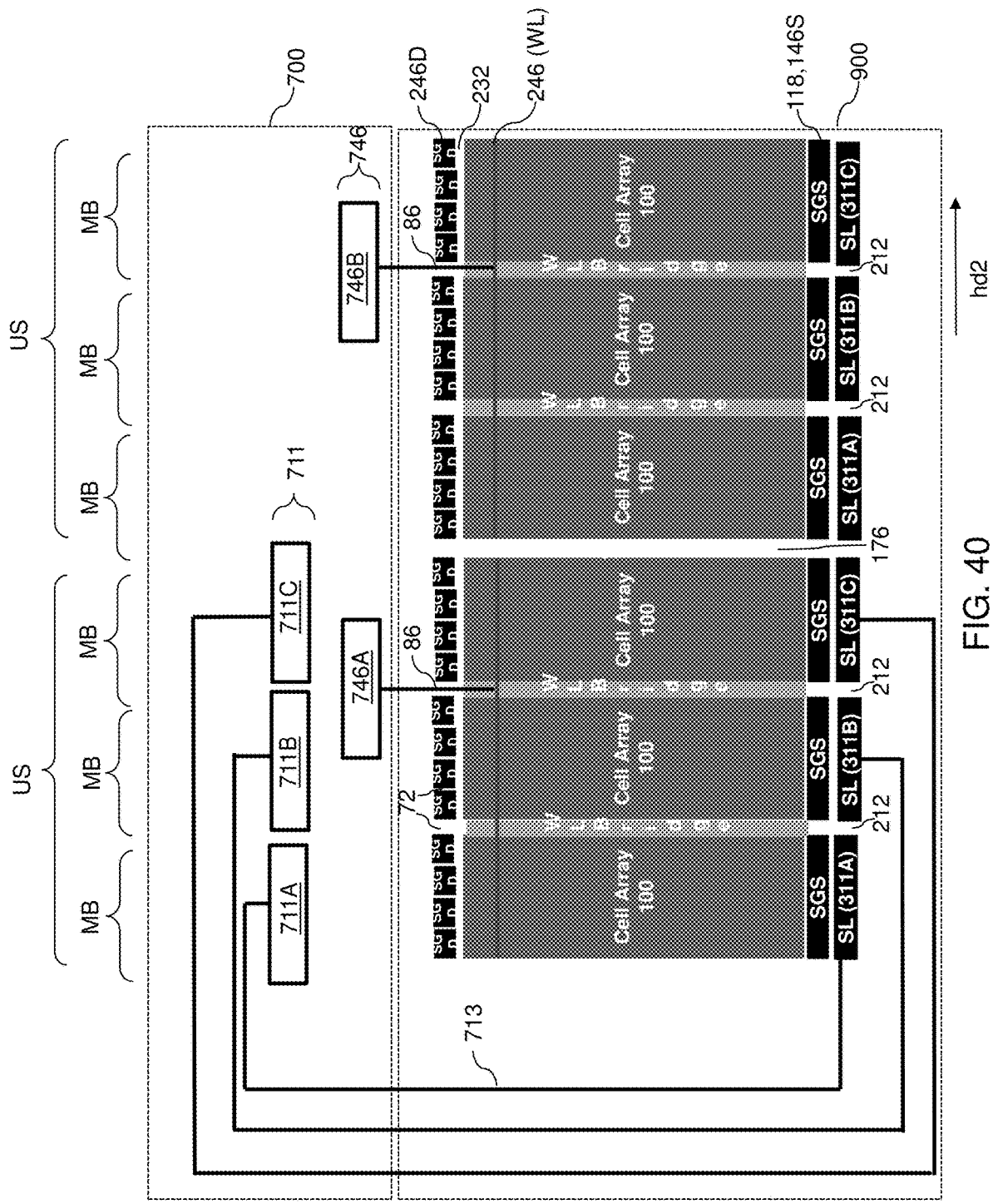

FIG. 40 is a schematic block diagram of the second exemplary structure shown in FIG. 38.

DETAILED DESCRIPTION

The embodiments of the present disclosure are directed to a three-dimensional memory device including laterally separated source lines and methods of manufacturing the same, the various aspects of which are described in detail herebelow.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are used merely to identify similar elements, and different ordinals may be used across the specification and the claims of the instant disclosure. The same reference numerals refer to the same element or similar element. Unless otherwise indicated, elements having the same reference numerals are presumed to have the same composition and the same function. Unless otherwise indicated, a "contact" between elements refers to a direct contact between elements that provides an edge or a surface shared by the elements. As used herein, a first element located "on" a second element may be located on the exterior side of a surface of the second element or on the interior side of the second element. As used herein, a first element is located "directly on" a second element if there exist a physical contact between a surface of the first element and a surface of the second element. As used herein, a first element is "electrically connected to" a second element if there exists a conductive path consisting of at least one conductive material between the first element and the second element. As used herein, a "prototype" structure or an "in-process" structure refers to a transient structure that is subsequently modified in the shape or composition of at least one component therein.

As used herein, a "layer" refers to a material portion including a region having a thickness. A layer may extend over the entirety of an underlying or overlying structure, or may have an extent less than the extent of an underlying or overlying structure. Further, a layer may be a region of a homogeneous or inhomogeneous continuous structure that has a thickness less than the thickness of the continuous structure. For example, a layer may be located between any pair of horizontal planes between, or at, a top surface and a bottom surface of the continuous structure. A layer may extend horizontally, vertically, and/or along a tapered surface. A substrate may be a layer, may include one or more layers therein, or may have one or more layer thereupon, thereabove, and/or therebelow.

As used herein, a first surface and a second surface are "vertically coincident" with each other if the second surface overlies or underlies the first surface and there exists a vertical plane or a substantially vertical plane that includes the first surface and the second surface. A substantially vertical plane is a plane that extends straight along a direction that deviates from a vertical direction by an angle less than 5 degrees. A vertical plane or a substantially vertical plane is straight along a vertical direction or a substantially vertical direction, and may, or may not, include a curvature along a direction that is perpendicular to the vertical direction or the substantially vertical direction.

As used herein, a "memory level" or a "memory array level" refers to the level corresponding to a general region between a first horizontal plane (i.e., a plane parallel to the top surface of the substrate) including topmost surfaces of an array of memory elements and a second horizontal plane including bottommost surfaces of the array of memory elements. As used herein, a "through-stack" element refers to an element that vertically extends through a memory level.

As used herein, a "semiconducting material" refers to a material having electrical conductivity in the range from $1.0 \times 10^{-5}$ S/m to $1.0 \times 10^5$ S/m. As used herein, a "semiconductor material" refers to a material having electrical conductivity in the range from $1.0 \times 10^{-5}$ S/m to 1.0 S/m in the absence of electrical dopants therein, and is capable of producing a doped material having electrical conductivity in a range from 1.0 S/m to $1.0 \times 10^7$ S/m upon suitable doping with an electrical dopant. As used herein, an "electrical dopant" refers to a p-type dopant that adds a hole to a valence band within a band structure, or an n-type dopant that adds an electron to a conduction band within a band structure. As used herein, a "conductive material" refers to a material having electrical conductivity greater than $1.0 \times 10^5$ S/m. As used herein, an "insulator material" or a "dielectric material" refers to a material having electrical conductivity less than $1.0 \times 10^{-5}$ S/m. As used herein, a "heavily doped semiconductor material" refers to a semiconductor material that is doped with electrical dopant at a sufficiently high atomic concentration to become a conductive material either as formed as a crystalline material or if converted into a crystalline material through an anneal process (for example, from an initial amorphous state), i.e., to provide electrical conductivity greater than $1.0 \times 10^5$ S/m. A "doped semiconductor material" may be a heavily doped semiconductor material, or may be a semiconductor material that includes electrical dopants (i.e., p-type dopants and/or n-type dopants) at a concentration that provides electrical conductivity in the range from $1.0 \times 10^{-5}$ S/m to $1.0 \times 10^7$ S/m. An "intrinsic semiconductor material" refers to a semiconductor material that is not doped with electrical dopants. Thus, a semiconductor material may be semiconducting or conductive, and may be an intrinsic semiconductor material or a doped semiconductor material. A doped semiconductor material may be semiconducting or conductive depending on the atomic concentration of electrical dopants therein. As used herein, a "metallic material" refers to a conductive material including at least one metallic element therein. All measurements for electrical conductivities are made at the standard condition.

Generally, a semiconductor package (or a "package") refers to a unit semiconductor device that may be attached to a circuit board through a set of pins or solder balls. A semiconductor package may include a semiconductor chip (or a "chip") or a plurality of semiconductor chips that are bonded throughout, for example, by flip-chip bonding or another chip-to-chip bonding. A package or a chip may include a single semiconductor die (or a "die") or a plurality of semiconductor dies. A die is the smallest unit that may independently execute external commands or report status. Typically, a package or a chip with multiple dies is capable of simultaneously executing as many number of external commands as the total number of dies therein. Each die includes one or more planes. Identical concurrent operations may be executed in each plane within a same die, although there may be some restrictions. In case a die is a memory die, i.e., a die including memory elements, concurrent read operations, concurrent write operations, or concurrent erase operations may be performed in each plane within a same memory die. In a memory die, each plane contains a number of memory blocks (or "blocks"), which are the smallest unit that may be erased by in a single erase operation. Each memory block contains a number of pages, which are the smallest units that may be selected for programming. A page is also the smallest unit that may be selected to a read operation.

Figure 1A:
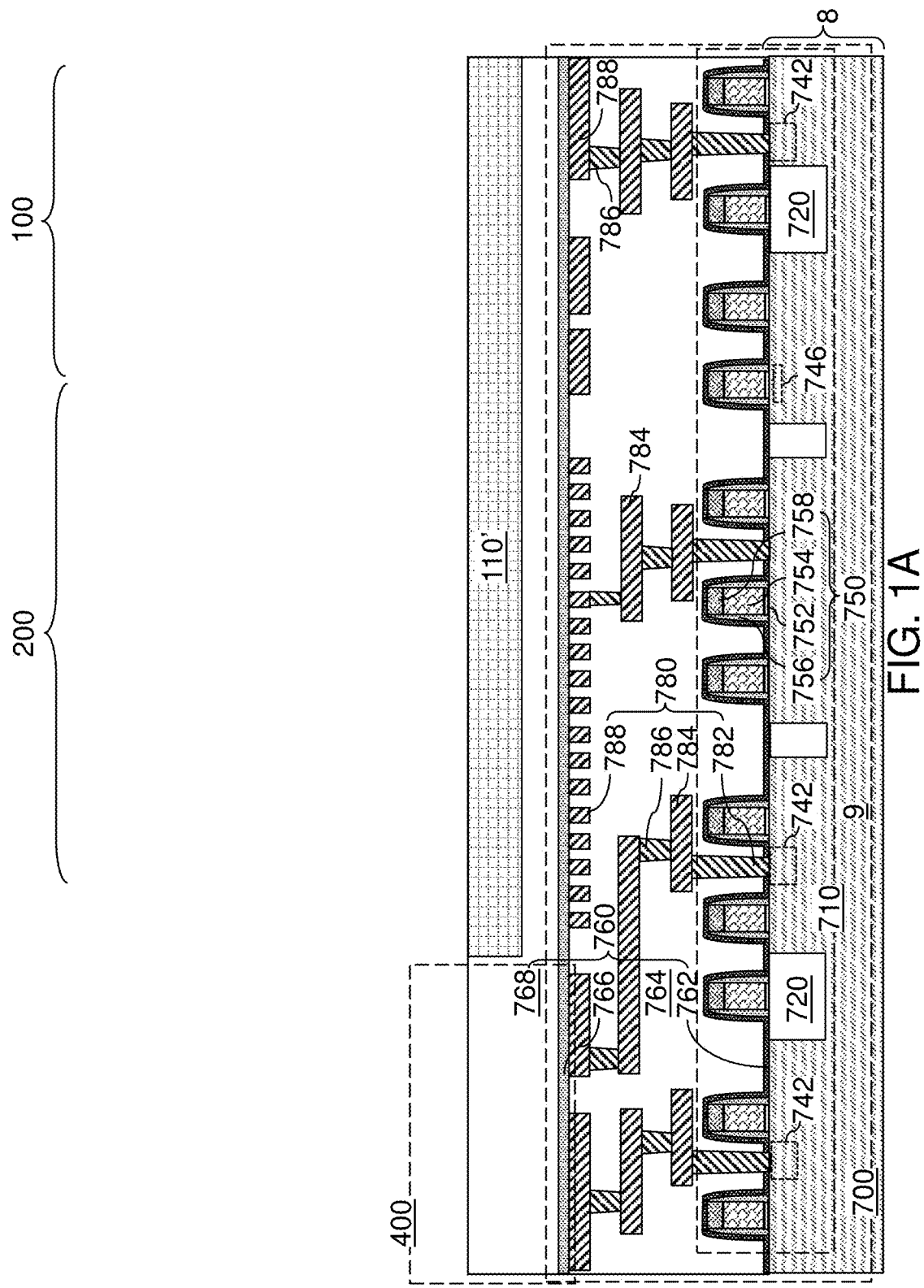
FIG. 1A is a vertical cross-sectional view of a first exemplary structure after formation of semiconductor devices, lower level dielectric layers, lower-level metal interconnect structures, and in-process source-level material layers according to a first embodiment of the present disclosure.
Figure 1B:
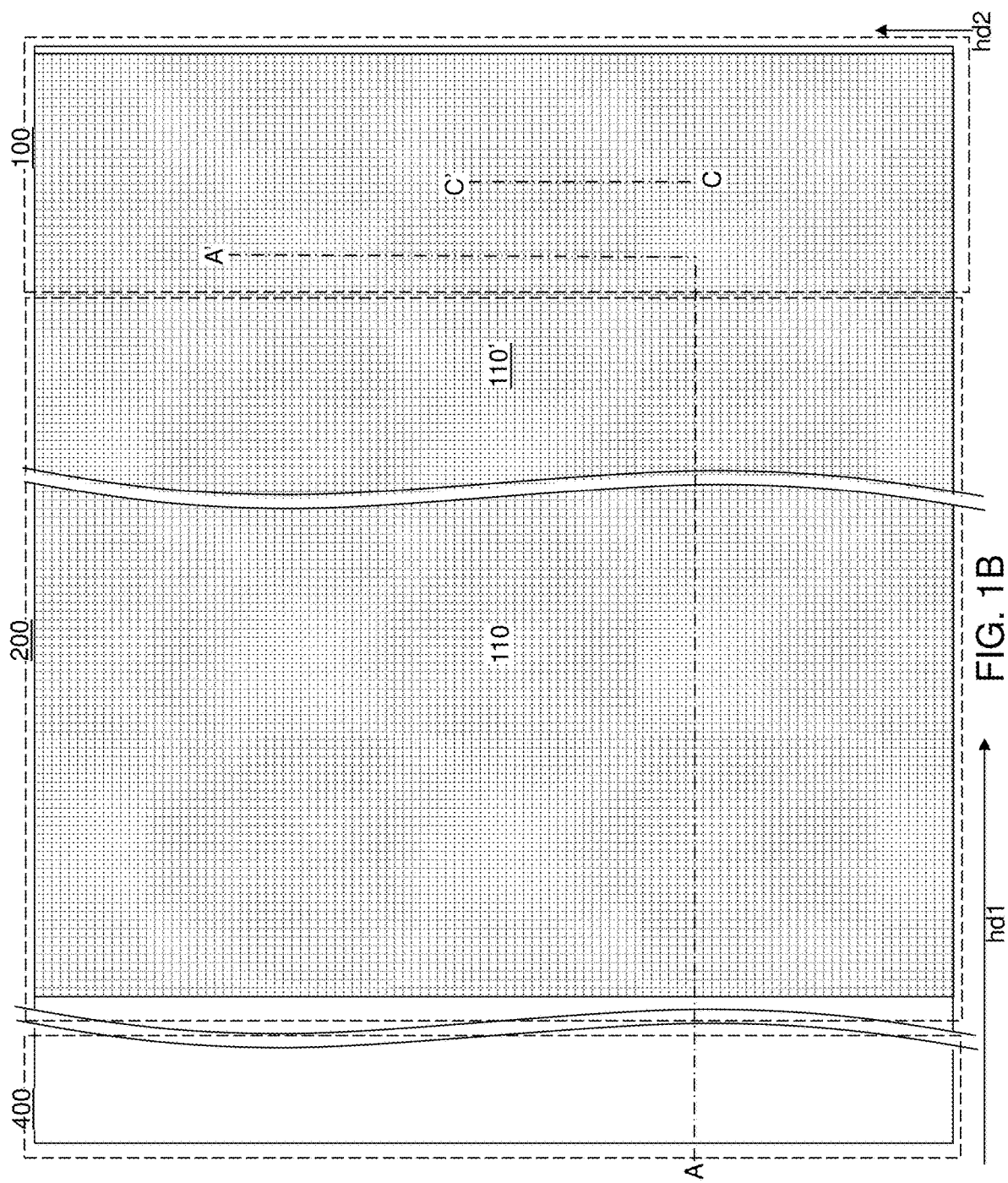
FIG. 1B is a top-down view of the first exemplary structure of FIG. 1A. The vertical plane A-A' is the plane of the vertical cross-sectional view of FIG. 1A.

Referring to FIGS. 1A-1C, a first exemplary structure according to a first embodiment of the present disclosure is illustrated. The first exemplary structure includes a semiconductor substrate 8 and a peripheral circuitry 710 formed thereupon. The first exemplary structure includes a memory array region 100 in which a three-dimensional memory array is to be subsequently formed, a staircase region 200 in which stepped surfaces of electrically conductive layers and contact via structures are to be subsequently formed, and a connection region 400 in which peripheral contact via structures are to be subsequently formed.

The semiconductor substrate 8 includes a substrate semiconductor layer 9 at least at an upper portion thereof. Various doped wells can be formed in upper portions of the substrate semiconductor layer 9. Shallow trench isolation structures 720 can be formed in an upper portion of the substrate semiconductor layer 9 to provide electrical isolation among the semiconductor devices. The peripheral circuitry 710 includes field effect transistors including respective transistor active regions 742 (i.e., source regions and drain regions), channel regions 746, and gate structures 750. The field effect transistors may be arranged in a CMOS configuration. Each gate structure 750 can include, for example, a gate dielectric 752, a gate electrode 754, a dielectric gate spacer 756 and a gate cap dielectric 758.

The peripheral circuitry 710 can include additional semiconductor devices in addition to p-type field effect transistors and n-type field effect transistors, which can be employed to support operation of a memory structure to be subsequently formed. The peripheral circuitry 710 includes a driver circuitry, which is also referred to as a peripheral circuitry. As used herein, a peripheral circuitry refers to any, each, or all, of word line decoder circuitry, word line switching circuitry, bit line decoder circuitry, bit line sensing and/or switching circuitry, power supply/distribution circuitry, data buffer and/or latch, or any other semiconductor circuitry that can be implemented outside a memory array structure for a memory device. For example, the semiconductor devices can include word line switching devices for electrically biasing word lines of three-dimensional memory structures to be subsequently formed.

Dielectric material layers are formed over the semiconductor devices, which are herein referred to as lower-level dielectric material layers 760. The lower-level dielectric material layers 760 can include, for example, a dielectric liner 762 (such as a silicon nitride liner that blocks diffusion of mobile ions and/or apply appropriate stress to underlying structures), first dielectric material layers 764 that overlie the dielectric liner 762, a silicon nitride layer (e.g., hydrogen diffusion barrier) 766 that overlies the first dielectric material layers 764, and at least one second dielectric layer 768.

The dielectric layer stack including the lower-level dielectric material layers 760 functions as a matrix for lower-level metal interconnect structures 780 that provide electrical wiring among the various nodes of the semiconductor devices and landing pads for through-memory-level contact via structures to be subsequently formed. The lower-level metal interconnect structures 780 are embedded within the dielectric layer stack of the lower-level dielectric material layers 760, and comprise a lower-level metal line structure located under and optionally contacting a bottom surface of the silicon nitride layer 766.

For example, the lower-level metal interconnect structures 780 can be embedded within the first dielectric material layers 764. The first dielectric material layers 764 may be a plurality of dielectric material layers in which various elements of the lower-level metal interconnect structures 780 are sequentially embedded. Each dielectric material layer among the first dielectric material layers 764 may include any of doped silicate glass, undoped silicate glass, organosilicate glass, silicon nitride, silicon oxynitride, and dielectric metal oxides (such as aluminum oxide).

In one embodiment, the first dielectric material layers 764 can comprise, or consist essentially of, dielectric material layers having dielectric constants that do not exceed the dielectric constant of undoped silicate glass (silicon oxide) of 3.9. The lower-level metal interconnect structures 780 can include various device contact via structures 782 (e.g., source and drain electrodes which contact the respective source and drain nodes of the device or gate electrode contacts), intermediate lower-level metal line structures 784, and lower-level metal via structures 786. A subset of the lower-level metal line structures 784 and/or the lower-level metal via structures 786 may be configured to function as landing pads for through-memory-level contact via structures to be subsequently formed.

The at least one second dielectric material layer 768 may include a single dielectric material layer or a plurality of dielectric material layers. Each dielectric material layer among the at least one second dielectric material layer 768 may include any of doped silicate glass, undoped silicate glass, and organosilicate glass. In one embodiment, the at least one second dielectric material layer 768 can comprise, or consist essentially of, dielectric material layers having dielectric constants that do not exceed the dielectric constant of undoped silicate glass (silicon oxide) of 3.9.

The peripheral circuitry 710 can include peripheral devices for the memory-level assembly to be subsequently formed. The lower-level metal interconnect structures 780 are embedded in the lower-level dielectric layers 760. The combination of the lower-level dielectric layers 760 and the lower-level metal interconnect structures 780 overlie the peripheral circuitry 710.

The lower-level metal interconnect structures 780 can be electrically connected to active nodes (e.g., transistor active regions 742 or gate electrodes 754) of the peripheral circuitry 710 (e.g., CMOS devices), and are located at the level of the lower-level dielectric layers 760. Through-memory-level contact via structures can be subsequently formed directly on the lower-level metal interconnect structures 780 to provide electrical connection to memory devices to be subsequently formed.

In-process source-level material layers 110' including a layer stack of material layers can be formed over lower-level dielectric layers 760. The in-process source-level material layers 110' can include various layers that are subsequently modified to form source-level material layers. The source-level material layers, upon formation, include a source contact layer that functions as a common source region for vertical field effect transistors of a three-dimensional memory device.

In one embodiment, the in-process source-level material layer 110' can include, from bottom to top, a lower source-level material layer 112, a lower sacrificial liner 103, a source-level sacrificial layer 104, an upper sacrificial liner 105, an upper source-level material layer 116, a source-level insulating layer 117, and an optional source-select-level conductive layer 118.

The lower source-level material layer 112 and the upper source-level material layer 116 can include a doped semiconductor material such as doped polysilicon or doped amorphous silicon. The doped semiconductor material of the lower source-level material layer 112 is herein referred to as a first doped semiconductor material, and the doped semiconductor material of the upper source-level material layer 116 is herein referred to as a second doped semiconductor material, which may be the same or different from the first doped semiconductor material.

The conductivity type of the lower source-level material layer 112 and the upper source-level material layer 116 can be the opposite of the conductivity of vertical semiconductor channels to be subsequently formed. For example, if the vertical semiconductor channels to be subsequently formed have a doping of a first conductivity type, the lower source-level material layer 112 and the upper source-level material layer 116 have a doping of a second conductivity type that is the opposite of the first conductivity type. The thickness of each of the lower source-level material layer 112 and the upper source-level material layer 116 can be in a range from 10 nm to 300 nm, such as from 20 nm to 150 nm, although lesser and greater thicknesses can also be employed.

The source-level sacrificial layer 104 includes a sacrificial material that can be removed selective to the lower sacrificial liner 103 and the upper sacrificial liner 105. In one embodiment, the source-level sacrificial layer 104 can include a dielectric material such as silicon nitride, or a semiconductor material such as undoped amorphous silicon or a silicon-germanium alloy with an atomic concentration of germanium greater than 20%. The thickness of the source-level sacrificial layer 104 can be in a range from 30 nm to 400 nm, such as from 60 nm to 200 nm, although lesser and greater thicknesses can also be employed.

The lower sacrificial liner 103 and the upper sacrificial liner 105 include materials that can function as an etch stop material during removal of the source-level sacrificial layer 104. For example, the lower sacrificial liner 103 and the upper sacrificial liner 105 can include silicon oxide, silicon nitride, and/or a dielectric metal oxide. In one embodiment, each of the lower sacrificial liner 103 and the upper sacrificial liner 105 can include a silicon oxide layer having a thickness in a range from 2 nm to 30 nm, although lesser and greater thicknesses can also be employed.

The source-level insulating layer 117 includes a dielectric material such as silicon oxide. The thickness of the source-level insulating layer 117 can be in a range from 20 nm to 400 nm, such as from 40 nm to 200 nm, although lesser and greater thicknesses can also be employed. The optional source-select-level conductive layer 118 can include a conductive material that can be employed as a source-select-level gate electrode. For example, the optional source-select-level conductive layer 118 can include a doped semiconductor material such as doped polysilicon or doped amorphous silicon that can be subsequently converted into doped polysilicon by an anneal process. The thickness of the optional source-level conductive layer 118 can be in a range from 30 nm to 200 nm, such as from 60 nm to 100 nm, although lesser and greater thicknesses can also be employed.

The in-process source-level material layers 110' can be formed directly above a subset of the semiconductor devices on the semiconductor substrate 8 (e.g., silicon wafer). As used herein, a first element is located "directly above" a second element if the first element is located above a horizontal plane including a topmost surface of the second element and an area of the first element and an area of the second element has an areal overlap in a plan view (i.e., along a vertical plane or direction perpendicular to the top surface of the substrate 8.

The in-process source-level material layers 110' may be patterned to provide openings in areas in which through-memory-level contact via structures and through-dielectric contact via structures are to be subsequently formed. Patterned portions of the in-process source-level material layers 110' are present in each memory array region 100 in which three-dimensional memory stack structures are to be subsequently formed. The at least one second dielectric material layer 768 can include a blanket layer portion underlying the in-process source-level material layers 110' and a patterned portion that fills gaps among the patterned portions of the in-process source-level material layers 1110'.

The in-process source-level material layers 110' can be patterned such that an opening extends over a staircase region 200 in which contact via structures contacting word line electrically conductive layers are to be subsequently formed. In one embodiment, the staircase region 200 can be laterally spaced from the memory array region 100 along a first horizontal direction hd1. A horizontal direction that is perpendicular to the first horizontal direction hd1 is herein referred to as a second horizontal direction hd2.

Figure 2A:
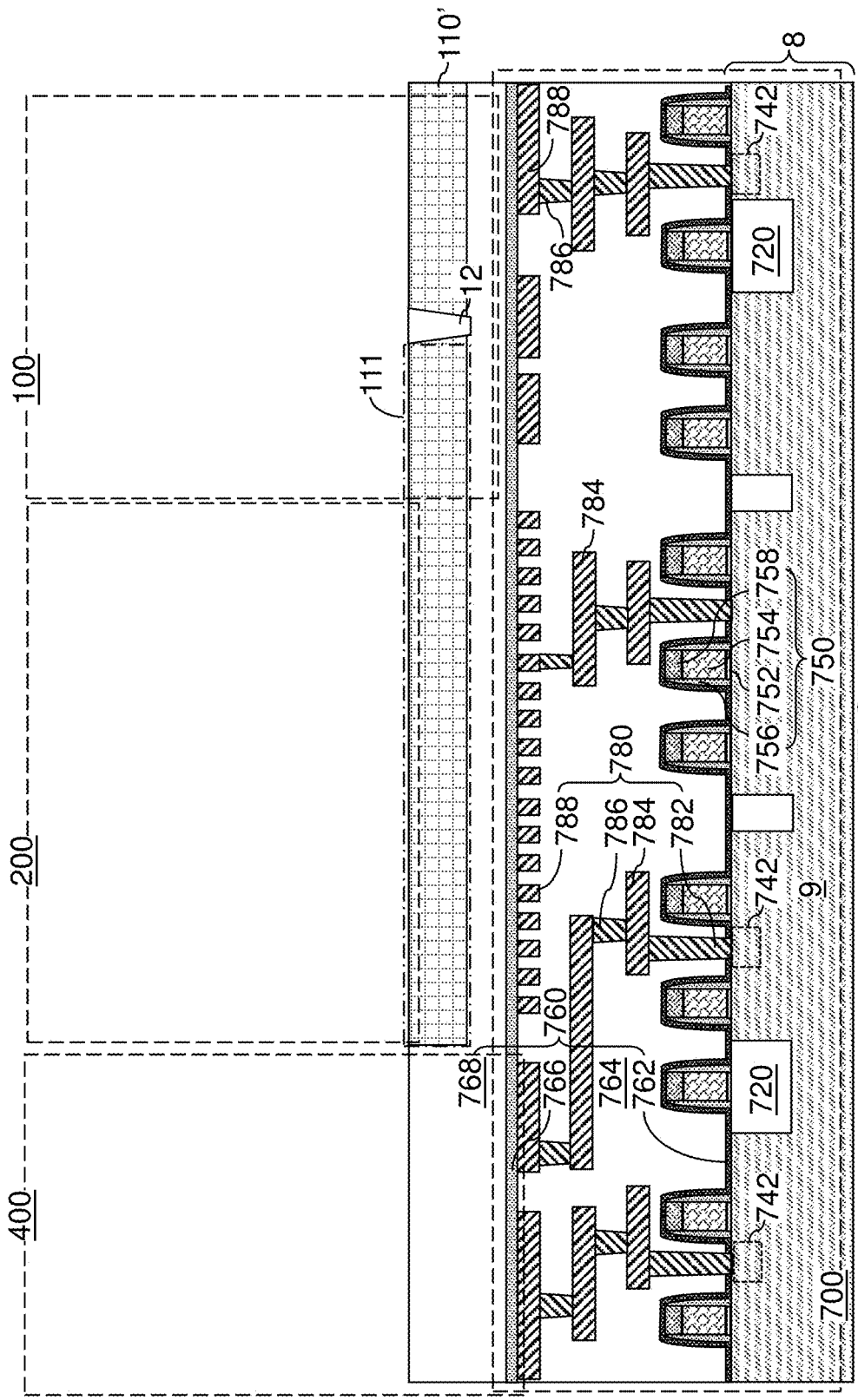
FIG. 2A is a vertical cross-sectional view of the first exemplary structure after formation of a laterally alternating sequence of source layer segments and source isolation dielectric structures according to the first embodiment of the present disclosure.
Figure 2B:
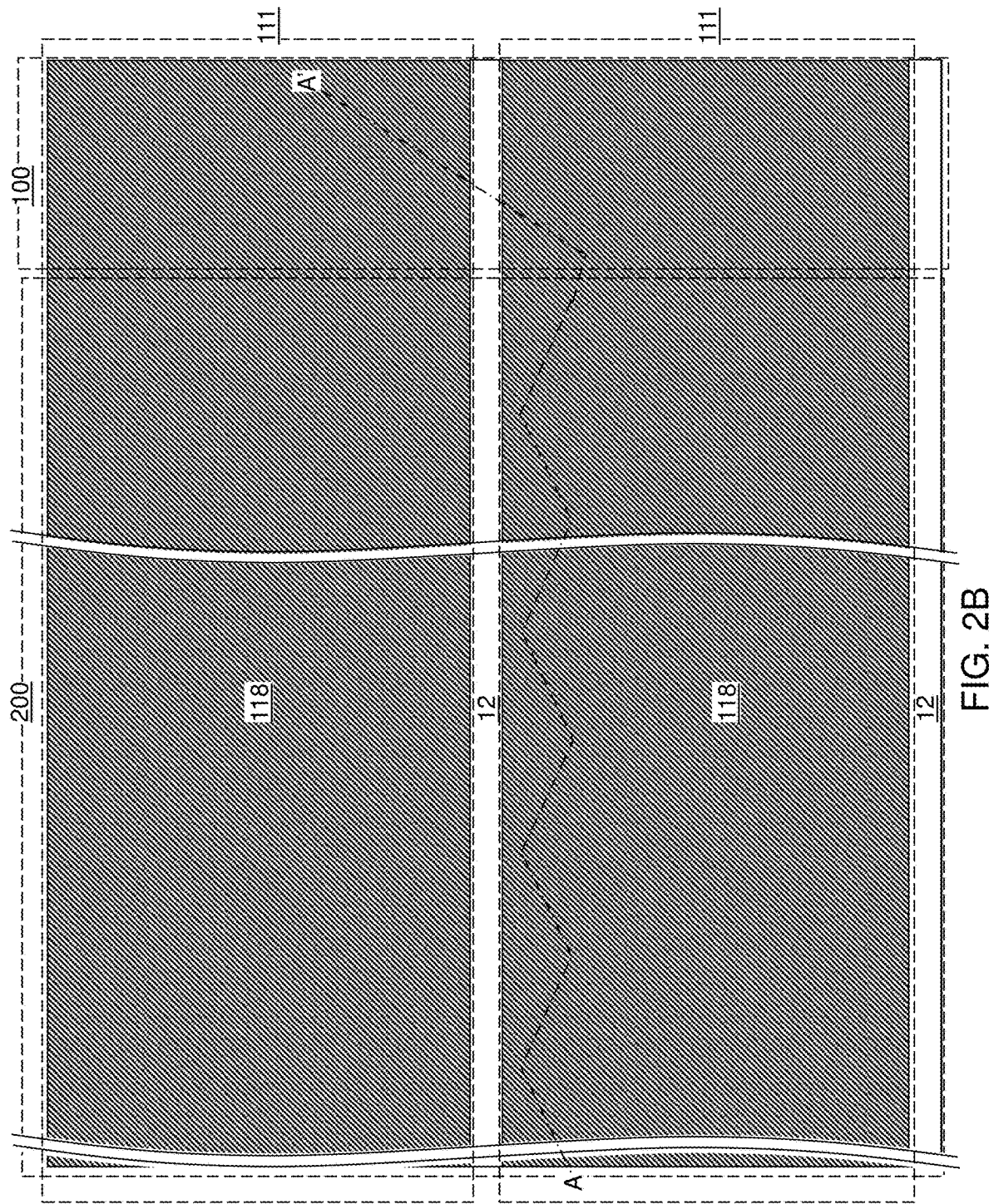
FIG. 2B is a top-down view of the first exemplary structure of FIG. 2A. The vertical plane A-A' is the plane of the vertical cross-sectional view of FIG. 2A.
Figure 2C:
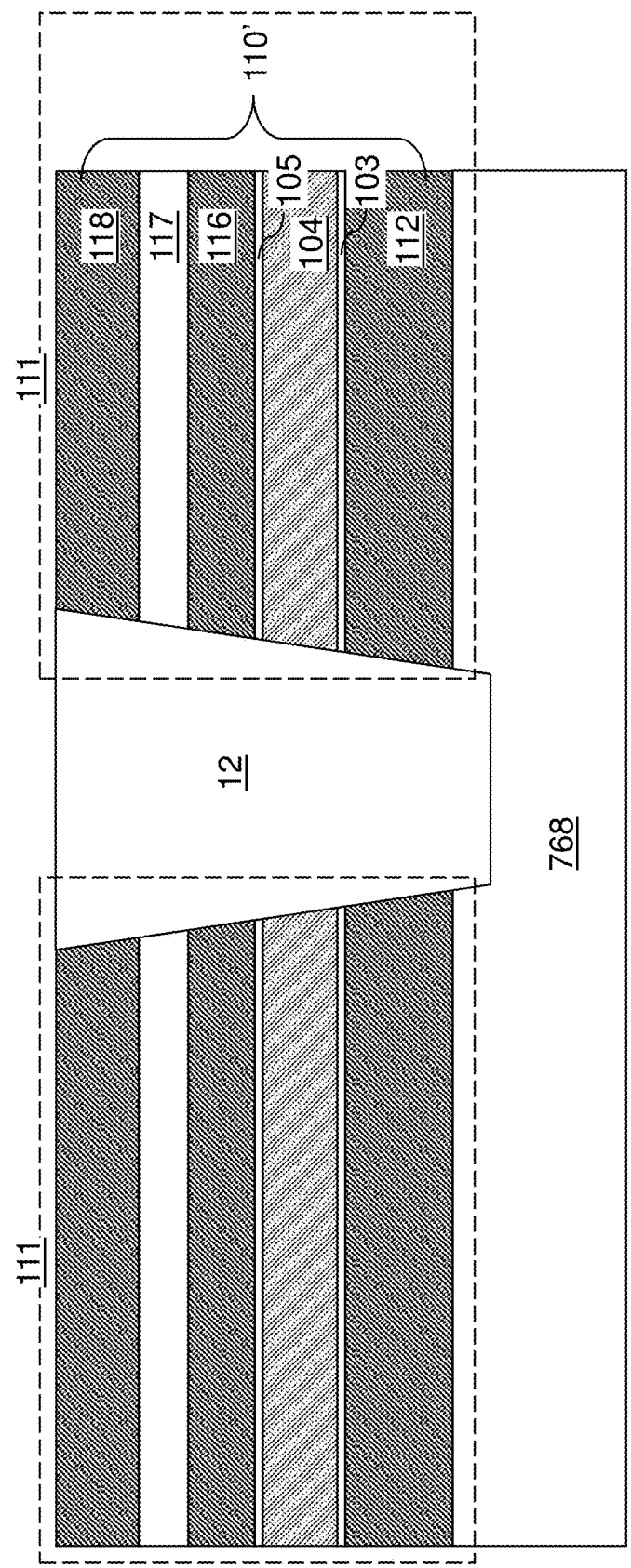
FIG. 2C is a vertical cross-sectional view of the first exemplary structure along the vertical plane C-C' of FIG. 2B.

Referring to FIGS. 2A-2C, a photoresist layer (not shown) can be applied to the top surface of the in-process source-level material layers 110', and can be lithographically patterned to form line-shaped openings that laterally extend along a first horizontal direction (e.g., word line direction) hd1 and laterally spaced apparat along a second horizontal direction (e.g., bit line direction) hd2 that is perpendicular to the first horizontal direction hd1. In one embodiment, the first horizontal direction hd1 may be a perpendicular to the boundary between the memory array region 100 and the staircase region 200.

An anisotropic etch process can be performed to transfer the pattern of the openings in the photoresist layer through the in-process source-level material layers 110'. Laterally-extending trenches, which are herein referred to as source isolation trenches, are formed in volumes from the materials of the in-process source-level material layers 110' are etched by the anisotropic etch process. A surface of the at least one second dielectric layer 768 can be physically exposed at the bottom of each of the source isolation trenches. The source isolation trenches may have tapered sidewalls with a taper angle (as measured from a vertical direction) in a range from 0.5 degree to 15 degrees, such as from 1 degree to 10 degrees. Each patterned portion of the in-process source-level material layers 110' is herein referred to as a source layer segment 111. Each source layer segment 111 laterally extends along the first horizontal direction hd1, and may have a respective width along the second horizontal direction hd2. The source layer segments 111 can be laterally spaced apart from each other, and may be arranged as a one-dimensional periodic array having a periodicity along the second horizontal direction hd2.

The photoresist layer can be subsequently removed, for example, by ashing. A dielectric fill material, such as silicon oxide, can be deposited in the source isolation trenches, and excess portions of the dielectric fill material can be removed from above the horizontal plane including the top surfaces of the source layer segments 111 by performing a planarization process. The planarization process may comprise a recess etch process and/or a chemical mechanical polishing (CMP) process. Each remaining portion of the dielectric fill material that fills a respective one of the source isolation trenches constitutes a source isolation dielectric structure 12. A laterally alternating sequence of source layer segments 111 and source isolation dielectric structures 12 can be formed. In one embodiment, each of the source isolation dielectric structures 12 laterally extend along the first horizontal direction hd1. One, a plurality and/or each of the isolation dielectric structures 12 may have a variable width along the second horizontal direction hd2 that increases with a vertical distance from the substrate 8. In other words, the top portion of one, a plurality and/or each, of the source isolation dielectric structures 12 may be wider than the bottom portion of a respective one of the source isolation dielectric structures 12.

Figure 3:
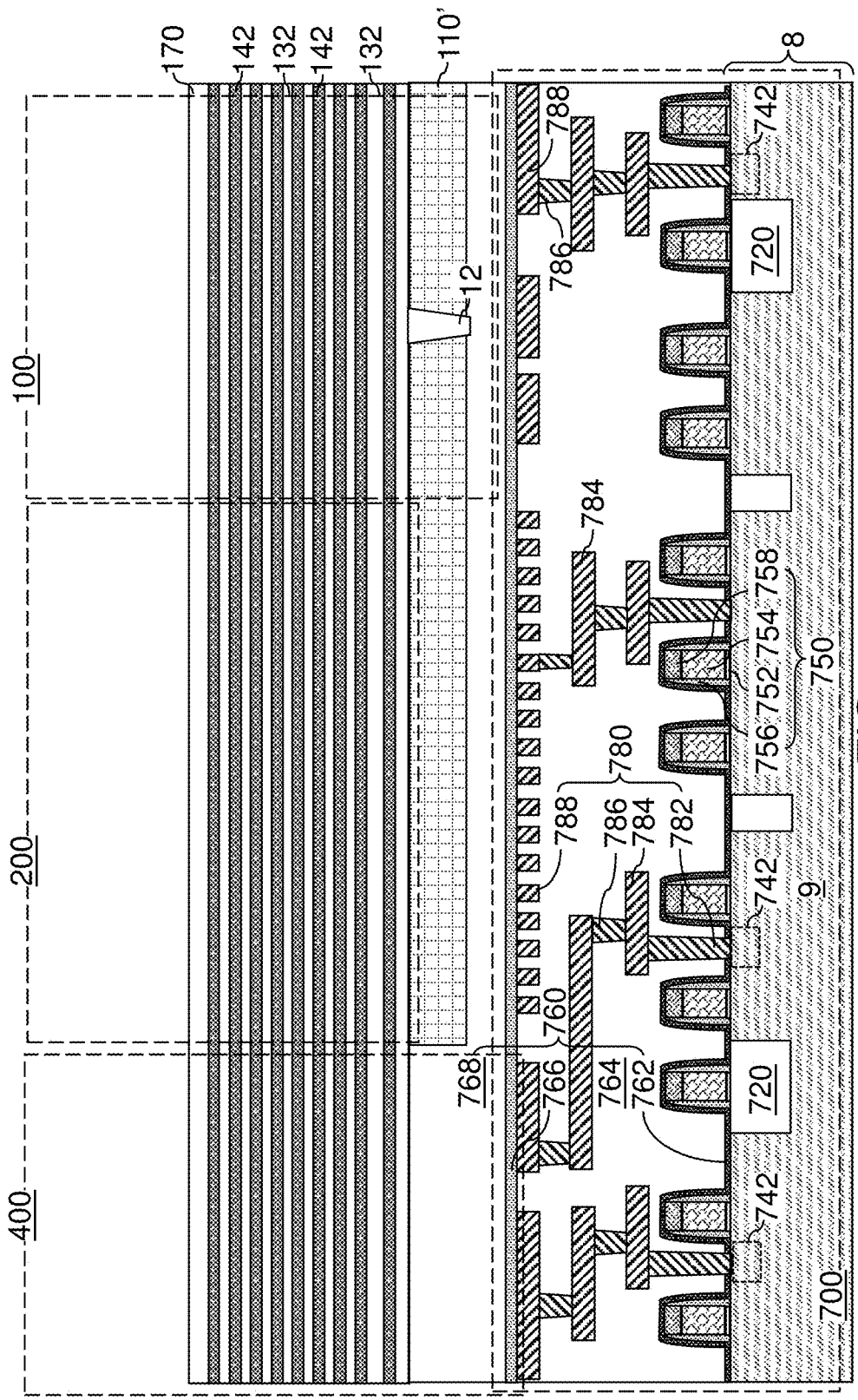
FIG. 3 is a vertical cross-sectional view of the first exemplary structure after formation of a first vertically alternating sequence of first insulating layers and first spacer material layers according to the first embodiment of the present disclosure.

Referring to FIG. 3, an alternating stack of first material layers and second material layers is subsequently formed. Each first material layer can include a first material, and each second material layer can include a second material that is different from the first material. In case at least another alternating stack of material layers is subsequently formed over the alternating stack of the first material layers and the second material layers, the alternating stack is herein referred to as a first vertically alternating sequence. The level of the first vertically alternating sequence is herein referred to as a first-tier level, and the level of the alternating stack to be subsequently formed immediately above the first-tier level is herein referred to as a second-tier level, etc.

The first vertically alternating sequence can include first insulating layers 132 as the first material layers, and first spacer material layers as the second material layers. In one embodiment, the first spacer material layers can be sacrificial material layers that are subsequently replaced with electrically conductive layers. In another embodiment, the first spacer material layers can be electrically conductive layers that are not subsequently replaced with other layers. While the present disclosure is described employing embodiments in which sacrificial material layers are replaced with electrically conductive layers, embodiments in which the spacer material layers are formed as electrically conductive layers (thereby obviating the need to perform replacement processes) are expressly contemplated herein.

In one embodiment, the first material layers and the second material layers can be first insulating layers 132 and first sacrificial material layers 142, respectively. In one embodiment, each first insulating layer 132 can include a first insulating material, and each first sacrificial material layer 142 can include a first sacrificial material. An alternating plurality of first insulating layers 132 and first sacrificial material layers 142 is formed over the in-process source-level material layers. As used herein, a "sacrificial material" refers to a material that is removed during a subsequent processing step.

As used herein, an alternating stack of first elements and second elements refers to a structure in which instances of the first elements and instances of the second elements alternate. Each instance of the first elements that is not an end element of the alternating plurality is adjoined by two instances of the second elements on both sides, and each instance of the second elements that is not an end element of the alternating plurality is adjoined by two instances of the first elements on both ends. The first elements may have the same thickness thereamongst, or may have different thicknesses. The second elements may have the same thickness thereamongst, or may have different thicknesses. The alternating plurality of first material layers and second material layers may begin with an instance of the first material layers or with an instance of the second material layers, and may end with an instance of the first material layers or with an instance of the second material layers. In one embodiment, an instance of the first elements and an instance of the second elements may form a unit that is repeated with periodicity within the alternating plurality.

The first vertically alternating sequence (132, 142) can include first insulating layers 132 composed of the first material, and first sacrificial material layers 142 composed of the second material, which is different from the first material. The first material of the first insulating layers 132 can be at least one insulating material. Insulating materials that can be employed for the first insulating layers 132 include, but are not limited to silicon oxide (including doped or undoped silicate glass), silicon nitride, silicon oxynitride, organosilicate glass (OSG), spin-on dielectric materials, dielectric metal oxides that are commonly known as high dielectric constant (high-k) dielectric oxides (e.g., aluminum oxide, hafnium oxide, etc.) and silicates thereof, dielectric metal oxynitrides and silicates thereof, and organic insulating materials. In one embodiment, the first material of the first insulating layers 132 can be silicon oxide.

The second material of the first sacrificial material layers 142 is a sacrificial material that can be removed selective to the first material of the first insulating layers 132. As used herein, a removal of a first material is "selective to" a second material if the removal process removes the first material at a rate that is at least twice the rate of removal of the second material. The ratio of the rate of removal of the first material to the rate of removal of the second material is herein referred to as a "selectivity" of the removal process for the first material with respect to the second material.

The first sacrificial material layers 142 may comprise an insulating material, a semiconductor material, or a conductive material. The second material of the first sacrificial material layers 142 can be subsequently replaced with electrically conductive electrodes which can function, for example, as control gate electrodes of a vertical NAND device. In one embodiment, the first sacrificial material layers 142 can be material layers that comprise silicon nitride.

In one embodiment, the first insulating layers 132 can include silicon oxide, and sacrificial material layers can include silicon nitride sacrificial material layers. The first material of the first insulating layers 132 can be deposited, for example, by chemical vapor deposition (CVD). For example, if silicon oxide is employed for the first insulating layers 132, tetraethylorthosilicate (TEOS) can be employed as the precursor material for the CVD process. The second material of the first sacrificial material layers 142 can be formed, for example, CVD or atomic layer deposition (ALD).

The thicknesses of the first insulating layers 132 and the first sacrificial material layers 142 can be in a range from 20 nm to 50 nm, although lesser and greater thicknesses can be employed for each first insulating layer 132 and for each first sacrificial material layer 142. The number of repetitions of the pairs of a first insulating layer 132 and a first sacrificial material layer 142 can be in a range from 2 to 1,024, and typically from 8 to 256, although a greater number of repetitions can also be employed. In one embodiment, each first sacrificial material layer 142 in the first vertically alternating sequence (132, 142) can have a uniform thickness that is substantially invariant within each respective first sacrificial material layer 142.

A first insulating cap layer 170 is subsequently formed over the alternating stack (132, 142). The first insulating cap layer 170 includes a dielectric material, which can be any dielectric material that can be employed for the first insulating layers 132. In one embodiment, the first insulating cap layer 170 includes the same dielectric material as the first insulating layers 132. The thickness of the insulating cap layer 170 can be in a range from 20 nm to 300 nm, although lesser and greater thicknesses can also be employed.

Figure 4:
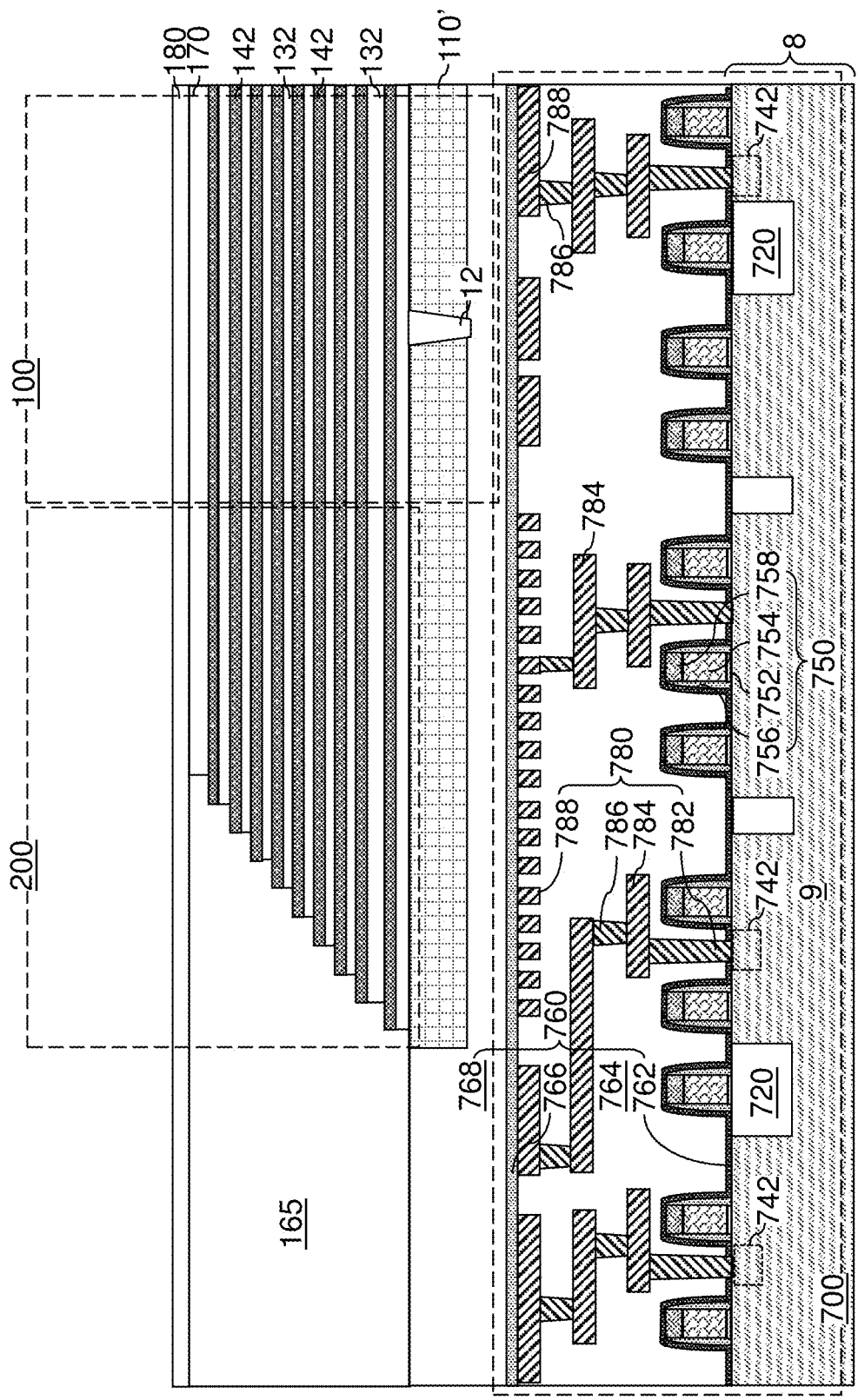
FIG. 4 is a vertical cross-sectional view of the first exemplary structure after patterning first stepped surfaces, a first retro-stepped dielectric material portion, and an inter-tier dielectric layer according to the first embodiment of the present disclosure.

Referring to FIG. 4, the first insulating cap layer 170 and the first vertically alternating sequence (132, 142) can be patterned to form first stepped surfaces in the staircase region 200. The staircase region 200 can include a respective first stepped area in which the first stepped surfaces are formed, and a second stepped area in which additional stepped surfaces are to be subsequently formed in a second-tier structure (to be subsequently formed over a first-tier structure) and/or additional tier structures. The first stepped surfaces can be formed, for example, by forming a mask layer with an opening therein, etching a cavity within the levels of the first insulating cap layer 170, and iteratively expanding the etched area and vertically recessing the cavity by etching each pair of a first insulating layer 132 and a first sacrificial material layer 142 located directly underneath the bottom surface of the etched cavity within the etched area. In one embodiment, top surfaces of the first sacrificial material layers 142 can be physically exposed at the first stepped surfaces. The cavity overlying the first stepped surfaces is herein referred to as a first stepped cavity.

A dielectric fill material (such as undoped silicate glass or doped silicate glass) can be deposited to fill the first stepped cavity. Excess portions of the dielectric fill material can be removed from above the horizontal plane including the top surface of the first insulating cap layer 170. A remaining portion of the dielectric fill material that fills the region overlying the first stepped surfaces constitute a first retro-stepped dielectric material portion 165. As used herein, a "retro-stepped" element refers to an element that has stepped surfaces and a horizontal cross-sectional area that increases monotonically as a function of a vertical distance from a top surface of a substrate on which the element is present. The first vertically alternating sequence (132, 142) and the first retro-stepped dielectric material portion 165 collectively constitute a first-tier structure, which is an in-process structure that is subsequently modified.

An inter-tier dielectric layer 180 may be optionally deposited over the first-tier structure (132, 142, 170, 165). The inter-tier dielectric layer 180 includes a dielectric material such as silicon oxide. In one embodiment, the inter-tier dielectric layer 180 can include a doped silicate glass having a greater etch rate than the material of the first insulating layers 132 (which can include an undoped silicate glass). For example, the inter-tier dielectric layer 180 can include phosphosilicate glass. The thickness of the inter-tier dielectric layer 180 can be in a range from 30 nm to 300 nm, although lesser and greater thicknesses can also be employed.

Figure 5A:
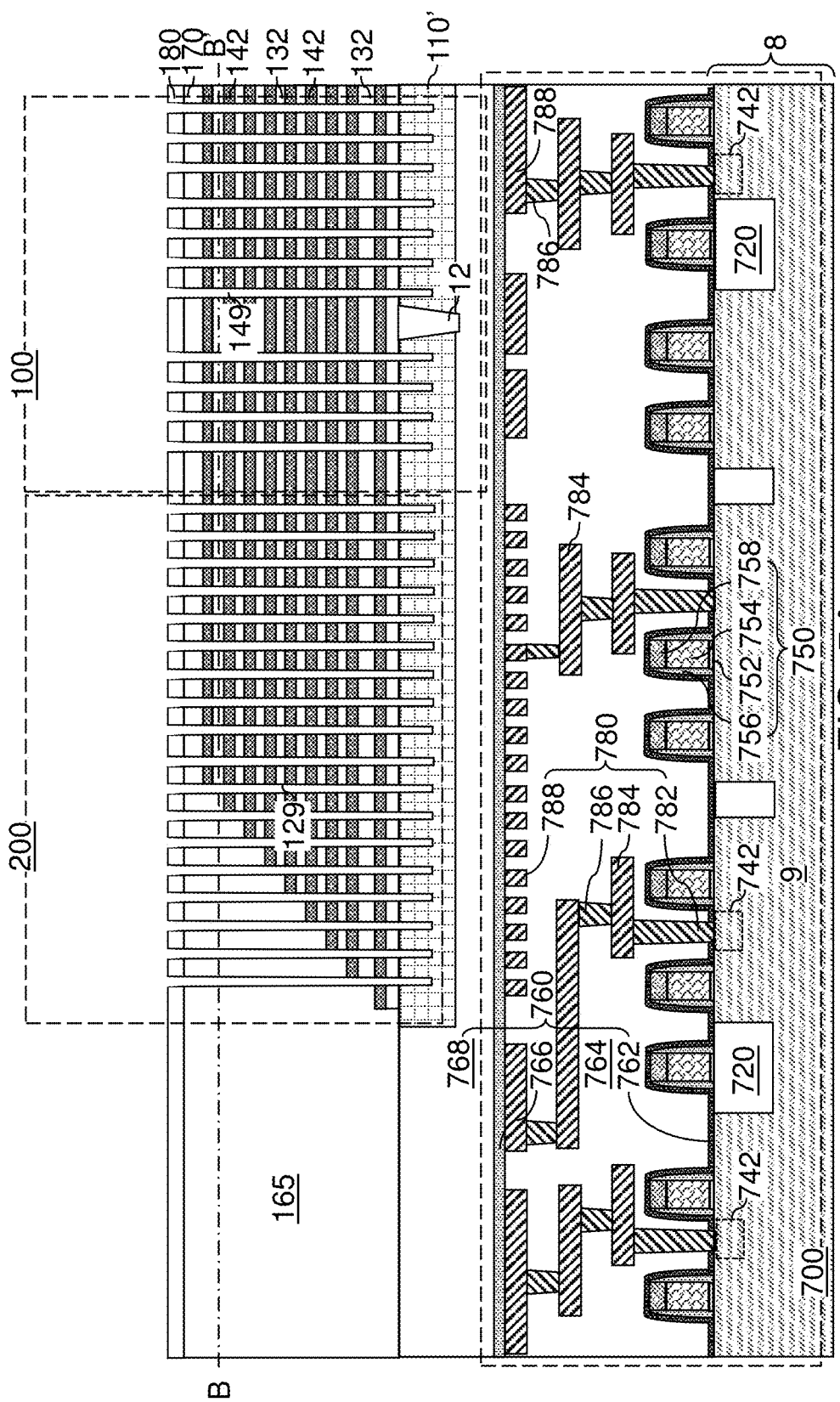
FIG. 5A is a vertical cross-sectional view of the first exemplary structure after formation of first-tier memory openings and first-tier support openings according to the first embodiment of the present disclosure.

Referring to FIGS. 5A and 5B, first-tier openings (149, 129) can be formed through the inter-tier dielectric layer 180 and the first-tier structure (132, 142, 170, 165) and partly through the in-process source-level material layers 110'. For example, a photoresist layer (not shown) can be applied over the inter-tier dielectric layer 180, and can be lithographically patterned to form various openings therethrough. The pattern of openings in the photoresist layer can be transferred through the inter-tier dielectric layer 180 and the first-tier structure (132, 142, 170, 165) and partly through the in-process source-level material layers 110' by a first anisotropic etch process to form the first-tier openings (149, 129) concurrently, i.e., during the first anisotropic etch process.

The first-tier openings (149, 129) can include first-tier memory openings 149 and first-tier support openings 129. The first-tier memory openings 149 are openings that are formed in the memory array region 100 through each layer within the first alternating stack (132, 142) and are subsequently employed to form memory stack structures therein. The bottom surfaces of the first-tier openings (149, 129) can be a recessed surface of the source-level sacrificial layer 104. Thus, each first-tier opening (149, 129) can have a bottom surface between a horizontal plane including the bottom surface of the source-level sacrificial layer 104 and a horizontal plane including the top surface of the source-level sacrificial layer 104. In one embodiment, bottom surface of the first-tier openings (149, 129) may be formed within the lower source-level material layer 112.

The first-tier support openings 129 are openings that are formed in the staircase region 200 and are subsequently employed to form support structures that are subsequently employed to provide structural support to the first exemplary structure during replacement of sacrificial material layers with electrically conductive layers. In case the first spacer materials are formed as first electrically conductive layers, the first-tier support openings 129 can be omitted. A subset of the first-tier support openings 129 can be formed through horizontal surfaces of the first stepped surfaces of the first alternating stack (132, 142).

In one embodiment, the first-tier memory openings 149 can be formed as clusters that are laterally spaced among one another along the second horizontal direction hd2. Each cluster of first-tier memory openings 149 can include a respective two-dimensional array of first-tier memory openings 149 having a first pitch along one horizontal direction and a second pitch along another horizontal direction. In one embodiment, the direction of the first memory structure pitch can be the first horizontal direction (e.g., word line direction) hd1 and the direction of the second memory structure pitch can be the second horizontal direction (e.g., bit line direction) hd2, or vice versa.

The inter-tier dielectric layer 180 can comprise a dielectric material (such as borosilicate glass) having a greater etch rate than the first insulating layers 132 (that can include undoped silicate glass). In one embodiment, the bottom surface of each first-tier memory opening 149 can be formed between the top surface and the bottom surface of the source-level sacrificial layer 104. In this case, surfaces of the source-level sacrificial layer 104 can be exposed at a bottom portion of each first-tier memory opening 149. Locations of steps S in the first vertically alternating sequence (132, 142) are illustrated as dotted lines in FIG. 4B.

Figure 6:
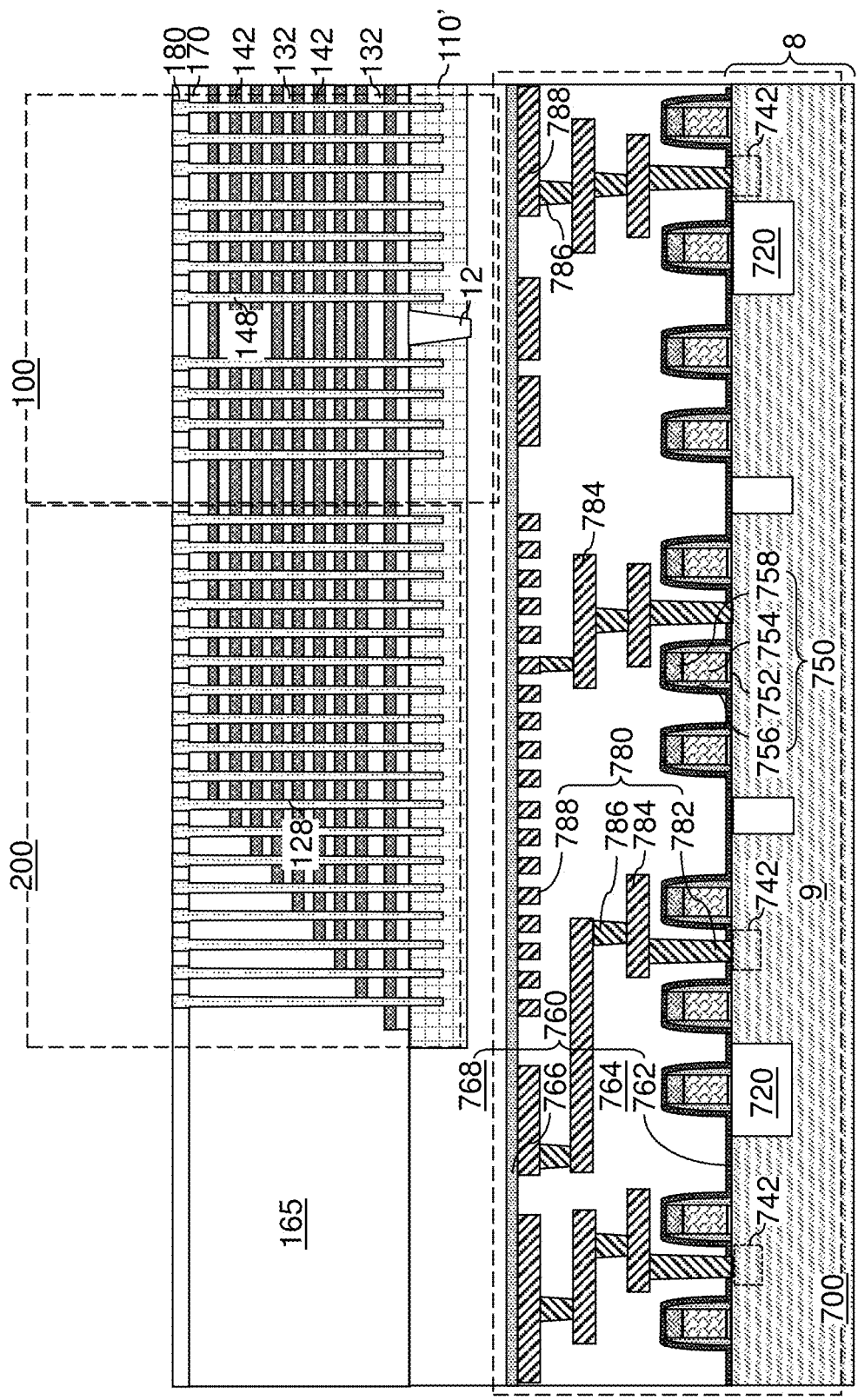
FIG. 6 is a vertical cross-sectional view of the first exemplary structure after formation of sacrificial memory opening fill portions and first-tier support opening fill portions according to the first embodiment of the present disclosure.

Referring to FIG. 6, sacrificial first-tier opening fill portions (148, 128) can be formed in the first-tier openings (149, 129). For example, a sacrificial fill material is deposited concurrently deposited in each of the first-tier openings (149, 129). The sacrificial fill material includes a material that can be subsequently removed selective to the materials of the first insulating layers 132 and the first sacrificial material layers 142.

In one embodiment, the sacrificial fill material can include a semiconductor material such as silicon (e.g., a-Si or polysilicon), a silicon-germanium alloy, germanium, a III-V compound semiconductor material, or a combination thereof. Optionally, a thin etch stop layer (such as a silicon oxide layer or a silicon nitride layer having a thickness in a range from 1 nm to 3 nm) may be employed prior to depositing the sacrificial first-tier fill material. The sacrificial fill material may be formed by a non-conformal deposition or a conformal deposition method.

In another embodiment, the sacrificial fill material can include a silicon oxide material having a higher etch rate than the materials of the first insulating layers 132, the first insulating cap layer 170, and the inter-tier insulating layer 180. For example, the sacrificial fill material may include borosilicate glass or porous or non-porous organosilicate glass having an etch rate that is at least 100 times higher than the etch rate of densified TEOS oxide (i.e., a silicon oxide material formed by decomposition of tetraethylorthosilicate glass in a chemical vapor deposition process and subsequently densified in an anneal process) in a 100:1 dilute hydrofluoric acid. In this case, a thin etch stop layer (such as a silicon nitride layer having a thickness in a range from 1 nm to 3 nm) may be employed prior to depositing the sacrificial first-tier fill material. The sacrificial fill material may be formed by a non-conformal deposition or a conformal deposition method.

In yet another embodiment, the sacrificial fill material can include a carbon-containing material (such as amorphous carbon or diamond-like carbon) that can be subsequently removed by ashing, or a silicon-based polymer that can be subsequently removed selective to the materials of the first alternating stack (132, 142).

Portions of the deposited sacrificial fill material can be removed from above the topmost layer of the first vertically alternating sequence (132, 142), such as from above the inter-tier dielectric layer 180. For example, the sacrificial fill material can be recessed to a top surface of the inter-tier dielectric layer 180 employing a planarization process. The planarization process can include a recess etch, chemical mechanical planarization (CMP), or a combination thereof. The top surface of the inter-tier dielectric layer 180 can be employed as an etch stop layer or a planarization stop layer.

Remaining portions of the sacrificial fill material comprise sacrificial first-tier opening fill portions (148, 128). Specifically, each remaining portion of the sacrificial material in a first-tier memory opening 149 constitutes a sacrificial first-tier memory opening fill portion 148. Each remaining portion of the sacrificial material in a first-tier support opening 129 constitutes a sacrificial first-tier support opening fill portion 128. The top surfaces of the sacrificial first-tier opening fill portions (148, 128) can be coplanar with the top surface of the inter-tier dielectric layer 180. Each of the sacrificial first-tier opening fill portions (148, 128) may, or may not, include cavities therein.

Figure 7:
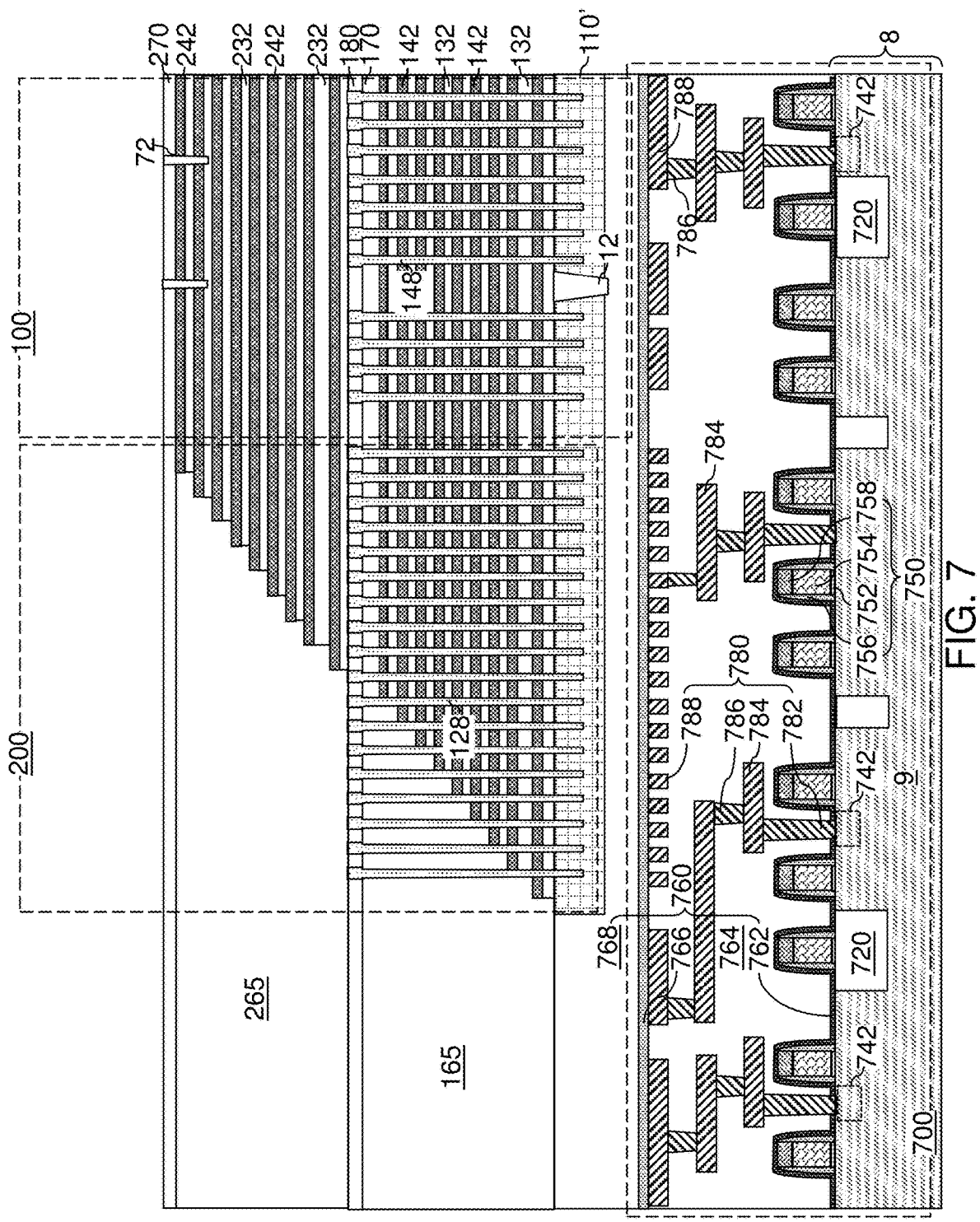
FIG. 7 is a vertical cross-sectional view of the first exemplary structure after formation of a second vertically alternating sequence of second insulating layers and second spacer material layers, second stepped surfaces, a second retro-stepped dielectric material portion, and drain-select-level isolation structures according to the first embodiment of the present disclosure.

Referring to FIG. 7, a second-tier structure can be formed over the first-tier structure (132, 142, 170, 165, 148, 128). The second-tier structure can include an additional vertically alternating sequence of additional insulating layers and additional spacer material layers, which can be additional sacrificial material layers. The second vertically alternating sequence is also referred to as a second alternating stack. For example, a second alternating stack (232, 242) of material layers can be subsequently formed on the top surface of the first alternating stack (132, 142). The second stack (232, 242) includes an alternating plurality of third material layers and fourth material layers. Each third material layer can include a third material, and each fourth material layer can include a fourth material that is different from the third material. In one embodiment, the third material can be the same as the first material of the first insulating layer 132, and the fourth material can be the same as the second material of the first sacrificial material layers 142.

In one embodiment, the third material layers can be second insulating layers 232 and the fourth material layers can be second spacer material layers that provide vertical spacing between each vertically neighboring pair of the second insulating layers 232. In one embodiment, the third material layers and the fourth material layers can be second insulating layers 232 and second sacrificial material layers 242, respectively. The third material of the second insulating layers 232 may be at least one insulating material. The fourth material of the second sacrificial material layers 242 may be a sacrificial material that can be removed selective to the third material of the second insulating layers 232. The second sacrificial material layers 242 may comprise an insulating material, a semiconductor material, or a conductive material. The fourth material of the second sacrificial material layers 242 can be subsequently replaced with electrically conductive electrodes which can function, for example, as control gate electrodes of a vertical NAND device.

In one embodiment, each second insulating layer 232 can include a second insulating material, and each second sacrificial material layer 242 can include a second sacrificial material. In this case, the second stack (232, 242) can include an alternating plurality of second insulating layers 232 and second sacrificial material layers 242. The third material of the second insulating layers 232 can be deposited, for example, by chemical vapor deposition (CVD). The fourth material of the second sacrificial material layers 242 can be formed, for example, CVD or atomic layer deposition (ALD).

The third material of the second insulating layers 232 can be at least one insulating material. Insulating materials that can be employed for the second insulating layers 232 can be any material that can be employed for the first insulating layers 132. The fourth material of the second sacrificial material layers 242 is a sacrificial material that can be removed selective to the third material of the second insulating layers 232. Sacrificial materials that can be employed for the second sacrificial material layers 242 can be any material that can be employed for the first sacrificial material layers 142. In one embodiment, the second insulating material can be the same as the first insulating material, and the second sacrificial material can be the same as the first sacrificial material.

The thicknesses of the second insulating layers 232 and the second sacrificial material layers 242 can be in a range from 20 nm to 50 nm, although lesser and greater thicknesses can be employed for each second insulating layer 232 and for each second sacrificial material layer 242. The number of repetitions of the pairs of a second insulating layer 232 and a second sacrificial material layer 242 can be in a range from 2 to 1,024, and typically from 8 to 256, although a greater number of repetitions can also be employed. In one embodiment, each second sacrificial material layer 242 in the second stack (232, 242) can have a uniform thickness that is substantially invariant within each respective second sacrificial material layer 242.

Second stepped surfaces can be formed in the second stepped area of the staircase region 200 employing a same set of processing steps as the processing steps employed to form the first stepped surfaces in the first stepped area with suitable adjustment to the pattern of at least one masking layer. A second retro-stepped dielectric material portion 265 can be formed over the second stepped surfaces in the staircase region 200.

A second insulating cap layer 270 can be subsequently formed over the second alternating stack (232, 242) and the second retro-stepped dielectric material portion 265. The second insulating cap layer 270 includes a dielectric material that is different from the material of the second sacrificial material layers 242. In one embodiment, the second insulating cap layer 270 can include silicon oxide. In one embodiment, the first and second sacrificial material layers (142, 242) can comprise silicon nitride.

Optionally, drain-select-level isolation structures 72 can be formed through the second insulating cap layer 270 and through a subset of layers in an upper portion of the second vertically alternating sequence (232, 242). The second sacrificial material layers 242 that are cut by the select-drain-level shallow trench isolation structures 72 correspond to the levels in which drain-select-level electrically conductive layers are subsequently formed. The drain-select-level isolation structures 72 include a dielectric material such as silicon oxide. The drain-select-level isolation structures 72 can laterally extend along a first horizontal direction hd1, and can be laterally spaced apart along a second horizontal direction hd2 that is perpendicular to the first horizontal direction hd1.

Generally, at least one vertically alternating sequence of insulating layers (132, 232) and spacer material layers (such as sacrificial material layers (142, 242)) can be formed over the in-process source-level material layers 10', and at least one retro-stepped dielectric material portion (165, 265) can be formed over the staircase regions on the at least one alternating stack (132, 142, 232, 242). Each of the insulating layers (132, 232) and spacer material layers (such as sacrificial material layers (142, 242)) can be formed as a respective single continuous material layer. In this case, the insulating layers (132, 232) may be referred to as continuous insulating layers, and the spacer material layers may be referred to as continuous spacer material layers (such as continuous sacrificial material layers).

Figure 8:
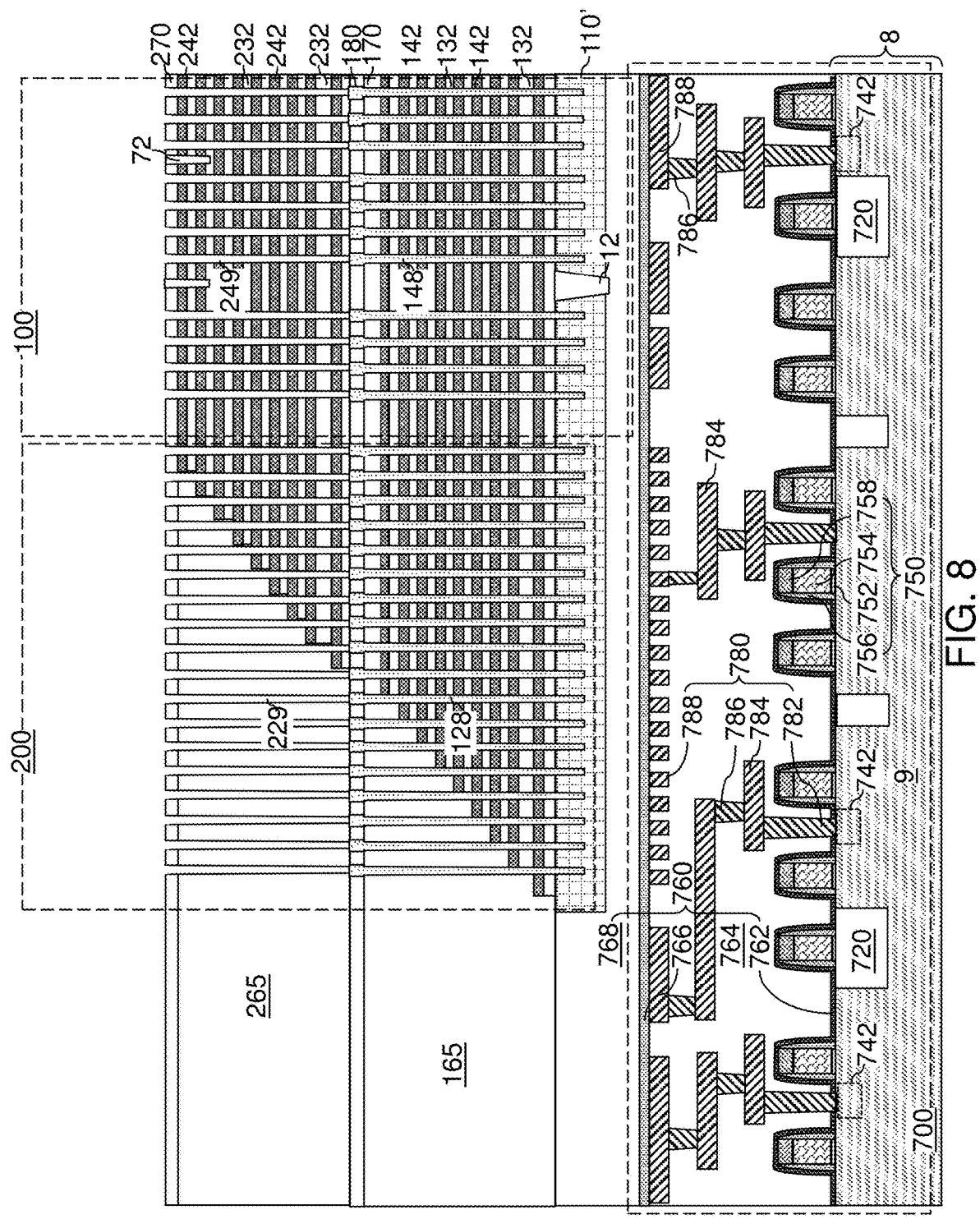
FIG. 8 is a vertical cross-sectional view of the first exemplary structure after formation of second-tier memory openings and second-tier support openings according to the first embodiment of the present disclosure.

Referring to FIG. 8, second-tier openings (249, 229) can be formed through the second-tier structure (232, 242, 265, 270, 72). A photoresist layer (not shown) can be applied over the second insulating cap layer 270, and can be lithographically patterned to form various openings therethrough. The pattern of the openings can be the same as the pattern of the various first-tier openings (149, 129), which is the same as the sacrificial first-tier opening fill portions (148, 128). Thus, the lithographic mask employed to pattern the first-tier openings (149, 129) can be employed to pattern the photoresist layer.

The pattern of openings in the photoresist layer can be transferred through the second-tier structure (232, 242, 265, 270, 72) by a second anisotropic etch process to form second-tier openings (249, 229) concurrently, i.e., during the second anisotropic etch process. The second-tier openings (249, 229) can include second-tier memory openings 249 and second-tier support openings.

The second-tier memory openings 249 are formed directly on a top surface of a respective one of the sacrificial first-tier memory opening fill portions 148. The second-tier support openings 229 are formed directly on a top surface of a respective one of the sacrificial first-tier support opening fill portions 128. Locations of steps S in the first vertically alternating sequence (132, 142) and the second vertically alternating sequence (232, 242) are illustrated as dotted lines in FIG. 7B.

Figure 9:
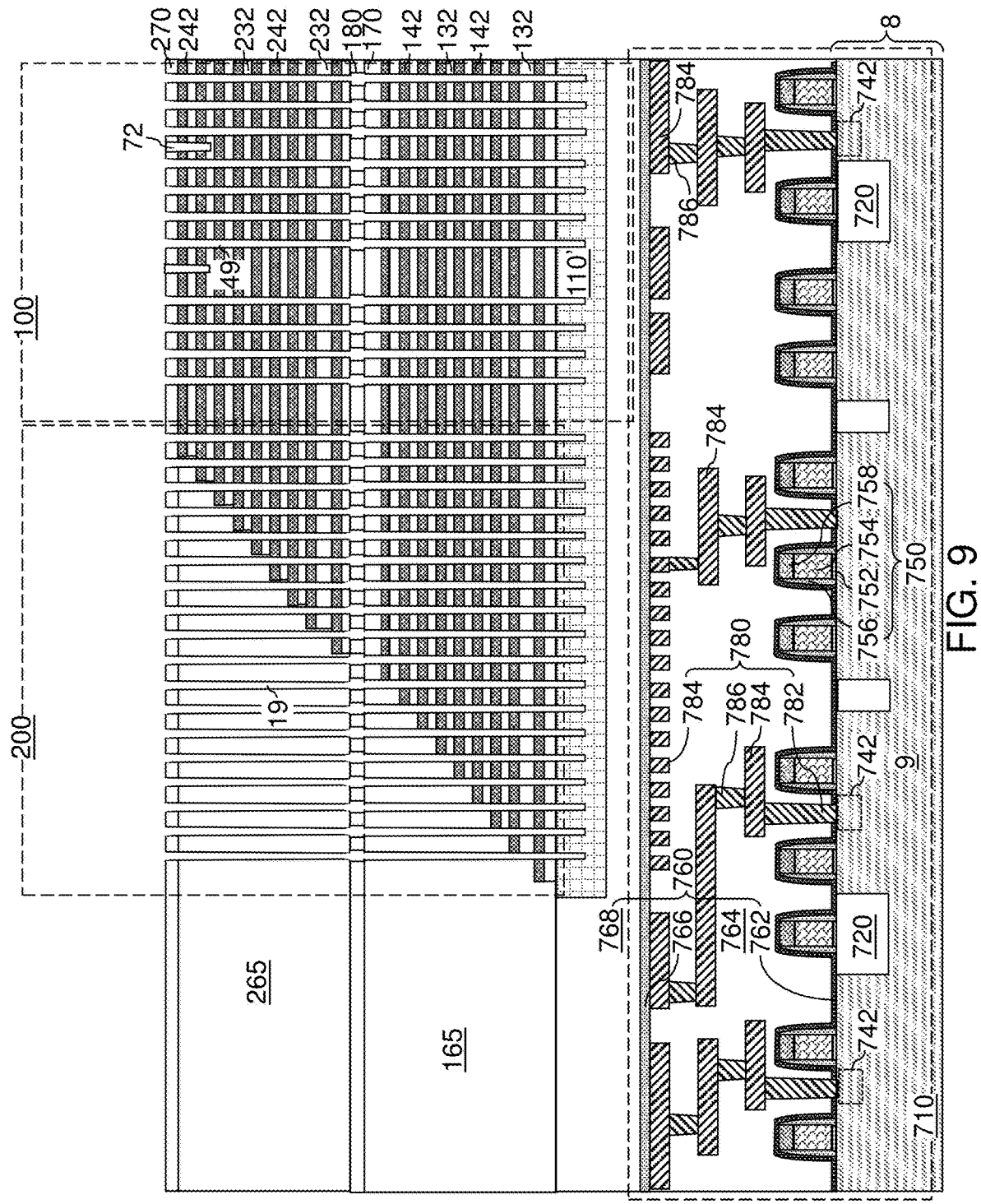
FIG. 9 is a vertical cross-sectional view of the first exemplary structure after formation of inter-tier memory openings and inter-tier support openings according to the first embodiment of the present disclosure.

Referring to FIG. 9, the sacrificial fill material can be removed from underneath the second-tier memory openings 249 and the second-tier support openings 229 employing an etch process that etches the sacrificial fill material selective to the materials of the first and second insulating layers (132, 232), the first and second sacrificial material layers (142, 242), the first and second insulating cap layers (170, 270), and the inter-tier dielectric layer 180. A memory opening 49, which is also referred to as an inter-tier memory opening 49, is formed in each volume from which a sacrificial first-tier memory opening fill portion 148 is removed. A support opening 19, which is also referred to as an inter-tier support opening 19, is formed in each volume from which a sacrificial first-tier support opening fill portion 128 is removed.

FIGS. 10A-10D provide sequential cross-sectional views of a memory opening 49 during formation of a memory opening fill structure 58 or a support pillar structure 20. The same structural change occurs in each memory openings 49.

Referring to FIG. 10A, a memory opening 49 in the first exemplary device structure of FIG. 9 is illustrated. The memory opening 49 extends through the first-tier structure and the second-tier structure.

Referring to FIG. 10B, a stack of layers including a blocking dielectric layer 52, a charge storage layer 54, a tunneling dielectric layer 56, and a semiconductor channel material layer 60L can be sequentially deposited in the memory openings 49. The blocking dielectric layer 52 can include a single dielectric material layer or a stack of a plurality of dielectric material layers. In one embodiment, the blocking dielectric layer can include a dielectric metal oxide layer consisting essentially of a dielectric metal oxide. As used herein, a dielectric metal oxide refers to a dielectric material that includes at least one metallic element and at least oxygen. The dielectric metal oxide may consist essentially of the at least one metallic element and oxygen, or may consist essentially of the at least one metallic element, oxygen, and at least one non-metallic element such as nitrogen. In one embodiment, the blocking dielectric layer 52 can include a dielectric metal oxide having a dielectric constant greater than 7.9, i.e., having a dielectric constant greater than the dielectric constant of silicon nitride. The thickness of the dielectric metal oxide layer can be in a range from 1 nm to 20 nm, although lesser and greater thicknesses can also be employed. The dielectric metal oxide layer can subsequently function as a dielectric material portion that blocks leakage of stored electrical charges to control gate electrodes. In one embodiment, the blocking dielectric layer 52 includes aluminum oxide. Alternatively or additionally, the blocking dielectric layer 52 can include a dielectric semiconductor compound such as silicon oxide, silicon oxynitride, silicon nitride, or a combination thereof.

Subsequently, the charge storage layer 54 can be formed. In one embodiment, the charge storage layer 54 can be a continuous layer or patterned discrete portions of a charge trapping material including a dielectric charge trapping material, which can be, for example, silicon nitride. Alternatively, the charge storage layer 54 can include a continuous layer or patterned discrete portions of a conductive material such as doped polysilicon or a metallic material that is patterned into multiple electrically isolated portions (e.g., floating gates), for example, by being formed within lateral recesses into sacrificial material layers (142, 242). In one embodiment, the charge storage layer 54 includes a silicon nitride layer. In one embodiment, the sacrificial material layers (142, 242) and the insulating layers (132, 232) can have vertically coincident sidewalls, and the charge storage layer 54 can be formed as a single continuous layer. As used herein, a first surface and a second surface are "vertically coincident" if there exists the second surface that overlies or underlies the first surface and if there exists a vertical plane that intersects both the first surface and the second surface. Alternatively, the sacrificial material layers (142, 242) can be laterally recessed with respect to the sidewalls of the insulating layers (132, 232), and a combination of a deposition process and an anisotropic etch process can be employed to form the charge storage layer 54 as a plurality of memory material portions that are vertically spaced apart. The thickness of the charge storage layer 54 can be in a range from 2 nm to 20 nm, although lesser and greater thicknesses can also be employed.

The tunneling dielectric layer 56 includes a dielectric material through which charge tunneling can be performed under suitable electrical bias conditions. The charge tunneling may be performed through hot-carrier injection or by Fowler-Nordheim tunneling induced charge transfer depending on the mode of operation of the monolithic three-dimensional NAND string memory device to be formed. The tunneling dielectric layer 56 can include silicon oxide, silicon nitride, silicon oxynitride, dielectric metal oxides (such as aluminum oxide and hafnium oxide), dielectric metal oxynitride, dielectric metal silicates, alloys thereof, and/or combinations thereof. In one embodiment, the tunneling dielectric layer 56 can include a stack of a first silicon oxide layer, a silicon oxynitride layer, and a second silicon oxide layer, which is commonly known as an ONO stack. In one embodiment, the tunneling dielectric layer 56 can include a silicon oxide layer that is substantially free of carbon or a silicon oxynitride layer that is substantially free of carbon. The thickness of the tunneling dielectric layer 56 can be in a range from 2 nm to 20 nm, although lesser and greater thicknesses can also be employed. The stack of the blocking dielectric layer 52, the charge storage layer 54, and the tunneling dielectric layer 56 constitutes a memory film 50 that stores memory bits.

The semiconductor channel material layer 60L includes a semiconductor material such as at least one elemental semiconductor material, at least one III-V compound semiconductor material, at least one II-VI compound semiconductor material, at least one organic semiconductor material, or other semiconductor materials known in the art. In one embodiment, the semiconductor channel material layer 60L includes amorphous silicon or polysilicon. The semiconductor channel material layer 60L can be formed by a conformal deposition method such as low pressure chemical vapor deposition (LPCVD). The thickness of the semiconductor channel material layer 60L can be in a range from 2 nm to 10 nm, although lesser and greater thicknesses can also be employed. A cavity 49' is formed in the volume of each memory opening 49 that is not filled with the deposited material layers (52, 54, 56, 60L).

Referring to FIG. 10C, in case the cavity 49' in each memory opening is not completely filled by the semiconductor channel material layer 60L, a dielectric core layer can be deposited in the cavity 49' to fill any remaining portion of the cavity 49' within each memory opening. The dielectric core layer includes a dielectric material such as silicon oxide or organosilicate glass. The dielectric core layer can be deposited by a conformal deposition method such as low pressure chemical vapor deposition (LPCVD), or by a self-planarizing deposition process such as spin coating. The horizontal portion of the dielectric core layer overlying the second insulating cap layer 270 can be removed, for example, by a recess etch. The recess etch continues until top surfaces of the remaining portions of the dielectric core layer are recessed to a height between the top surface of the second insulating cap layer 270 and the bottom surface of the second insulating cap layer 270. Each remaining portion of the dielectric core layer constitutes a dielectric core 62.

Referring to FIG. 10D, a doped semiconductor material can be deposited in cavities overlying the dielectric cores 62. The doped semiconductor material has a doping of the opposite conductivity type of the doping of the semiconductor channel material layer 60L. Thus, the doped semiconductor material has a doping of the second conductivity type. Portions of the deposited doped semiconductor material, the semiconductor channel material layer 60L, the tunneling dielectric layer 56, the charge storage layer 54, and the blocking dielectric layer 52 that overlie the horizontal plane including the top surface of the second insulating cap layer 270 can be removed by a planarization process such as a chemical mechanical planarization (CMP) process.

Each remaining portion of the doped semiconductor material having a doping of the second conductivity type constitutes a drain region 63. The drain regions 63 can have a doping of a second conductivity type that is the opposite of the first conductivity type. For example, if the first conductivity type is p-type, the second conductivity type is n-type, and vice versa. The dopant concentration in the drain regions 63 can be in a range from $5.0 \times 10^{18}/cm^3$ to $2.0 \times 10^{21}/cm^3$, although lesser and greater dopant concentrations can also be employed. The doped semiconductor material can be, for example, doped polysilicon.

Each remaining portion of the semiconductor channel material layer 60L constitutes a vertical semiconductor channel 60 through which electrical current can flow when a vertical NAND device including the vertical semiconductor channel 60 is turned on. A tunneling dielectric layer 56 is surrounded by a charge storage layer 54, and laterally surrounds a vertical semiconductor channel 60. Each adjoining set of a blocking dielectric layer 52, a charge storage layer 54, and a tunneling dielectric layer 56 collectively constitute a memory film 50, which can store electrical charges with a macroscopic retention time. In some embodiments, a blocking dielectric layer 52 may not be present in the memory film 50 at this step, and a blocking dielectric layer may be subsequently formed after formation of backside recesses. As used herein, a macroscopic retention time refers to a retention time suitable for operation of a memory device as a permanent memory device such as a retention time in excess of 24 hours.

Each combination of a memory film 50 and a vertical semiconductor channel 60 within a memory opening 49 constitutes a memory stack structure 55. The memory stack structure 55 is a combination of a vertical semiconductor channel 60, a tunneling dielectric layer 56, a plurality of memory elements comprises portions of the charge storage layer 54, and an optional blocking dielectric layer 52. Each combination of a memory stack structure 55, a dielectric core 62, and a drain region 63 within a memory opening 49 constitutes a memory opening fill structure 58. The in-process source-level material layers 10', the first-tier structure (132, 142, 170, 165), the second-tier structure (232, 242, 270, 265, 72), the inter-tier dielectric layer 180, and the memory opening fill structures 58 collectively constitute a memory-level assembly.

Figure 11A:
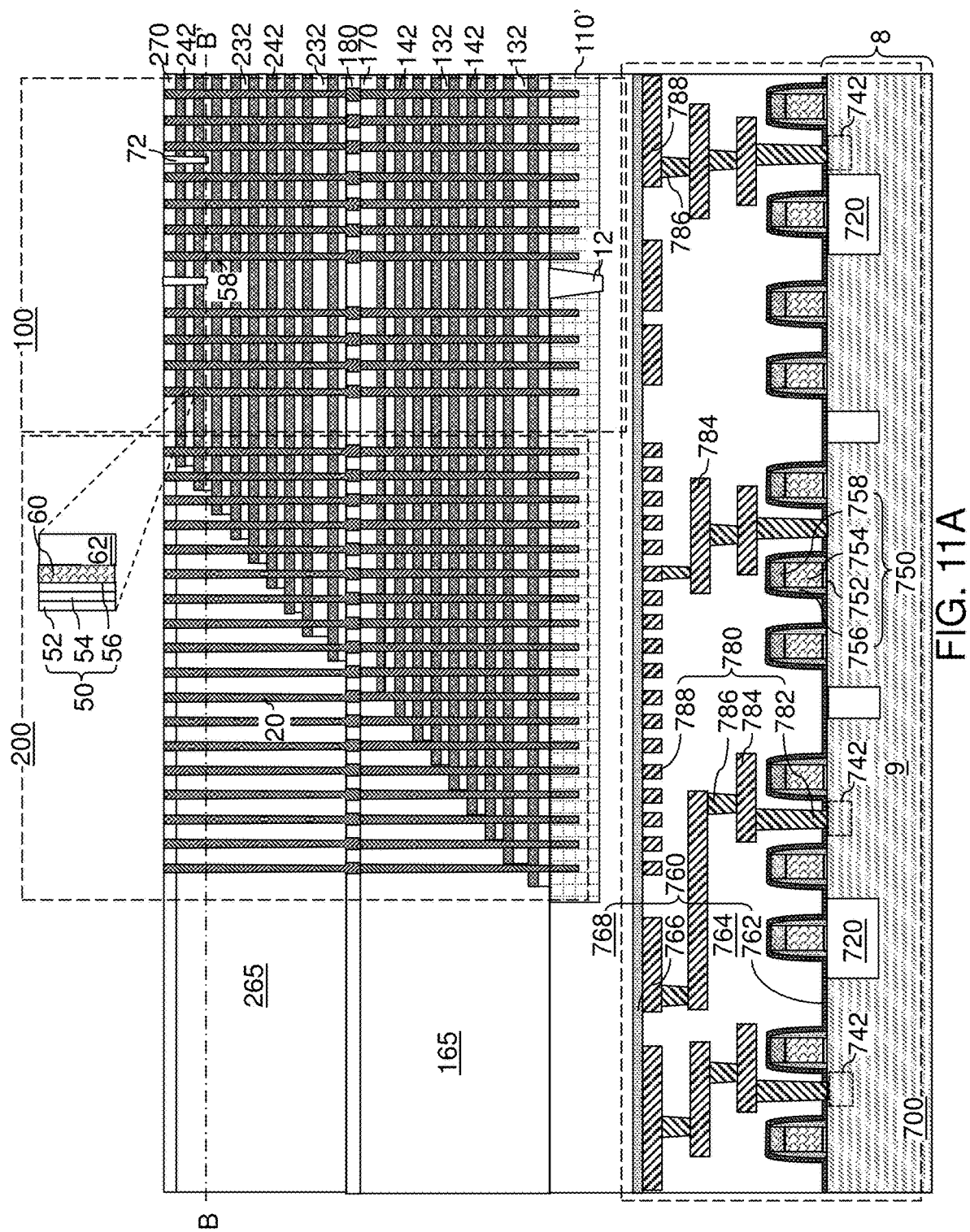
FIG. 11A is a vertical cross-sectional view of the first exemplary structure after formation of memory opening fill structures and support pillar structures according to the first embodiment of the present disclosure.
Figure 11B:
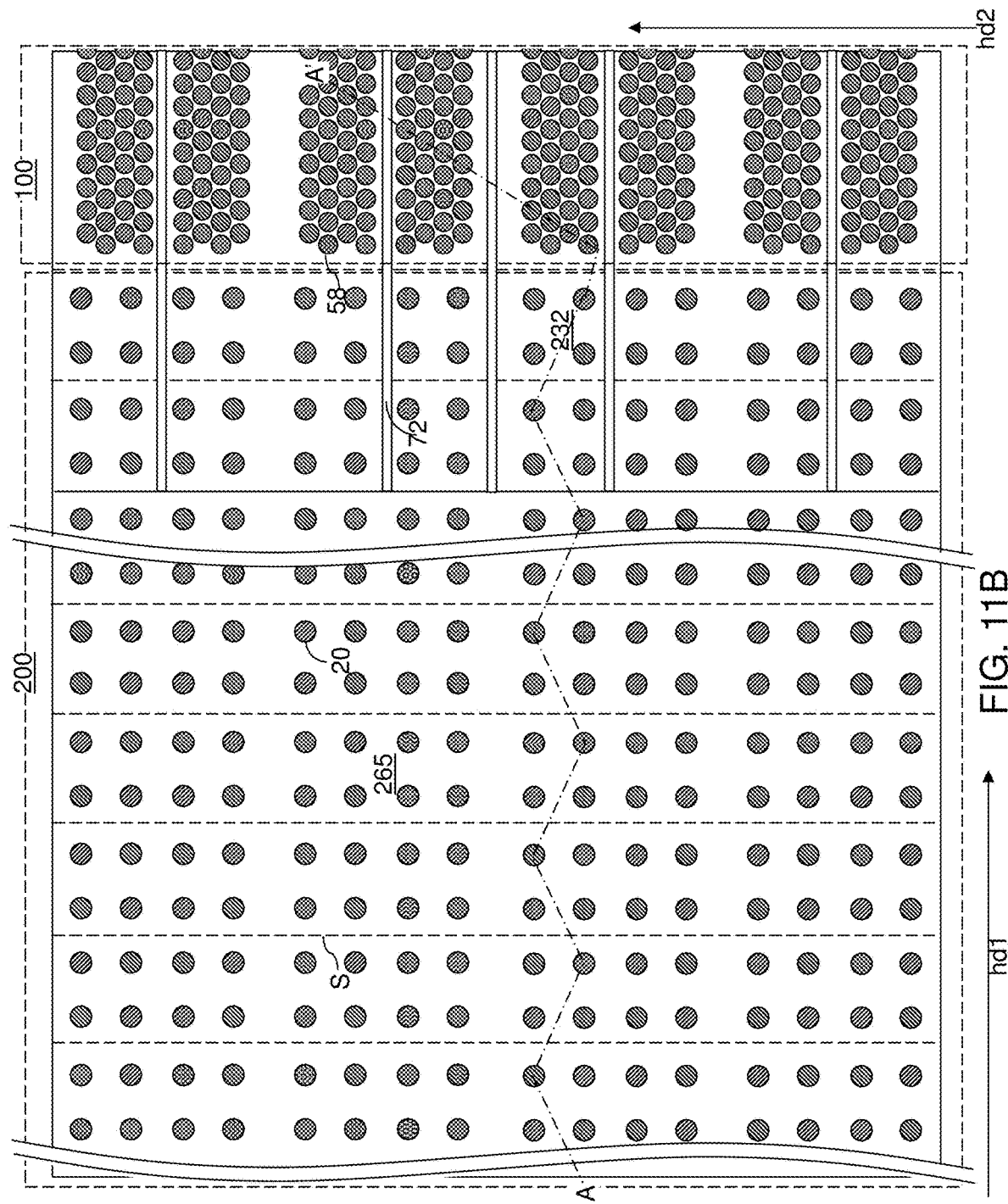
FIG. 11B is a horizontal cross-sectional of the first exemplary structure along the horizontal plane B-B' of FIG. 11A. The zig-zag vertical plane A-A' corresponds to the plane of the vertical cross-sectional view of FIG. 11A.

Referring to FIGS. 11A and 11B, the first exemplary structure is shown after formation of memory opening fill structures 58 in the memory openings 49 and support pillar structures 20 in the support openings 19. Each of the support openings 19 is filled with a respective support pillar structure 20 concurrently with formation of the memory opening fill structures 58. Each support pillar structure 20 can have the same structural elements as a memory opening fill structure 58. Each support pillar structure 20 is a dummy structure, i.e., an electrically inactive structure, and as such, is not subsequently contacted by any contact via structure.

Referring to FIG. 12A-12D, a contact-level dielectric layer 280 can be formed over the second-tier structure (232, 242, 270, 265, 72). The contact-level dielectric layer 280 includes a dielectric material such as silicon oxide, and can be formed by a conformal or non-conformal deposition process. For example, the contact-level dielectric layer 280 can include undoped silicate glass and can have a thickness in a range from 100 nm to 600 nm, although lesser and greater thicknesses can also be employed.

A photoresist layer (not shown) can be applied over the contact-level dielectric layer 280 and can be lithographically patterned to form openings within areas extending across the memory array region 100 and the staircase region 200. The openings in the photoresist layer can laterally extend along the first horizontal direction hd1 between each neighboring cluster of memory opening fill structures 58. Backside trenches 79 can be formed by transferring the pattern in the photoresist layer through the contact-level dielectric layer 280, the second alternating stack (232, 242, 270, 265, 72), the first alternating stack (132, 142, 170, 165), and the in-process source-level material layers 110'. Portions of the contact-level dielectric layer 280, the second alternating stack (232, 242, 270, 265, 72), the first alternating stack (132, 142, 170, 165), and the in-process source-level material layers 110' that underlie the openings in the photoresist layer can be removed to form backside trenches 79. In one embodiment, the backside trenches 79 can be formed between clusters of memory opening fill structures 58. The clusters of the memory opening fill structures 58 can be laterally spaced apart along the second horizontal direction hd2 by the backside trenches 79.

Generally, at least one vertically alternating sequence of continuous insulating layers (132, 232) and continuous spacer material layers (such as the continuous sacrificial material layers (142, 242)) can be divided into alternating stacks {(132, 142), (232, 242)} of insulating layers (132, 232) and spacer material layers (such as sacrificial material layers (142, 242)) by forming backside trenches 79 that laterally extend along a first horizontal direction hd1 and laterally spaced apart along a second horizontal direction hd2. The contact-level dielectric layer 280 is divided into a plurality of contact-level dielectric layers 280 by the backside trenches 280. Each contact-level dielectric layer 280 of the plurality of contact-level dielectric layers 280 overlies a respective alternating stack of insulating layers (132, 232) and spacer material layers (such as sacrificial material layers (142, 242)), and overlies a respective array of memory opening fill structures 58.

Generally, a vertically alternating sequence of continuous insulating layers (132, 232) and continuous spacer material layers (such as continuous sacrificial material layers (142, 242)) can be divided into in-process alternating stacks {(132, 142), (232, 242)} of insulating layers (132, 232) and spacer material layers (such as sacrificial material layers (142, 242)) by forming backside trenches 79 that laterally extend along the first horizontal direction hd1 and laterally spaced apart along the second horizontal direction hd2. According to an aspect of the present disclosure shown in FIG. 12C, the backside trenches 79 and the source layer segments 111 are staggered along the second horizontal direction (e.g., bit line direction) hd2 such that each backside trench 79 is formed between a neighboring pair of source layer segments 111.

The first exemplary structure includes multiple repetitions of a unit structure US that laterally extends along a first horizontal direction (e.g., word line direction) hd1 and repeated along a second horizontal direction hd2 that is perpendicular to the first horizontal direction hd1. Each instance of the unit structure US comprises a respective alternating stack {(132, 142), (232, 242)} of insulating layers (132, 232) and sacrificial material layers (142, 242) that alternate along a vertical direction. The respective alternating stack {(132, 142), (232, 242)} is laterally spaced from alternating stacks {(132, 142), (232, 242)} in neighboring instances of the unit structure US by a respective backside trench 79.

Figure 13A:
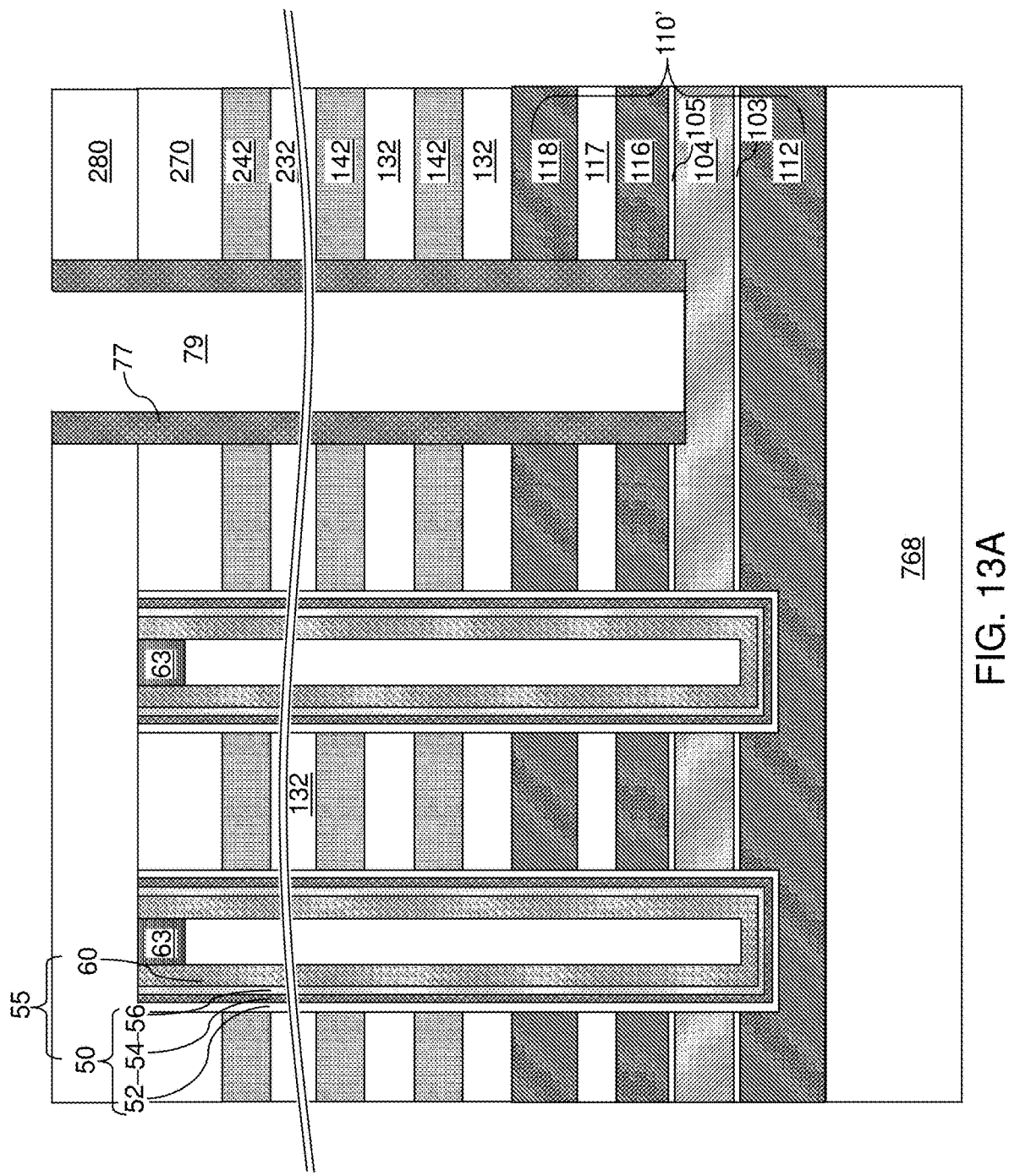

Referring to FIG. 13A, a backside trench spacer 77 can be formed on sidewalls of each backside trench 79. For example, a conformal spacer material layer can be deposited in the backside trenches 79 and over the contact-level dielectric layer 280, and can be anisotropically etched to form the backside trench spacers 77. The backside trench spacers 77 include a material that is different from the material of the source-level sacrificial layer 104. For example, the backside trench spacers 77 can include silicon oxide, a dielectric metal oxide, or silicon nitride.

Figure 13B:
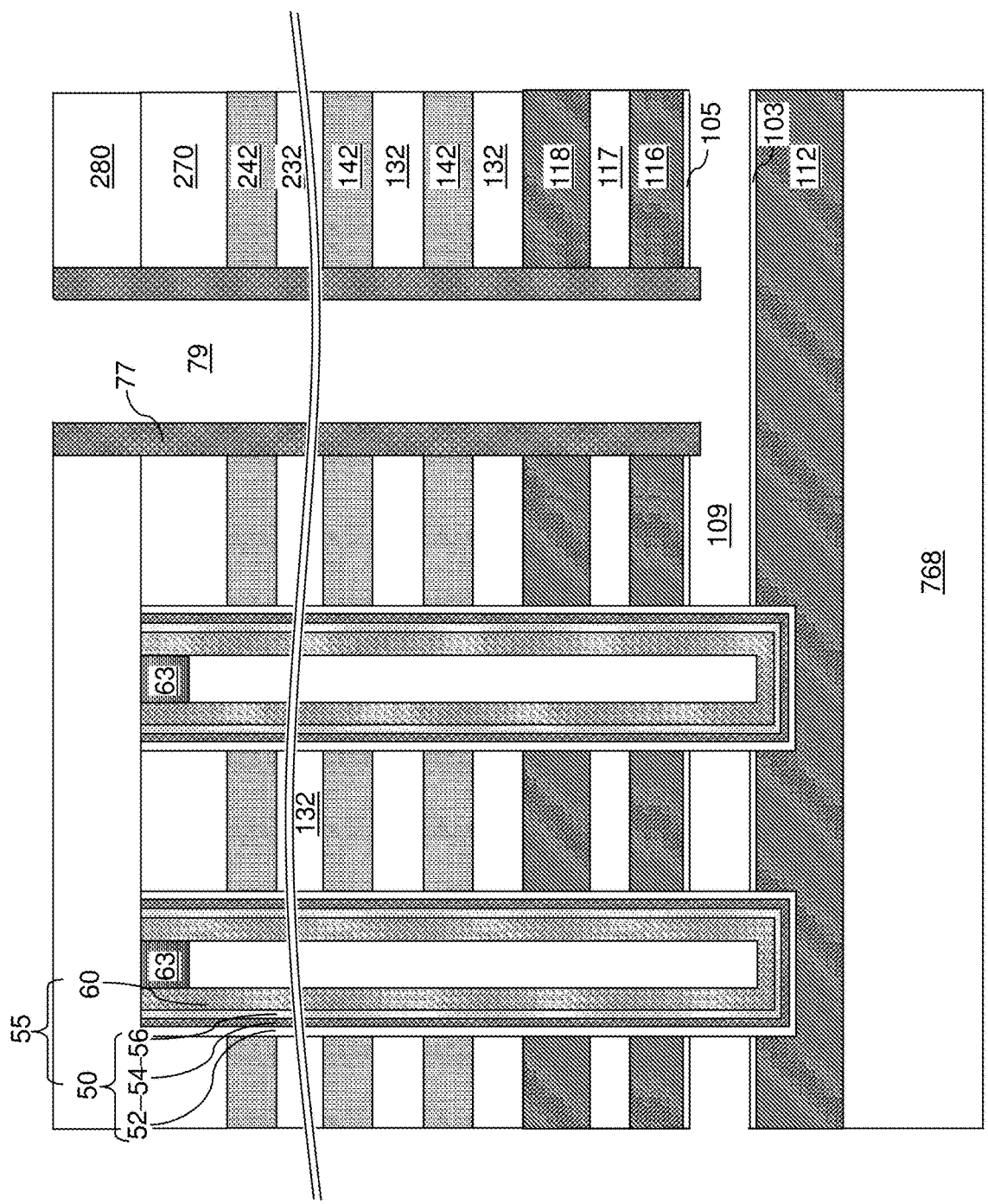

Referring to FIG. 13B, an etchant that etches the material of the source-level sacrificial layer 104 selective to the materials of the first alternating stack (132, 142), the second alternating stack (232, 242), the first and second insulating cap layers (170, 270), the upper dielectric liner layer 105, and the lower dielectric liner layer 103 can be introduced into the backside trenches 79 in an isotropic etch process. For example, if the source-level sacrificial layer 104 includes undoped amorphous silicon or an undoped amorphous silicon-germanium alloy, the backside trench spacers 77 include silicon nitride, and the upper and lower dielectric liner layers (105, 103) include silicon oxide, a wet etch process employing hot trimethyl-2 hydroxyethyl ammonium hydroxide ("hot TMY") or tetramethyl ammonium hydroxide (TMAH) can be employed to remove the source-level sacrificial layer 104 selective to the backside trench spacers 77 and the upper and lower dielectric liner layers (105, 103). Alternatively, if the source-level sacrificial material layer 104 includes silicon nitride, the backside trench spacers 77 include silicon oxide or a dielectric metal oxide, and the upper and lower dielectric liner layers (105, 103) include silicon oxide, a wet etch process employing hot phosphoric acid can be employed to remove the source-level sacrificial layer 104 selective to the backside trench spacers 77 and the upper and lower dielectric liner layers (105, 103). A source cavity 109 is formed in the volume from which the source-level sacrificial layer 104 is removed.

Figure 13C:
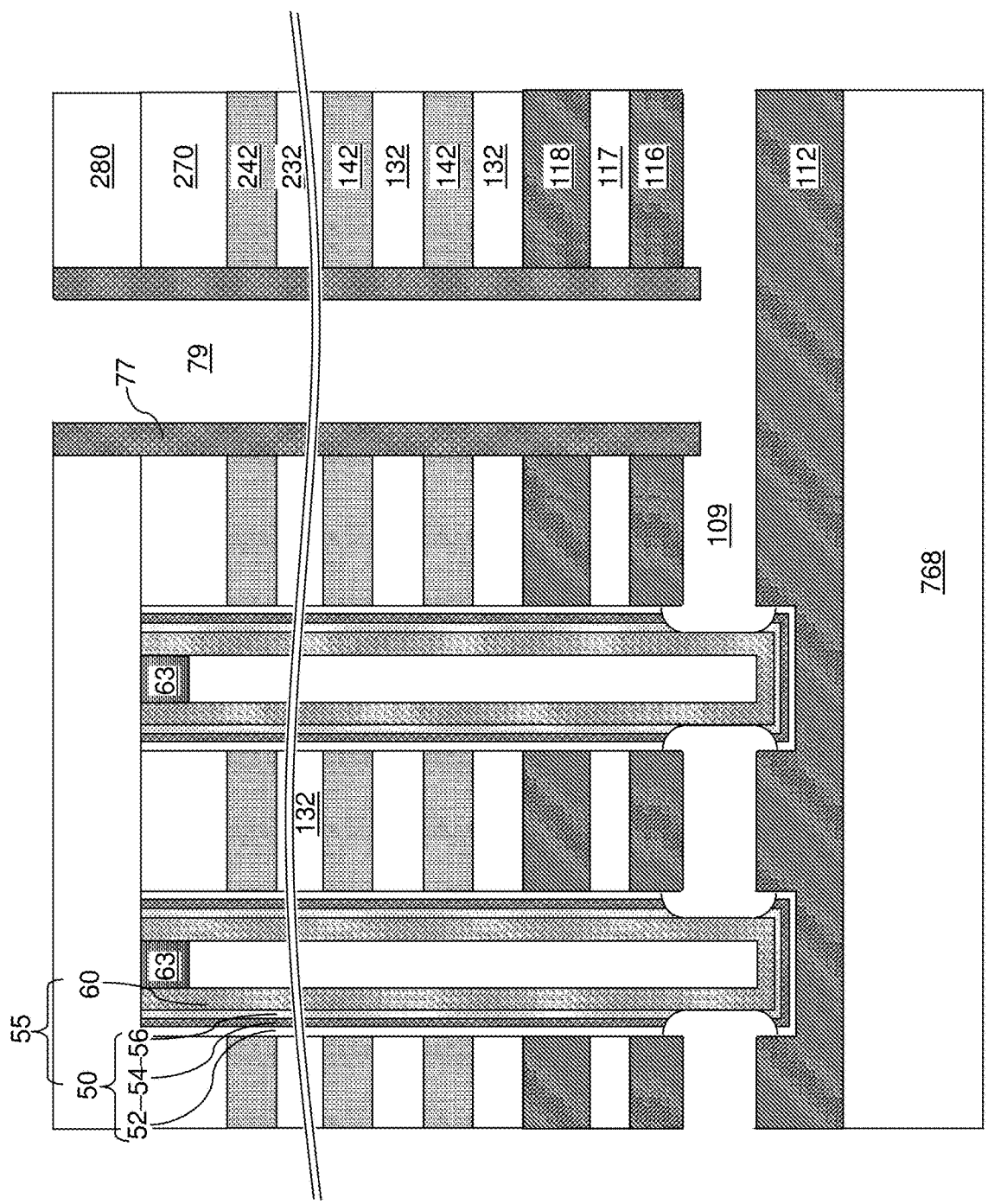

Referring to FIG. 13C, a sequence of isotropic etchants, such as wet etchants, can be applied through the backside trenches 79 and the source cavity 109 to the physically exposed portions of the memory films 50 to sequentially etch the various component layers of the memory films 50 from outside to inside, and to physically expose bottom surfaces and cylindrical side surfaces of the vertical semiconductor channels 60 at the level of the source cavity 109. The upper and lower dielectric liner layers (105, 103) can be collaterally etched during removal of the portions of the memory films 50 located at the level of the source cavity 109. The source cavity 109 can be expanded in volume by removal of the portions of the memory films 50 at the level of the source cavity 109 and the upper and lower dielectric liner layers (105, 103). A top surface of the lower source-level material layer 112 and a bottom surface of the upper source-level material layer 116 can be physically exposed to the source cavity 109. An outer sidewall of each vertical semiconductor channel 60 is physically exposed to the source cavity 109 after removing the physically exposed portions of the memory films 50. A dielectric material stack 150 is formed underneath each physically exposed cylindrical surface of the vertical semiconductor channels 60. Each dielectric material stack 150 is a remaining portion of the memory films 50, and includes the same dielectric material stack as the memory films 50.

Thus, the upper source-level material layer 116 can act as an etch stop during the selective etching of the memory film 50 through the source cavity 109 and can prevent lateral expansion of the source cavity 109. This prevents a short circuit between the source-select-level conductive layer 118 and a source contact layer that is subsequently formed in the source cavity 109 during a subsequent step.

Figure 13D:
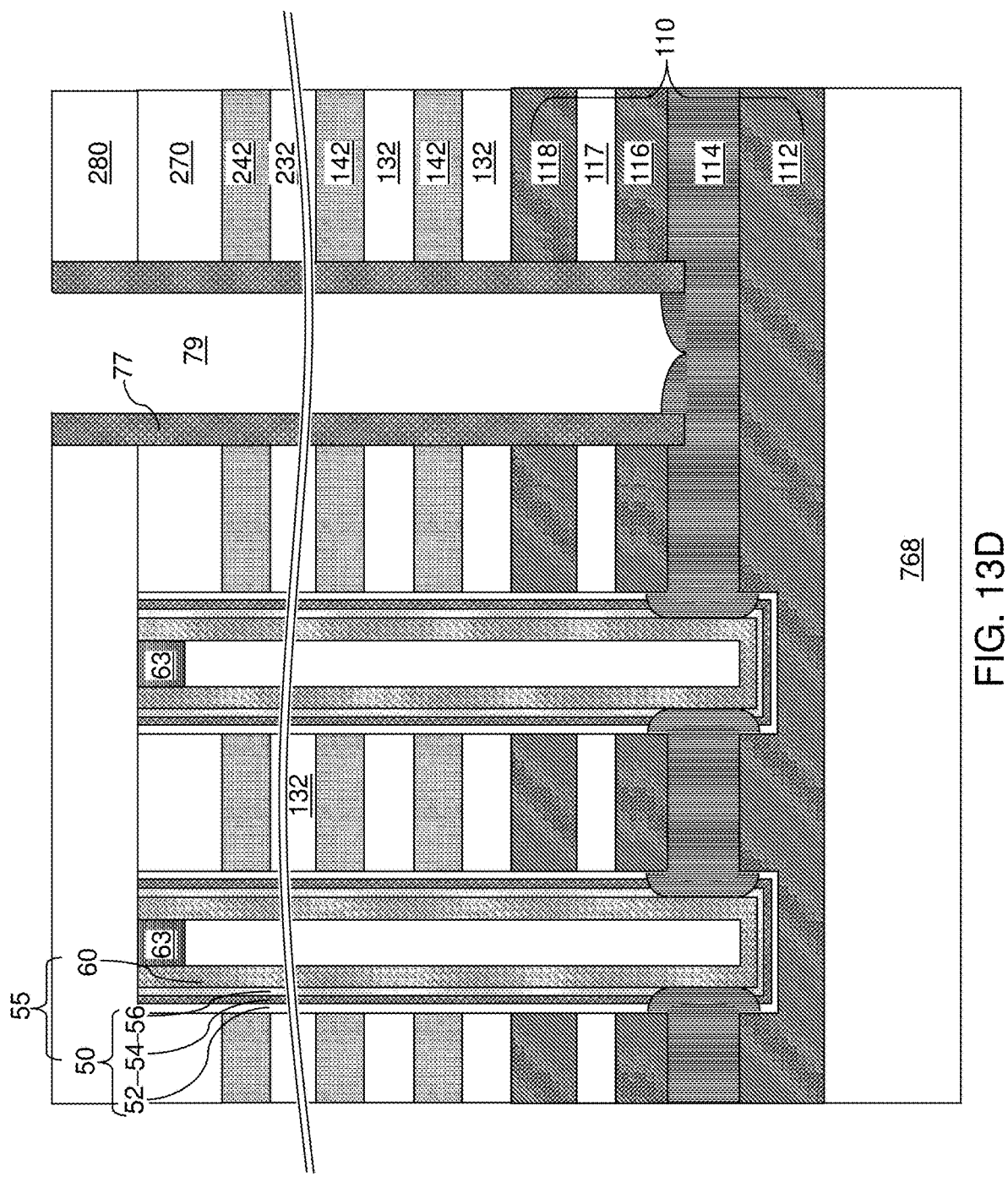
Figure 13E:
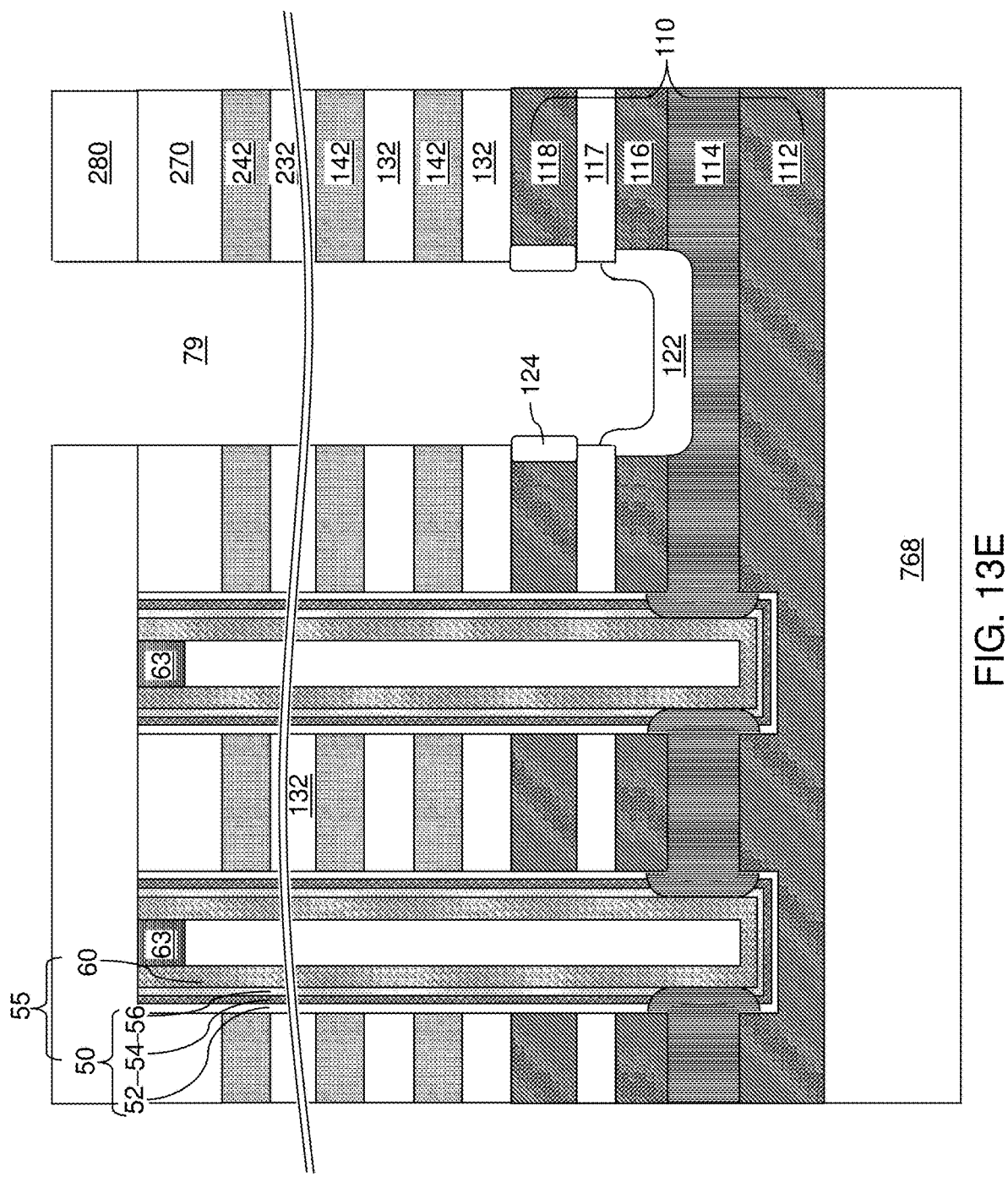

Referring to FIG. 13D, a source contact layer 114 can be formed by a selective deposition process that deposits a doped semiconductor material having a doping of the second conductivity type, which is herein referred to as a third doped semiconductor material. The doped semiconductor material can include amorphous silicon, polysilicon, or a silicon-germanium alloy. The third doped semiconductor material of the source contact layer 114 can grow from physically exposed semiconductor surfaces around the source cavity 109. The average atomic concentration of dopants of the second conductivity type in the source contact layer 114 can be in a range from $5.0 \times 10^{19}/cm^3$ to $2.0 \times 10^{21}/cm^3$, although lesser and greater dopant concentrations can also be employed.

The in-process source-level material layers 110' are replaced with source-level material layers 10. The source-level material layers 110 include a layer stack including, from bottom to top, the lower source-level material layer 112, the source contact layer 114, the upper source-level material layer 116, the source-level insulating layer 117, and the optional source-select-level conductive layer 118. The combination of the lower source-level material layer 112, the source contact layer 114, the upper source-level material layer 116 constitutes a source layer (112, 114, 116). Upon replacement of the source-level sacrificial layer 104 with a source contact layer 114, the in-process source-level material layers 110' are converted into source-level material layers 110 including a source layer (112, 114, 116).

Referring to FIGS. 13E and 14A-14D, the backside trench spacers 77 can be removed selective to the semiconductor material of the source contact layer 114. For example, if the backside trench spacers 77 include silicon nitride, a wet etch process employing hot phosphoric acid can be employed to remove the backside trench spacers 77. If the backside trench spacers 77 include silicon oxide, a wet etch process employing dilute hydrofluoric acid can be employed to remove the backside trench spacers 77. Sidewalls of the first and second alternating stacks (132, 142, 232, 242), the upper source-level material layer 116, the source-level insulating layer 117, and the optional source-select-level conductive layer 118 can be physically exposed after removal of the backside trench spacers 77.

A thermal oxidation process can be performed to convert physically exposed surface portions of various semiconductor materials into semiconductor oxide portions. Specifically, physically exposed surface portions of the source contact layer 114, the upper source-level material layer 116, and the source-select-level conductive layer 118 (if present) are converted into thermal semiconductor oxide material portions. As used herein, a "thermal semiconductor oxide" refers to a material that is formed by thermal oxidation of a semiconductor material. Unlike a semiconductor oxide material formed by chemical vapor deposition, thermal semiconductor oxide materials do not include carbon or hydrogen above a trace level unless the semiconductor material from which the semiconductor oxide material is derived includes carbon prior to a thermal oxidation process.

The thermal oxidation process forms a semiconductor oxide plate 122 at the bottom of each backside trench 79 and semiconductor oxide rails 124 on sidewalls of the source-select-level conductive layer 118. The semiconductor oxide rails 124 are not illustrated in FIG. 14 for clarity. The semiconductor oxide plate 122 includes various thermal semiconductor oxide material portions formed by thermal conversion of surface portions of the source contact layer 114 and the upper source-level material layer 116.

The layer stack including the lower source-level material layer 112, the source contact layer 114, and the upper source-level material layer 116 constitutes a source layer (112, 114, 116), which is a buried source layer that functions as a common source region that is connected each of the vertical semiconductor channels 60 and has a doping of the second conductivity type. The average dopant concentration in the buried source layer (112, 114, 116) can be in a range from $5.0 \times 10^{19}/cm^3$ to $2.0 \times 10^{21}/cm^3$, although lesser and greater dopant concentrations can also be employed.

As shown in FIG. 14C, upon replacement of each of the source-level sacrificial layers 104 with a respective source contact layer 114, each of the source layer segments 111 is converted to a respective source layer segment (111A, 111B), which may also be referred to as a source line. The adjacent first and second source layer segments 111A and 111B are laterally isolated and separated from each other by a respective source isolation structure 12 along the second horizontal direction hd2. Each of the source layer segments (111A, 111B) comprises a lower source-level material layer 112 comprising a first doped semiconductor material, an upper source-level material layer 116 comprising a second doped semiconductor material, and a source contact layer 114 comprising a third doped semiconductor material. In one embodiment, within each instance of the unit structure US, each vertical semiconductor channel 60 in the first memory opening fill structures 58A contacts a source contact layer 114 within the respective first source layer segment 111A; and each vertical semiconductor channel 60 in the second memory opening fill structures 58B contacts a source contact layer 114 within the respective second source layer segment 111B. A unit structure US is located between two adjacent backside trenches 79. Each backside trench 79 laterally separates the electrically conductive layers (e.g., word lines and select gate electrodes) (146, 246) of adjacent unit structures and is located over and may partially extend into a respective source layer segment (e.g., 111A or 111B). However, in the first embodiment, each source layer segment (e.g., 111A) extends below the respective backside trench 79 between at least two adjacent unit structures US. Thus, each source layer segment (e.g., 111A) functions as a source layer for at least two different adjacent unit structures US.

In one embodiment, each of the memory opening fill structures 58 comprises a respective memory film 50 that laterally surrounds the respective vertical semiconductor channel 60, has a respective annular concave bottom surface contacting a respective source contact layer 114, and has a respective cylindrical outer surface contacting a respective upper source-level material layer 116.

Referring to FIG. 15, an etchant that selectively etches the materials of the first and second sacrificial material layers (142, 242) with respect to the materials of the first and second insulating layers (132, 232), the first and second retro-stepped dielectric material portions (165, 265), and the material of the outermost layer of the memory films 50 can be introduced into the backside trenches 79, for example, employing an isotropic etch process. For example, the first and second sacrificial material layers (142, 242) can include silicon nitride, the materials of the first and second insulating layers (132, 232), the first and second insulating cap layers (170, 270), the first and second retro-stepped dielectric material portions (165, 265), and the material of the outermost layer of the memory films 50 can include silicon oxide materials. First backside recesses 143 are formed in volumes from which the first sacrificial material layers 142 are removed. Second backside recesses 243 are formed in volumes from which the second sacrificial material layers 242 are removed.

The isotropic etch process can be a wet etch process employing a wet etch solution, or can be a gas phase (dry) etch process in which the etchant is introduced in a vapor phase into the backside trenches 79. For example, if the first and second sacrificial material layers (142, 242) include silicon nitride, the etch process can be a wet etch process in which the first exemplary structure is immersed within a wet etch tank including phosphoric acid, which etches silicon nitride selective to silicon oxide, silicon, and various other materials employed in the art.

Each of the first and second backside recesses (143, 243) can be a laterally extending cavity having a lateral dimension that is greater than the vertical extent of the cavity. In other words, the lateral dimension of each of the first and second backside recesses (143, 243) can be greater than the height of the respective backside recess (143, 243). A plurality of first backside recesses 143 can be formed in the volumes from which the material of the first sacrificial material layers 142 is removed. A plurality of second backside recesses 243 can be formed in the volumes from which the material of the second sacrificial material layers 242 is removed. Each of the first and second backside recesses (143, 243) can extend substantially parallel to the top surface of the substrate 8. A backside recess (143, 243) can be vertically bounded by a top surface of an underlying insulating layer (132 or 232) and a bottom surface of an overlying insulating layer (132 or 232). In one embodiment, each of the first and second backside recesses (243, 243) can have a uniform height throughout.

Referring to FIGS. 16A-16D, a backside blocking dielectric layer (not shown) can be optionally deposited in the backside recesses and the backside trenches 79 and over the contact-level dielectric layer 280. At least one conductive material can be deposited in the plurality of backside recesses (243, 243), on the sidewalls of the backside trench 79, and over the contact-level dielectric layer 280. The at least one conductive material can include at least one metallic material, i.e., an electrically conductive material that includes at least one metallic element.

A plurality of first electrically conductive layers 146 can be formed in the plurality of first backside recesses 143, a plurality of second electrically conductive layers 246 can be formed in the plurality of second backside recesses 243, and a continuous metallic material layer (not shown) can be formed on the sidewalls of each backside trench 79 and over the contact-level dielectric layer 280. Thus, the first and second sacrificial material layers (142, 242) can be replaced with the first and second conductive material layers (146, 246), respectively. Specifically, each first sacrificial material layer 142 can be replaced with an optional portion of the backside blocking dielectric layer and a first electrically conductive layer 146, and each second sacrificial material layer 242 can be replaced with an optional portion of the backside blocking dielectric layer and a second electrically conductive layer 246. A backside cavity is present in the portion of each backside trench 79 that is not filled with the continuous metallic material layer.

The metallic material can be deposited by a conformal deposition method, which can be, for example, chemical vapor deposition (CVD), atomic layer deposition (ALD), electroless plating, electroplating, or a combination thereof. The metallic material can be an elemental metal, an intermetallic alloy of at least two elemental metals, a conductive nitride of at least one elemental metal, a conductive metal oxide, a conductive doped semiconductor material, a conductive metal-semiconductor alloy such as a metal silicide, alloys thereof, and combinations or stacks thereof. Non-limiting exemplary metallic materials that can be deposited in the backside recesses include tungsten, tungsten nitride, titanium, titanium nitride, tantalum, tantalum nitride, cobalt, and ruthenium. In one embodiment, the metallic material can comprise a metal such as tungsten and/or metal nitride. In one embodiment, the metallic material for filling the backside recesses can be a combination of titanium nitride layer and a tungsten fill material. In one embodiment, the metallic material can be deposited by chemical vapor deposition or atomic layer deposition.

The deposited metallic material of the continuous metallic material layer can be etched back from the sidewalls of each backside trench 79 and from above the contact-level dielectric layers 280, for example, by an anisotropic or isotropic etch. Each remaining portion of the deposited metallic material in the first backside recesses constitutes a first electrically conductive layer 146. Each remaining portion of the deposited metallic material in the second backside recesses constitutes a second electrically conductive layer 246. Each electrically conductive layer (146, 246) can be a conductive line structure.

A subset of the second electrically conductive layers 246 located at the levels of the drain-select-level isolation structures 72 constitutes drain select gate electrodes. A subset of the electrically conductive layer (146, 246) located underneath the drain select gate electrodes can function as combinations of a control gate and a word line located at the same level. The control gate electrodes within each electrically conductive layer (146, 246) are the control gate electrodes for a vertical memory device including the memory stack structure 55. The source-select-level conductive layer 118 functions as a source select gate electrode.

Each of the memory opening fill structures 58 (which contains a respective memory stack structures 55) comprises a vertical stack of memory elements located at each level of the electrically conductive layers (146, 246). A subset of the electrically conductive layers (146, 246) can comprise word lines for the memory elements. The semiconductor devices in the underlying peripheral device region 700 can comprise word line switch devices configured to control a bias voltage to respective word lines. The memory-level assembly includes all structures located above the topmost surface of the lower-level metal interconnect structures 780, and is located over, and is vertically spaced from, the substrate semiconductor layer 9. The memory-level assembly includes at least one alternating stack (132, 146, 232, 246) and memory stack structures 55 vertically extending through the at least one alternating stack (132, 146, 232, 246). Each of the at least one an alternating stack (132, 146, 232, 246) includes alternating layers of respective insulating layers (132 or 232) and respective electrically conductive layers (146 or 246). The at least one alternating stack (132, 146, 232, 246) comprises staircase regions that include terraces in which each underlying electrically conductive layer (146, 246) extends farther along the first horizontal direction hd1 than any overlying electrically conductive layer (146, 246) in the memory-level assembly.

Generally, the sacrificial material layers (142, 242) can be replaced with electrically conductive layers (146, 246) to form alternating stacks {(132, 146), (232, 246)} of insulating layers (132, 232) and electrically conductive layers (146, 246) that are laterally spaced apart among one another by the backside trenches 79. A unit structure US that laterally extends along a first horizontal direction hd1 can be repeated along a second horizontal direction hd2 that is perpendicular to the first horizontal direction hd1. In one embodiment, each instance of the unit structure US comprises a respective alternating stack {(132, 146), (232, 246)} of insulating layers (132, 232) and electrically conductive layers (146, 246) that alternate along a vertical direction. The respective alternating stack {(132, 146), (232, 246)} in one unit structure US is laterally spaced from alternating stacks {(132, 146), (232, 246)} in neighboring unit structures US by a respective backside trench 79.

Referring to FIGS. 17A-17E, an insulating spacer material layer such as a silicon oxide layer can be formally deposited in the backside trenches 79 and over the contact-level dielectric layers 280. An anisotropic etch process can be performed to remove horizontally-extending portions of the insulating spacer material layer from above the contact-level dielectric layers 280 and at the bottom of the backside trenches 79. In one embodiment, center portions of the semiconductor oxide plates 122 may be collaterally etched to physically expose top surface segments of underlying portions of the source contact layer 114. Each remaining vertically-extending tubular portion of the insulating spacer material layer constitutes a backside insulating spacer 74.

At least one electrically conductive material, such as at least metallic material, can be subsequently deposited in the cavities in the backside trenches 79. The at least one conductive material may comprise at least one metallic barrier material (e.g., a metallic nitride material such as TiN, TaN, MoN and/or WN) and at least one metallic fill material (e.g., W, Cu, Co, Ru, Mo, etc.). Excess portions of the at least one metallic material can be removed from above the horizontal plane including the top surfaces of the contact-level dielectric layer 280 by a planarization process, which may employ a recess etch process and/or a chemical mechanical polishing process. Each remaining portion of the at least one metallic material constitutes a backside contact via structure 76. Each contiguous combination of a backside insulating spacer 74 and a backside contact via structure 76 constitutes a backside trench fill structure (74, 76). Each backside trench 79 within the backside trenches 79 can be filled with a respective backside trench fill structure (74, 76).

Generally, backside trench fill structures (74, 76) can be formed in the of the backside trenches 79. Each of the backside trench fill structures (74, 76) comprises a respective backside insulating spacer 74 and a respective backside contact via structure 76. In one embodiment, each of the backside contact via structures 76 is formed directly on a respective surface of the source contact layer 114. In one embodiment, each recessed surface segment of the source layer (112, 114, 116) that is contacted by a respective backside contact via structures 76 is a surface of the source contact layer 114. In one embodiment, each backside contact via structure 76 is laterally surrounded by, and is laterally spaced from a respective neighboring pair of alternating stacks {(132, 146), (232, 246)} by, a respective backside insulating spacer 74. Each backside insulating spacer 74 laterally surrounds a respective backside contact via structure 76 therein.

FIG. 17F is a schematic block diagram of the first exemplary structure shown in FIG. 17C. Each region of the electrically conductive layers (146, 246) which function as word lines of the memory device which extends over a respective source isolation dielectric structure 12 is referred to as a "word line bridge" region 102. The drain side select gate electrodes SGD (i.e., at least one topmost second electrically conductive layer 246D) do not extend across the word line bridge region 102. The source side select gate electrodes SGS (i.e., the optional source-select-level conductive layer 118 and/or at least one bottommost first electrically conductive layer 146S) may or may not extend across the word line bridge region 102, as shown in FIGS. 17C, 17F and 17G. For example, the source isolation dielectric structure 12 may separate the source-select-level conductive layer 118 which may function as the bottommost source side select gate electrodes SGS. In contrast, the word lines (i.e., the electrically conductive layers (146, 246) located vertically between the source and drain side select gate electrodes ((118, 146S) and 246D) do extend across the word line bridge region 102. Each Cell Array region in FIG. 17F comprises a portion of the memory array region 100 which includes the word lines (146, 246) and the memory opening fill structures 58.

FIG. 17G is an alternative configuration of the first exemplary structure, in which two or more drain-select-level isolation dielectric structures 72 are embedded within each memory block MB. Thus, in this alternative embodiment, each memory block MB may have more than four rows of active memory opening fill structures 58, such as for example eight rows of active memory opening fill structures 58.

Referring collectively to FIGS. 17A-17G, each unit structure US includes plural memory blocks MB. For example, in the first embodiment, each unit structure US includes two memory blocks MB. The two memory blocks MB in each unit structure US share the same word lines, but include separate source layers 111. Thus, the memory blocks MB in the same unit structure US are addressed separately using the separate source layers 111. Thus, each source layer segment (111A, 111B, 111C) is electrically connected by a respective source interconnect 713 (e.g., source line) to a separate, respective source line switch device (e.g., a transistor or circuit) 711 (e.g., 711A, 711B, 711C) located in the peripheral circuit 710 in the peripheral region 700, as shown in FIG. 17F. However, since the memory blocks MB in the same unit structure US share the same word lines, they also share the same word line switching device (e.g., a transistor or circuit) 746 (e.g., 746A, 746B, 746C) in the peripheral circuit 710 in the peripheral region 700 for each word line that extends through both memory blocks MB. This configuration reduces the area of the word line switching devices in half compared to using a separate word line switching device for each word line in each memory block MB, without increasing memory block MB capacity to avoid complications with power and performance. Therefore, the cost and area of the peripheral circuit 710 located in the peripheral region 700 is reduced.

Thus, in the first embodiment, word lines are bridged over two memory blocks MB in the same unit structure US, which reduces the number of word line switching devices 746 in half.

The source layer 111 is isolated over every two memory blocks MB in adjacent unit structures US. This allows source layer 111 biasing for each source layer segment (e.g., 111A, 111B, 111C) by a respective source line switch device 711 (e.g., 711A, 711B, 711C), as shown in FIG. 17F. This requires an addition of only one source line switch device 711 for two memory blocks MB, which takes up much less space the word line switch devices 746 used to switch each word line. Thus, the source line switch device 711 does not significantly contribute to an increase of area or cost of the peripheral region 700. The word line bridged (i.e., paired) memory blocks MB in the same unit structure US are laterally offset along the bit line direction hd2 from the source layer 111 paired memory blocks MB in adjacent unit structures US to permit differentiation of memory cell operation biases (i.e., differentiation of electrical bias conditions) for every memory block MB. Therefore, the first embodiment achieves a single memory block capacity with half of word line switching devices typically used in conventional devices.

In the first embodiment, within each instance of the unit structure US, the electrically conductive layers (146, 246) laterally extend continuously between a respective neighboring pair of backside trench fill structures (74, 76). In one embodiment, each unit structure US comprises no more than one backside trench fill structure (74, 76) of the backside trench fill structures (74, 76) i.e., each backside trench fill structures (74, 76) borders and is shared between two adjacent unit structures US. In one embodiment, each instance of the unit structure US comprises a contact-level dielectric layer 280 overlying the respective alternating stack {(132, 146), (232, 246)} and contacting sidewalls of each backside trench fill structure (74, 76) within a respective neighboring pair of backside trench fill structures (74, 76). In one embodiment, each alternating stack {(132, 146), (232, 246)} contacts no more than two backside trench fill structures (74, 76) of the backside trench fill structures (74, 76) of the memory device. Each source layer segment (111A, 111B) contacts bottom surfaces of two of the alternating stacks {(132, 146), (232, 246)} located in two respective, adjacent unit structures US, and laterally contacts sidewalls of two of the isolation dielectric structures 12.

In one embodiment, each backside trench fill structure (74, 76) located between a respective neighboring pair of source isolation dielectric structures 12 is located midway between the respective neighboring pair of source isolation dielectric structures 12 along the second horizontal direction hd2. Each source isolation dielectric structure 12 may be located between a neighboring pair of backside trench fill structures (74, 76) is located midway between the neighboring pair of backside trench fill structures (74, 76) along the second horizontal direction hd2.

Referring to FIGS. 18A-18C, a via-level dielectric layer 282 can be formed over the contact-level dielectric layers 280. A photoresist layer (not shown) can be applied over the via-level dielectric layers 282. The photoresist layer is lithographically patterned to form various contact via openings. For example, openings for forming drain contact via structures can be formed through the via-level dielectric layer 282 and the contact-level dielectric layer in the memory array region 100, and openings for forming layer contact via structures can be formed through the via-level dielectric layer 282, the contact-level dielectric layer 280, and the retro-stepped dielectric material portions (165, 265) in the staircase region 200. An anisotropic etch process is performed to transfer the pattern in the photoresist layer through the via-level dielectric layer 282, the contact-level dielectric layers 280, and underlying dielectric material portions. The drain regions 63 and the electrically conductive layers (146, 246) can be employed as etch stop structures. Drain contact via cavities can be formed over each drain region 63, and layer contact via cavities can be formed over each electrically conductive layer (146. 246) at the stepped surfaces underlying the first and second retro-stepped dielectric material portions (165, 265). The photoresist layer can be subsequently removed, for example, by ashing.

At least one conductive material can be deposited in the layer contact via cavities and the drain contact via cavities. The at least one conductive material can include at least one metallic material. Excess portions of the at least one conductive material can be removed from above the horizontal plane including the top surface of the via-level dielectric layer 282 by a planarization process. The planarization process can employ a recess etch process and/or a chemical mechanical planarization process. Remaining portions of the at least one conductive material in the drain contact via cavities constitute drain contact via structures 88. Remaining portions of the at least one conductive material in the layer contact via cavities constitute layer contact via structures 86.

Connection via structures (which are herein referred to as through-memory-level connection via structures 488) can be formed through the retro-stepped dielectric material portions (165, 265) on a respective one of the lower-level metal interconnect structures 780. Upper-level metal interconnect structures (96, 98) and upper-level dielectric material layers can be formed over the via-level dielectric layer 282. For example, the upper-level dielectric material layers may comprise a bit-line-level dielectric layer 290 and additional dielectric material layers (not shown). The upper-level metal interconnect structures (96, 98) may comprise bit line 98, bit-line-level metal lines 96, and additional metal lines and via structures (not shown) that are formed above the bit lines 98 and the bit-line-level metal lines 96.

In one embodiment, each of the alternating stacks {(132, 146), (232, 246)} has respective stepped surfaces having lateral extents along the first horizontal direction hd1 that decrease with a vertical distance from the semiconductor substrate 8. Retro-stepped dielectric material portions (165, 265) overlie the stepped surfaces of the alternating stacks {(132, 146), (232, 246)}. The through-memory-level connection via structures 488 vertically extend through a respective one of the retro-stepped dielectric material portions (165, 265). The peripheral circuitry is electrically connected to the electrically conductive layers (146, 246) and the vertical stacks of memory elements (which may comprise portions of memory films 50 located at levels of the electrically conductive layers (146, 246)) through lower-level metal interconnect structures 780 and through the upper-level metal interconnect structures.

Referring collectively to FIGS. 1A-18C and according to various embodiments of the present disclosure, a memory device is provided, which comprises multiple instances of a unit structure US that laterally extends along a first horizontal direction hd1 and repeated along a second horizontal direction hd2 that is perpendicular to the first horizontal direction hd1. Each instance of the unit structure US comprises a respective alternating stack {(132, 146), (232, 246)} of insulating layers (132, 232) and electrically conductive layers (146, 246) that alternate along a vertical direction. The respective alternating stack {(132, 146), (232, 246)} is laterally spaced from alternating stacks {(132, 146), (232, 246)} in neighboring instances of the unit structure US by a respective backside trench 79 that is filled with a respective backside trench fill structure (74, 76). A laterally alternating sequence of source layers (112, 114, 116) and source isolation dielectric structures 12 is located underneath the alternating stacks {(132, 146), (232, 246)} such that each source isolation dielectric structure 12 contacts and underlies a middle portion of a respective of the alternating stacks {(132, 146), (232, 246)} and each source layer (112, 114, 116) extends between a respective neighboring pair of source isolation dielectric structures 12. Each instance of the unit structure US comprises: first memory opening fill structures 58 that vertically extend through the respective alternating stack {(132, 146), (232, 246)} on a first side of an respective underlying source isolation dielectric structure 12 and extends into a respective first source layer (112, 114, 116), and second memory opening fill structures 58 that vertically extend through the respective alternating stack {(132, 146), (232, 246)} on a second side of the respective underlying source isolation dielectric structure 12 and extends into a respective second source layer (112, 114, 116) that is laterally spaced from, and is electrically isolated from, the respective source layer (112, 114, 116) by the respective underlying source isolation dielectric structure 12. Each of the first memory opening fill structures 58 and the second memory opening fill structures 58 comprises a respective vertical semiconductor channel 60 and a respective vertical stack of memory elements.

In one embodiment, the source isolation dielectric structures 12 laterally extend along the first horizontal direction hd1; and at least one of the source isolation dielectric structures 12 has a variable width along the second horizontal direction hd2 that decreases with a vertical distance from an interface with a respective one of the alternating stacks {(132, 146), (232, 246)}.

In one embodiment, each of the source layers (112, 114, 116) comprises: a lower source-level material layer 112 comprising a first doped semiconductor material; an upper source-level material layer 116 comprising a second doped semiconductor material; and a source contact layer 114 comprising a third doped semiconductor material and located between the upper source-level material layer 116 and the lower source-level material layer 112. In one embodiment, each of the backside trench fill structures (74, 76) comprises a backside contact via structure 76 and a backside insulating spacer 74 that laterally surrounds the backside contact via structure 76.

In one embodiment, the backside contact via structure 76 within each of the backside trench fill structures (74, 76) contacts a surface of a respective source contact layer 114. In one embodiment, within each instance of the unit structure US: each vertical semiconductor channel 60 in the first memory opening fill structures 58 contacts a source contact layer 114 within the respective first source layer (112, 114, 116); and each vertical semiconductor channel 60 in the second memory opening fill structures 58 contacts a source contact layer 114 within the respective second source layer (112, 114, 116).

In one embodiment, each of the memory opening fill structures 58 comprises a respective memory film 50 that laterally surrounds the respective vertical semiconductor channel 60, has a respective annular concave bottom surface contacting a respective source contact layer 114, and has a respective cylindrical outer surface contacting a respective upper source-level material layer 116.

In one embodiment, within each instance of the unit structure US, the electrically conductive layers (146, 246) laterally extend continuously between a respective neighboring pair of backside trench fill structures (74, 76). In one embodiment, each unit structure US comprises no more than one backside trench fill structure (74, 76) among the backside trench fill structures (74, 76) of the memory device. In one embodiment, each instance of the unit structure US comprises a contact-level dielectric layer overlying the respective alternating stack {(132, 146), (232, 246)} and contacting sidewalls of each backside trench fill structure (74, 76) within a respective neighboring pair of backside trench fill structures (74, 76).

In one embodiment, each alternating stack {(132, 146), (232, 246)} contacts no more than two backside trench fill structures (74, 76) among the backside trench fill structures (74, 76) of the memory device; and each source layer (112,

114, 116) contacts bottom surfaces of no more than two alternating stacks {(132, 146), (232, 246)} among the alternating stacks {(132, 146), (232, 246)} of the memory device, and contacts no more than two source isolation dielectric structures 12 among the source isolation dielectric structures 12 of the memory device.

In one embodiment, each backside trench fill structure (74, 76) located between a respective neighboring pair of source isolation dielectric structures 12 is located midway between the respective neighboring pair of source isolation dielectric structures 12 along the second horizontal direction hd2; and each source isolation dielectric structure 12 located between a neighboring pair of backside trench fill structures (74, 76) is located midway between the neighboring pair of backside trench fill structures (74, 76) along the second horizontal direction hd2.

In one embodiment, the memory device further comprises: a semiconductor substrate 8 underlying the multiple instances of the unit structure US; and a peripheral circuitry located on the semiconductor substrate 8 and electrically connected to the electrically conductive layers (146, 246) and the vertical stacks of memory elements through lower metal interconnect structures 780 underlying the multiple instances of the unit structure US, connection via structures 488 located at a same level as the multiple instances of the unit structure US, and upper metal interconnect structures (96, 98) overlying the multiple instances of the unit structure US.

In one embodiment, each of the alternating stacks {(132, 146), (232, 246)} has respective stepped surfaces having lateral extents along the first horizontal direction hd1 that decrease with a vertical distance from the semiconductor substrate 8; retro-stepped dielectric material portions (165, 265) overlie the stepped surfaces of the alternating stacks {(132, 146), (232, 246)}; and the connection via structures 488 vertically extend through a respective one of the retro-stepped dielectric material portions 488.

Referring to FIG. 19, a second exemplary structure according to a second embodiment of the present disclosure comprises a substrate 908 including a substrate material layer 909. The substrate 8 may comprise a semiconductor substrate, an insulating substrate, and/or a conductive substrate. Generally, the substrate 908 can be any substrate that may be employed as a carrier substrate. In one embodiment, the substrate material layer 909 may comprise a single crystalline semiconductor material layer (such as a single crystalline semiconductor layer). Optionally, the substrate 908 may comprise a dielectric material layer (such as a silicon oxide layer; not shown) in an upper portion thereof.

A semiconductor material layer 10 is located on a top surface of the substrate 908. The semiconductor material layer 10 may comprise a doped well (e.g., doped silicon well) in the top surface of a silicon wafer which functions as the substrate material layer 909. Alternatively, the semiconductor material layer 10 may comprise an epitaxial silicon layer located on the top surface of the substrate 908 or a silicon layer of a silicon on insulator substrate 908.

Referring to FIG. 20, the processing steps described with reference to FIG. 3 can be performed to form a first vertically alternating sequence of first insulating layers 132 and first spacer material layers 142.

Referring to FIG. 21, the processing steps described with reference to FIG. 4 can be performed to pattern first stepped surfaces, and to form a first retro-stepped dielectric material portion 165 and an inter-tier dielectric layer 180.

Referring to FIGS. 22A and 22B, the processing steps of FIGS. 5A and 5B can be performed to form first-tier memory openings 49 and first-tier support openings 129. In one embodiment, each of the first-tier memory openings 49 and the first-tier support openings 129 can be formed directly into a respective layer stack of in-process source-level material layers 110' (as divided by the source isolation dielectric structures 12), and can be laterally offset from the source isolation dielectric structures 12.

Referring to FIG. 23, the processing steps described with reference to FIG. 6 can be performed to form is a sacrificial first-tier memory opening fill portions 148 and sacrificial first-tier support opening fill portions 128.

Referring to FIG. 24, the processing steps described with reference to FIG. 7 can be performed to form a second vertically alternating sequence of second insulating layers 232 and second spacer material layers 242, second stepped surfaces, a second retro-stepped dielectric material portion 265, and drain-select-level isolation structures 72.

Referring to FIGS. 25A and 25B, the processing steps described with reference to FIG. 8 can be performed to form second-tier memory openings 149 and second-tier support openings 229.

Referring to FIG. 26, the processing steps described with reference to FIG. 9 can be performed to form inter-tier memory openings 49 and inter-tier support openings 19.

Referring to FIGS. 27A and 27B, the processing steps of FIGS. 10A-10D and 11A and 11B can be performed to form memory opening fill structures 58 and support pillar structures 20. Each of the memory opening fill structures 58 comprises a respective vertical stack of memory elements (which may comprise portions of memory films 50 located at levels of the electrically conductive layers (146, 246)) and a respective vertical semiconductor channel 60.

Referring to FIGS. 28A-28C, the processing steps described with reference to FIGS. 12A-12D can be performed to form a contact-level dielectric layer 280 over the memory opening fill structures 58, and to form backside trenches 79. The vertically alternating sequences of insulating layers (132, 232) and spacer material layers (such as the sacrificial material layers (142, 242)) can be divided into alternating stacks {(132, 142), (232, 242)} of insulating layers (132, 232) and spacer material layers (such as the sacrificial material layers (142, 242)) by forming backside trenches 79. Surfaces of the semiconductor material layer 10 can be physically exposed around the bottom portion of each backside trench 79.

Referring to FIG. 29, the processing steps described with reference to FIG. 15 can be performed to form backside recesses (143, 243) by removing the sacrificial material layers (142, 242).

Referring to FIGS. 30A and 30B, the processing steps described with reference to FIGS. 16A-16D can be performed to form electrically conductive layers (146, 246) in the backside recesses (143, 243). Alternating stacks {(132, 146), (232, 246)} of insulating layers (132, 232) and electrically conductive layers (146, 246) that are laterally spaced apart among one another by the backside trenches 79 are formed. The alternating stacks {(132, 146), (232, 246)} of insulating layers (132, 232) and electrically conductive layers (146, 246) are laterally spaced apart from each other along the second horizontal direction hd2 by the backside trenches 79, which laterally extend along the first horizontal direction hd1.

Referring to FIGS. 31A-31C, at least one dielectric fill material such as silicon oxide can be deposited in the backside trenches 79 to form a backside trench fill structure 176. Each instance of the unit structure US comprises a backside trench fill structure 176 that consists essentially of at least one dielectric material. Alternatively, each backside trench fill structure 176 can be located between two adjacent unit structures US, such that each unit structure US includes two halves of the backside trench fill structure 176.

Referring to FIGS. 32A and 32B, the processing steps described with reference to FIGS. 18A-18C can be performed to form a via-level dielectric layer 282, drain contact via structures 88, layer contact via structures 86, a bit-line-level dielectric layer 290, bit lines 98, and bit-line-level metal lines 96.

Referring to FIG. 33, additional dielectric material layers 960 and additional metal interconnect structures (986, 988) can be subsequently formed. The additional dielectric material layers 960 may comprise interconnect-level dielectric material layers 964, a passivation dielectric layer 966, and a pad-level dielectric material layer 968. The additional dielectric material layers 960 are also referred to as memory-side dielectric material layers 960. The additional metal interconnect structures (986, 988) may comprise memory-side metal lines 988 and memory-side metal via structures 986. Memory-side bonding pads 998 may be formed in the pad-level dielectric material layer 968. In one embodiment, the memory-side bonding pads 998 may comprise metal bonding pads (e.g., copper bonding pads) that are configured for metal-to-metal bonding, such as copper-to-copper bonding. A memory die 900 is provided.

Referring to FIG. 34, a logic die 700 is provided, which comprises a logic-side substrate 708 including a logic-side substrate semiconductor layer 709 and a peripheral circuit 710 formed on a top surface of the logic-side substrate semiconductor layer 709. The peripheral circuit 710 can be configured to control operation of the electrically conductive layers (146, 246) and the vertical stack of memory elements (which may comprise portions of memory films 50 located at levels of the electrically conductive layers (146, 246)), and may have a same set of components and may provide a same functionality as the peripheral circuit 710 described above. In the second exemplary structure, the dielectric material layers that correspond to the lower-level dielectric material layers 760 in the first and second exemplary structures are referred to as logic-side dielectric material layers 760, and the metal interconnect structures that correspond to the lower-level metal interconnect structures 780 in the first and second exemplary structures are referred to as logic-side metal interconnect structures 780. The logic-side dielectric material layers 760 may comprise a pad-level dielectric material layer 769 embedding logic-side boding pads 798. In one embodiment, the logic-side bonding pads 798 may comprise metal bonding pads (e.g., copper bonding pads) that are configured for metal-to-metal bonding such as copper-to-copper bonding. The pattern of the logic-side bonding pads 798 as seen in a top-down view may be a mirror image pattern of the patten of the memory-side bonding pads 998 as seen in a top-down view.

The logic die 700 can be bonded to the memory die 900 by aligning the logic-side bonding pads 798 to the memory-side bonding pads 998, and by inducing metal-to-metal bonding between mating pairs of the logic-side bonding pads 798 and the memory-side bonding pads 998 using a bonding anneal.

Referring to FIG. 35, the semiconductor material layer 10 and then substrate 900 of the memory die 900 are removed. In one embodiment, the substrate material layer 909 of the substrate 909 of the memory die 900 can be thinned or removed from the backside, for example, by grinding, polishing, cleaving, at least one anisotropic etch process, and/or at least one isotropic etch process, followed by selective etching of the semiconductor material layer 10. The bottom tips of the memory opening fill structures 58 are exposed. The exposed portions of the memory films are then removed by selective etching to expose the bottom tips of the vertical semiconductor channels 60.

Referring to FIG. 36, a source layer 210 is formed on the exposed bottom tips of the vertical semiconductor channels 60. The source layer 210 may comprise one or more suitable layers. For example, the source layer 210 may comprise a semiconductor source layer 210A, such as doped polysilicon layer of a first conductivity type which contacts the exposed bottom tips of the vertical semiconductor channels 60. Optionally, the source layer 210 may also include an electrically conductive layer 210B, such as a source electrode or source line, comprising a metal (e.g., copper, tungsten, aluminum, etc.), metal silicide (e.g., titanium, nickel or tungsten silicide), and/or a conductive metal nitride (e.g., TiN, WN, TaN or MoN).

Referring to FIG. 37, a photoresist layer 217 can be formed over the backside of the source layer 210. The photoresist layer 217 can be lithographically patterned with a periodicity along the second horizontal direction hd2 that is equal to an integer fraction (e.g., ½, ⅓, ¼, etc.) of the periodicity of the backside trench fill structures 176 along the second horizontal direction hd2. Generally, the integer fraction may be 1/N in which N is an integer greater than 1. The number N may be the number of two-dimensional arrays of memory opening fill structures 58 separated by the word line bridge regions 102 between a neighboring pair of backside trench fill structures 176. In one embodiment, the pattern of the photoresist layer 217 is a repetition of unit photoresist pattern that is repeated along the second horizontal direction hd2.

The patterned photoresist layer 217 can include slit-shaped openings that laterally extend along the first horizontal direction hd1 and laterally spaced apart along the second horizontal direction hd2. Each slit-shaped opening in the photoresist layer 217 laterally extends along the first horizontal direction hd1 with a uniform width along the second horizontal direction hd2. A subset of the slit-shaped opening in the photoresist layer 217 overlies, and may be wider than, a respective underlying backside trench fill structure 176.

An anisotropic etch process can be performed to transfer the pattern of the openings in the patterned photoresist layer 217 through the source layer 210. Source isolation trenches 211 can be formed through the source layer 210. In one embodiment, horizontal surfaces of most proximal insulating layers 32 of the alternating stacks {(132, 146), (23,2 246)} can be physically exposed at the bottom of each source isolation trench 211. In one embodiment, an entirety of an end surface of each backside trench fill structure 176 may be physically exposed and/or vertically recessed underneath a respective one of the source isolation trenches 211. The source layer 210 can be divided into a plurality of source layer segments 311. Each contiguous patterned portion of the source layer 210 as divided by the source isolation trenches 211 constitutes a source layer segment 311. The patterned photoresist layer 217 can be subsequently removed, for example, by ashing.

Referring to FIG. 38, at least one dielectric fill material such as silicon oxide can be deposited in the source isolation trenches 211. A planarization process can be performed to remove portions of the at least one dielectric fill material from above the horizontal plane including the top surfaces (backside surfaces) of the source layer segments 311. The planarization process may comprise, for example, a recess etch process and/or a chemical mechanical polishing process. Each remaining portion of the at least one dielectric fill material filling a respective source isolation trench 211 constitutes a source isolation dielectric structure 212. In one embodiment, the source isolation dielectric structure 212 has a variable width along the second horizontal direction hd2 that increases with a vertical distance from the alternating stack {(132, 146), (232, 246)}.

A laterally alternating sequence of source layer segments 311 and source isolation dielectric structures 212 is formed. Each of the source layer segments 311 and the source isolation dielectric structures 212 laterally extend along a first horizontal direction hd1. The source layer segments 311 and the source isolation dielectric structures 212 alternate along a second horizontal direction hd2 that is perpendicular to the first horizontal direction hd1. In one embodiment, each of the source layer segments 311 comprises a semiconductor source layer segment 210A in contact with the vertical semiconductor channels 60 and an optional conductive source layer segment (e.g., source electrode or source line) 210B overlying the semiconductor source layer segment.

In the second embodiment, each unit structure US includes three memory blocks MB in which the word lines of the memory blocks extend across the word line bridge regions 102. Each memory block MB includes a separate source layer segment 311 (e.g., 311A, 311B, 311C).

Referring to FIG. 39, an alternative configuration of the second exemplary structure in which two or more drain-select-level isolation dielectric structures 72 are embedded within each memory block MB. Thus, in this alternative embodiment, each memory block MB may have more than four rows of active memory opening fill structures 58, such as for example eight rows of active memory opening fill structures 58.

FIG. 40 is a schematic block diagram of the second exemplary structure shown in FIG. 38. The drain side select gate electrodes SGD (i.e., at least one topmost second electrically conductive layer 246D) do not extend across the word line bridge region 102. The source side select gate electrodes SGS (i.e., the optional source-select-level conductive layer 118 and/or at least one bottommost first electrically conductive layer 146S) also do not extend across the word line bridge region 102. In contrast, the word lines (i.e., the electrically conductive layers (146, 246) located vertically between the source and drain side select gate electrodes ((118, 146S) and 246D) do extend across the word line bridge region 102. Each Cell Array region in FIG. 40 comprises a portion of the memory array region 100 which includes the word lines (146, 246) and the memory opening fill structures 58.

Referring collectively to FIGS. 38-40, each unit structure US includes plural memory blocks MB. For example, in the second embodiment, each unit structure US includes three memory blocks MB. The three memory blocks MB in each unit structure US share the same word lines, but include separate source layer segments 311. Thus, the memory blocks MB in the same unit structure US are addressed separately using the separate source layer segments 311. Thus, each source layer segment (311A, 311B, 311C) is electrically connected by a respective source interconnect (e.g., source line) 713 to a separate, respective source line switch device (e.g., a transistor or circuit) 711 (e.g., 711A, 711B, 711C) located in the peripheral circuit 710 in the logic die 700, as shown in FIG. 40. However, since the memory blocks MB in the same unit structure US share the same word lines, they also share the same word line switching device (e.g., a transistor or circuit) 746 (e.g., 746A, 746B) in the peripheral circuit 710 in the logic die 700 for each word line that extends through three memory blocks MB. This configuration reduces the area of the word line switching devices by two thirds compared to using a separate word line switching device for each word line in each memory block MB, without increasing memory block MB capacity to avoid complications with power and performance. Therefore, the cost and area of the peripheral circuit 710 located in the memory die 700 is reduced.

Thus, in the second embodiment, word lines are bridged over three memory blocks MB in the same unit structure US, which reduces the number of word line switching devices 746 in half. The source layer segments 311 are isolated between all memory blocks MB in the same and adjacent unit structures US. Thus, the memory block MB size is defined by its respective source layer segment 311. This allows separate biasing for each source layer segment (e.g., 311A, 311B, 311C) by a respective source line switch device 711 (e.g., 711A, 711B, 711C), as shown in FIG. 40. This requires an addition of only one source line switch device 711 for each memory block MB, which takes up much less space the word line switch devices 746 used to switch each word line. Thus, the source line switch device 711 does not significantly contribute to an increase of area or cost of the logic die 700. Therefore, the second embodiment achieves a single memory block capacity with one third of word line switching devices typically used in conventional devices.

In the first and second embodiments, a memory device comprises a first memory block MB comprising first word lines (146, 246) and a first source layer segment (111A, 311A), and a second memory block MB comprising second word lines (146, 246) and a second source layer segment (111B, 311B) which is electrically isolated from the first source layer segment (111A, 311A). The first word lines in the first memory block are electrically connected to the respective second word lines in the second memory block.

In one embodiment, the first memory block and the second memory block further comprise memory opening fill structures 58, each of which comprises a respective vertical semiconductor channel 60 and a respective vertical stack of memory elements (e.g., portions of the memory film 50). The first word lines are electrically connected to the respective second word lines across a first word line bridge region 102 located between the first memory block and the second memory block. The first source layer segment is electrically isolated from the second source layer segment by a first source isolation dielectric structure (12, 212). In one embodiment, the memory device further comprises a third memory block MB comprising third word lines (146, 246) and memory opening fill structures 58.

In the first embodiment, the second word lines are electrically isolated from the third word lines by a backside trench fill structure (74, 76) located in a backside trench 79 extending between the second and the third memory blocks MB. The second source layer segment 111B is located in both the second and the third memory blocks.

The memory device of the first embodiment further comprises word line switching devices 746 and source line switch devices 711. Each one of the word line switching devices 746 controls both a respective first word line and a respective second word line which is electrically connected to the respective first word line across the first word line bridge region 102. The first source layer segment 111A is controlled by a first one 711A of the source line switch devices 711, and the second source layer segment 111B is controlled by a second one 711B of the source line switch devices 711.

In the second embodiment, the third memory block MB further comprises a third source layer segment 311C which is electrically isolated from the second source layer segment 311B by a second source isolation dielectric structure 212. The second word lines are electrically connected to the respective third word lines across a second word line bridge region 102 located between the second memory block and the third memory block.

The memory device of the second embodiment further comprises word line switching devices 746 and source line switch devices 711. Each one of the word line switching devices 746 controls a respective first word line, a respective second word line which is electrically connected to the respective first word line across the first word line bridge region 102, and a respective third word line which is electrically connected to the respective second word line across the second word line bridge region 102. The first source layer segment 311A is controlled by a first one 711A of the source line switch devices 711. The second source layer segment 311B is controlled by a second one 711B of the source line switch devices 711. The third source layer segment 311C is controlled by a third one 711C of the source line switch devices 711.

In the first and second embodiments, the first memory block MB and the second memory block MB are located in a first unit structure US which comprises one of multiple instances of the unit structures that laterally extend along a first horizontal direction hd1 and repeated along a second horizontal direction hd2 that is perpendicular to the first horizontal direction. Each instance of the unit structures US comprises a respective alternating stack of insulating layers (132, 232) and electrically conductive layers (146, 246) that alternate along a vertical direction. The respective alternating stack is laterally spaced from alternating stacks in neighboring instances of the unit structures by a respective backside trench 79 that is filled with a respective backside trench fill structure {(74, 76), 176}. A laterally alternating sequence of source layer segments (111, 311) and source isolation dielectric structures (12, 212) is located underneath the alternating stacks.

In one embodiment, each instance of the unit structures comprises first memory opening fill structures 58 that vertically extend through the respective alternating stack on a first side of a respective underlying source isolation dielectric structure (12, 212) and that extend into a respective first source layer segment (111A, 311A), and second memory opening fill structures 58 that vertically extend through the respective alternating stack on a second side of the respective underlying source isolation dielectric structure (12, 212) and extend into a respective second source layer segment (111B, 311B) that is laterally spaced from and is electrically isolated from the respective first source layer segment (111A, 311A) by the respective underlying source isolation dielectric structure (12, 212).

In the first embodiment, each of the first memory opening fill structures 58 and the second memory opening fill structures 58 comprise a respective vertical semiconductor channel 60 and a respective vertical stack of memory elements (e.g., portions of the memory film). Each source isolation dielectric structure 12 contacts and underlies a middle portion of a respective one of the alternating stacks and each source layer segment 111 extends between a respective neighboring pair of source isolation dielectric structures 12. The source isolation dielectric structures 12 laterally extend along the first horizontal direction hd1.

In the first embodiment, each of the source layer segments 111 comprises a lower source-level material layer 112 comprising a first doped semiconductor material, an upper source-level material layer 116 comprising a second doped semiconductor material, and a source contact layer 114 comprising a third doped semiconductor material and located between the upper source-level material layer 116 and the lower source-level material layer 112.

In the first embodiment, each of the backside trench fill structures comprises a backside contact via structure 76 and a backside insulating spacer 74 that laterally surrounds the backside contact via structure. The backside contact via structure 76 within each of the backside trench fill structures contacts a surface of a respective source contact layer 114. Each vertical semiconductor channel 60 in the first memory opening fill structures 58 contacts a source contact layer 114 within the respective first source layer segment 111A. Each vertical semiconductor channel 60 in the second memory opening fill structures 58 contacts a source contact layer 114 within the respective second source layer segment 111B. In the first embodiment, the word lines (146, 246) laterally extend continuously between a respective neighboring pair of backside trench fill structures (74, 76) in the first unit structure US.

In the first embodiment, a semiconductor substrate 9 underlies the multiple instances of the unit structures US. A peripheral circuitry 710 is located on the semiconductor substrate 9 and electrically connected to the electrically conductive layers (146, 246) and the first and then second source layer segments (111A, 111B) through lower metal interconnect structures 780 underlying the multiple instances of the unit structures US, connection via structures (86, 488) located at a same level as the multiple instances of the unit structures, and upper metal interconnect structures 96 overlying the multiple instances of the unit structures US.

In the second embodiment, the first unit US structure further comprises a third memory block MB comprising third word lines (146, 246) which are electrically connected to the second word lines, a third source layer segment 311C which is electrically isolated from the second source layer segment 311B by a second source isolation dielectric structure 212, and third memory opening fill structures 58 that vertically extend through the respective alternating stack on a second side of the second source isolation dielectric structure 212 and that extend into the third source layer segment 311C.

In the second embodiment, a backside trench fill structure 176 contacts a first source isolation dielectric structure 212 of the source isolation dielectric structures and contact the alternating stacks in the first unit structure US and another alternating stack located within a neighboring instance of the unit structures US. In the second embodiment, a logic die 700 is bonded to a memory die 900 containing the unit structures US.

Although the foregoing refers to particular embodiments, it will be understood that the disclosure is not so limited. It will occur to those of ordinary skill in the art that various modifications may be made to the disclosed embodiments and that such modifications are intended to be within the scope of the disclosure. Compatibility is presumed among all embodiments that are not alternatives of one another. The word "comprise" or "include" contemplates all embodiments in which the word "consist essentially of" or the word "consists of" replaces the word "comprise" or "include," unless explicitly stated otherwise. Where the third embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All of the publications, patent applications and patents cited herein are incorporated herein by reference in their entirety.

What is claimed is:

1. A memory device, comprising:
a first memory block comprising first word lines and a first source layer segment; and
a second memory block comprising second word lines and a second source layer segment which is electrically isolated from the first source layer segment,
wherein the first word lines in the first memory block are electrically connected to the respective second word lines in the second memory block across a first word line bridge region located between the first memory block and the second memory block.

2. The memory device of claim 1, wherein:
the first memory block and the second memory block further comprise memory opening fill structures, each of which comprises a respective vertical semiconductor channel and a respective vertical stack of memory elements;
and the first source layer segment is electrically isolated from the second source layer segment by a first source isolation dielectric structure.

3. The memory device of claim 2, further comprising a third memory block comprising third word lines and memory opening fill structures.

4. The memory device of claim 3, wherein:
the second word lines are electrically isolated from the third word lines by a backside trench fill structure located in a backside trench extending between the second and the third memory blocks; and
the second source layer segment is located in both the second and the third memory blocks.

5. The memory device of claim 4, further comprising word line switching devices and source line switch devices, wherein:
each one of the word line switching devices controls both a respective first word line and a respective second word line which is electrically connected to the respective first word line across the first word line bridge region;
the first source layer segment is controlled by a first one of the source line switch devices; and
the second source layer segment is controlled by a second one of the source line switch devices.

6. The memory device of claim 3, wherein:
the third memory block further comprises a third source layer segment which is electrically isolated from the second source layer segment by a second source isolation dielectric structure; and
the second word lines are electrically connected to the respective third word lines across a second word line bridge region located between the second memory block and the third memory block.

7. The memory device of claim 6, further comprising word line switching devices and source line switch devices, wherein:
each one of the word line switching devices controls a respective first word line, a respective second word line which is electrically connected to the respective first word line across the first word line bridge region, and a respective third word line which is electrically connected to the respective second word line across the second word line bridge region;
the first source layer segment is controlled by a first one of the source line switch devices;
the second source layer segment is controlled by a second one of the source line switch devices; and
the third source layer segment is controlled by a third one of the source line switch devices.

8. The memory device of claim 1, wherein:
the first memory block and the second memory block are located in a first unit structure which comprises one of multiple instances of the unit structures that laterally extend along a first horizontal direction and repeated along a second horizontal direction that is perpendicular to the first horizontal direction;
each instance of the unit structures comprises a respective alternating stack of insulating layers and electrically conductive layers that alternate along a vertical direction;
the respective alternating stack is laterally spaced from alternating stacks in neighboring instances of the unit structures by a respective backside trench that is filled with a respective backside trench fill structure; and
a laterally alternating sequence of source layer segments and source isolation dielectric structures located underneath the alternating stacks.

9. The memory device of claim 8, wherein each instance of the unit structures comprises:
first memory opening fill structures that vertically extend through the respective alternating stack on a first side of a respective underlying source isolation dielectric structure and that extend into a respective first source layer segment; and
second memory opening fill structures that vertically extend through the respective alternating stack on a second side of the respective underlying source isolation dielectric structure and extend into a respective second source layer segment that is laterally spaced from and is electrically isolated from the respective first source layer segment by the respective underlying source isolation dielectric structure.

10. The memory device of claim 9, wherein:
each of the first memory opening fill structures and the second memory opening fill structures comprise a respective vertical semiconductor channel and a respective vertical stack of memory elements;
each source isolation dielectric structure contacts and underlies a middle portion of a respective one of the alternating stacks and each source layer segment extends between a respective neighboring pair of source isolation dielectric structures; and
the source isolation dielectric structures laterally extend along the first horizontal direction.

11. The memory device of claim 9, wherein each of the source layer segments comprises:
a lower source-level material layer comprising a first doped semiconductor material;
an upper source-level material layer comprising a second doped semiconductor material; and
a source contact layer comprising a third doped semiconductor material and located between the upper source-level material layer and the lower source-level material layer.

12. The memory device of claim 11, wherein:
- each of the backside trench fill structures comprises a backside contact via structure and a backside insulating spacer that laterally surrounds the backside contact via structure;
- the backside contact via structure within each of the backside trench fill structures contacts a surface of a respective source contact layer;
- each vertical semiconductor channel in the first memory opening fill structures contacts a source contact layer within the respective first source layer segment; and
- each vertical semiconductor channel in the second memory opening fill structures contacts a source contact layer within the respective second source layer segment.

13. The memory device of claim 9, wherein the first and the second word lines laterally extend continuously between a respective neighboring pair of backside trench fill structures in the first unit structure.

14. The memory device of claim 9, further comprising:
- a semiconductor substrate underlying the multiple instances of the unit structures; and
- a peripheral circuitry located on the semiconductor substrate and electrically connected to the electrically conductive layers and the first and then second source layer segments through lower metal interconnect structures underlying the multiple instances of the unit structures, connection via structures located at a same level as the multiple instances of the unit structures, and upper metal interconnect structures overlying the multiple instances of the unit structures.

15. The memory device of claim 9, wherein the first unit structure further comprises a third memory block comprising:
- third word lines which are electrically connected to the second word lines;
- a third source layer segment which is electrically isolated from the second source layer segment by a second source isolation dielectric structure; and
- third memory opening fill structures that vertically extend through the respective alternating stack on a second side of the second source isolation dielectric structure and that extend into the third source layer segment.

16. The memory device of claim 15, further comprising a backside trench fill structure contacting a first source isolation dielectric structure of the source isolation dielectric structures and contacting the alternating stacks in the first unit structure and another alternating stack located within a neighboring instance of the unit structures.

17. The memory device of claim 16, further comprising a logic die bonded to a memory die containing the unit structures.

18. A method of forming a memory device, comprising:
- forming a laterally alternating sequence of source layer segments and source isolation dielectric structures;
- forming a vertically alternating sequence of continuous insulating layers and continuous sacrificial material layers;
- forming memory openings through the vertically alternating sequence;
- forming memory opening fill structures in the memory openings, wherein each of the memory opening fill structures comprises a respective vertical stack of memory elements and a respective vertical semiconductor channel;
- dividing the vertically alternating sequence into in-process alternating stacks of insulating layers and sacrificial material layers by forming backside trenches that laterally extend along a first horizontal direction and laterally spaced apart along a second horizontal direction;
- replacing the sacrificial material layers with electrically conductive layers to form alternating stacks of insulating layers and electrically conductive which are laterally spaced apart from each other by the backside trenches and which extend over at least one of the source isolation dielectric structures; and
- bonding a logic die to a memory die containing the memory opening fill structures, wherein at least three source layer segments are located between adjacent backside trenches.

19. The method of claim 18, wherein the backside trenches and the source layer segments are staggered along the second horizontal direction such that each backside trench is formed between a neighboring pair of source layer segments.

* * * * *